US011266063B2

(12) United States Patent
Schaffert et al.

(10) Patent No.: US 11,266,063 B2
(45) Date of Patent: Mar. 8, 2022

(54) PRESS WHEEL WITH ANGLED TINES

(71) Applicant: SCHAFFERT MANUFACTURING COMPANY, INC., Indianola, NE (US)

(72) Inventors: Paul E. Schaffert, Indianola, NE (US); Kris Schaffert, Indianola, NE (US)

(73) Assignee: Schaffert Manufacturing Company, Inc., Indianola, NE (US)

( * ) Notice: Subject to any disclaimer, the term of this patent is extended or adjusted under 35 U.S.C. 154(b) by 0 days.

(21) Appl. No.: 17/484,449

(22) Filed: Sep. 24, 2021

(65) Prior Publication Data
US 2022/0007568 A1 Jan. 13, 2022

Related U.S. Application Data

(63) Continuation of application No. 17/002,084, filed on Aug. 25, 2020, which is a continuation of application No. 14/835,553, filed on Aug. 25, 2015, now abandoned.

(60) Provisional application No. 62/041,551, filed on Aug. 25, 2014.

(51) Int. Cl.
*A01C 5/06* (2006.01)
*A01C 7/20* (2006.01)
*A01B 29/04* (2006.01)
*A01B 23/06* (2006.01)
*A01B 39/08* (2006.01)

(52) U.S. Cl.
CPC .............. *A01C 7/208* (2013.01); *A01B 23/06* (2013.01); *A01B 29/04* (2013.01); *A01C 5/068* (2013.01); *A01B 39/08* (2013.01)

(58) Field of Classification Search
CPC ......... A01B 23/06; A01B 29/04; A01B 39/08; A01C 5/068
See application file for complete search history.

(56) References Cited

U.S. PATENT DOCUMENTS

| 166,597 | A | 8/1875 | Evans |
| 700,109 | A | 5/1902 | Wilkinson |
| 907,278 | A | 12/1908 | Patrick |
| 952,447 | A | 3/1910 | Hammonds |
| 974,247 | A | 11/1910 | Douglass et al. |
| 1,059,534 | A | 4/1913 | Forrest |
| 1,377,073 | A | 5/1921 | Amon |
| 1,483,789 | A | 2/1924 | Earhart |

(Continued)

FOREIGN PATENT DOCUMENTS

| AU | 2017399124 A1 | 8/2019 |
| CA | 3052323 A1 | 8/2018 |

(Continued)

*Primary Examiner* — Gary S Hartmann
(74) *Attorney, Agent, or Firm* — Dorsey & Whitney LLP

(57) ABSTRACT

A press wheel includes a hub which rotates about an axis. A rim extends generally radially from the axis. The rim has a center plane defined as a plane perpendicular to the axis and generally bisecting the rim and defining the center of the wheel. The press wheel includes a plurality of tread portions extending away from the center plane. The plurality of tread portions have voids between adjacent tread portions on the same side of the rim, which in response to the wheel rotating, operably places consecutive adjacent tread portions proximal to the ground. The rim and tread portions are configured to contact the ground.

20 Claims, 38 Drawing Sheets

(56) References Cited

U.S. PATENT DOCUMENTS

| | | | | |
|---|---|---|---|---|
| 1,498,378 | A | 6/1924 | Irwin | |
| 2,039,166 | A | 4/1936 | Karl | |
| 2,061,694 | A * | 11/1936 | Cuddigan | A01B 39/08 172/526 |
| 2,401,577 | A | 6/1946 | Melling | |
| 2,601,591 | A | 6/1952 | Colombo | |
| 2,668,490 | A | 2/1954 | Oehler et al. | |
| 2,912,055 | A * | 11/1959 | Buddingh | A01B 39/08 172/526 |
| 2,991,836 | A | 7/1961 | Le Roy | |
| 3,173,498 | A * | 3/1965 | Heilbrun | A01B 39/08 172/540 |
| 3,212,585 | A * | 10/1965 | Bezzerides | A01B 39/08 172/142 |
| 3,306,371 | A | 2/1967 | Eugene | |
| 4,037,755 | A | 7/1977 | Reuter | |
| 4,070,974 | A | 1/1978 | Stacy, Jr. | |
| D305,337 | S | 1/1990 | Plummer | |
| 5,000,270 | A | 3/1991 | Phillips | |
| 5,341,754 | A | 8/1994 | Winterton | |
| 5,375,542 | A | 12/1994 | Schaffert | |
| 5,443,023 | A | 8/1995 | Carroll | |
| 5,497,836 | A | 3/1996 | Groff | |
| 5,517,932 | A | 5/1996 | Ott et al. | |
| D377,356 | S | 1/1997 | Bruns | |
| 5,628,372 | A | 5/1997 | Creyke | |
| 5,645,000 | A | 7/1997 | Carroll | |
| 5,662,173 | A | 9/1997 | Blesing | |
| D386,191 | S | 11/1997 | Bruns | |
| 5,732,780 | A * | 3/1998 | Nikkei | A01B 39/08 172/177 |
| D396,863 | S | 8/1998 | Bruns | |
| 5,896,932 | A | 4/1999 | Bruns et al. | |
| 5,970,891 | A | 10/1999 | Schlagel | |
| 6,119,608 | A | 9/2000 | Peterson et al. | |
| 6,314,897 | B1 | 11/2001 | Hagny | |
| 6,530,334 | B2 | 3/2003 | Hagny | |
| 6,918,343 | B2 | 7/2005 | Kester | |
| 7,246,563 | B2 | 7/2007 | Kester | |
| 7,322,302 | B1 | 1/2008 | Reidhar | |
| 7,520,338 | B2 | 4/2009 | Stokes | |
| D594,477 | S | 6/2009 | Dawson et al. | |
| D611,507 | S | 3/2010 | Martin | |
| 7,730,961 | B2 | 6/2010 | Ward et al. | |
| 7,975,629 | B1 | 7/2011 | Martin | |
| D663,326 | S | 7/2012 | Allensworth et al. | |
| 8,267,021 | B2 | 9/2012 | Mariman et al. | |
| 8,291,998 | B1 | 10/2012 | Berg et al. | |
| 8,333,161 | B2 | 12/2012 | Arnett et al. | |
| 8,356,563 | B2 | 1/2013 | Schaffert et al. | |
| 8,359,988 | B2 * | 1/2013 | Bassett | A01B 63/008 111/135 |
| 8,397,612 | B2 | 3/2013 | Koplin et al. | |
| 8,544,398 | B2 | 10/2013 | Bassett | |
| D699,267 | S | 2/2014 | Nelson | |
| 8,863,857 | B2 | 10/2014 | Bassett | |
| 8,910,581 | B2 | 12/2014 | Bassett | |
| 8,910,582 | B2 | 12/2014 | Mariman et al. | |
| 8,939,095 | B2 | 1/2015 | Freed | |
| D727,975 | S | 4/2015 | Brockway | |
| D727,976 | S | 4/2015 | Brockway | |
| 9,232,689 | B2 | 1/2016 | Trevino et al. | |
| 9,365,996 | B2 | 6/2016 | Brockway | |
| 9,516,803 | B1 * | 12/2016 | Rosenboom | A01C 5/068 |
| 9,681,599 | B2 | 6/2017 | Whalen et al. | |
| D844,675 | S | 4/2019 | Schaffert | |
| 10,383,274 | B2 | 8/2019 | Whalen et al. | |
| 10,624,252 | B2 * | 4/2020 | Nance | A01B 21/08 |
| D883,345 | S | 5/2020 | Schaffert | |
| 10,798,870 | B2 | 10/2020 | Schaffert | |
| 2011/0155031 | A1 | 6/2011 | Arnett et al. | |
| 2012/0048160 | A1 | 3/2012 | Adams et al. | |
| 2012/0210919 | A1 | 8/2012 | Van et al. | |
| 2012/0241181 | A1 | 9/2012 | Horsch | |
| 2012/0325133 | A1 | 12/2012 | Whalen et al. | |
| 2013/0160684 | A1 | 6/2013 | Whalen et al. | |
| 2013/0263767 | A1 | 10/2013 | Trevino et al. | |
| 2014/0033958 | A1 | 2/2014 | Bassett | |
| 2014/0116735 | A1 | 5/2014 | Bassett | |
| 2015/0075825 | A1 | 3/2015 | Dufty | |
| 2016/0014951 | A1 | 1/2016 | Stark et al. | |
| 2016/0050837 | A1 | 2/2016 | Schaffert et al. | |
| 2016/0106025 | A1 | 4/2016 | Nelson et al. | |
| 2016/0120096 | A1 | 5/2016 | Patwardhan et al. | |
| 2017/0208736 | A1 | 7/2017 | Schaffert et al. | |
| 2019/0364747 | A1 | 12/2019 | Freeman | |
| 2020/0396894 | A1 * | 12/2020 | Radtke | A01B 63/008 |
| 2021/0161063 | A1 | 6/2021 | Schaffert et al. | |

FOREIGN PATENT DOCUMENTS

| | | | |
|---|---|---|---|
| DE | 42 35 389 | * | 3/1994 |
| EP | 1964459 B1 | | 12/2011 |
| WO | 2018148776 A1 | | 8/2018 |

* cited by examiner

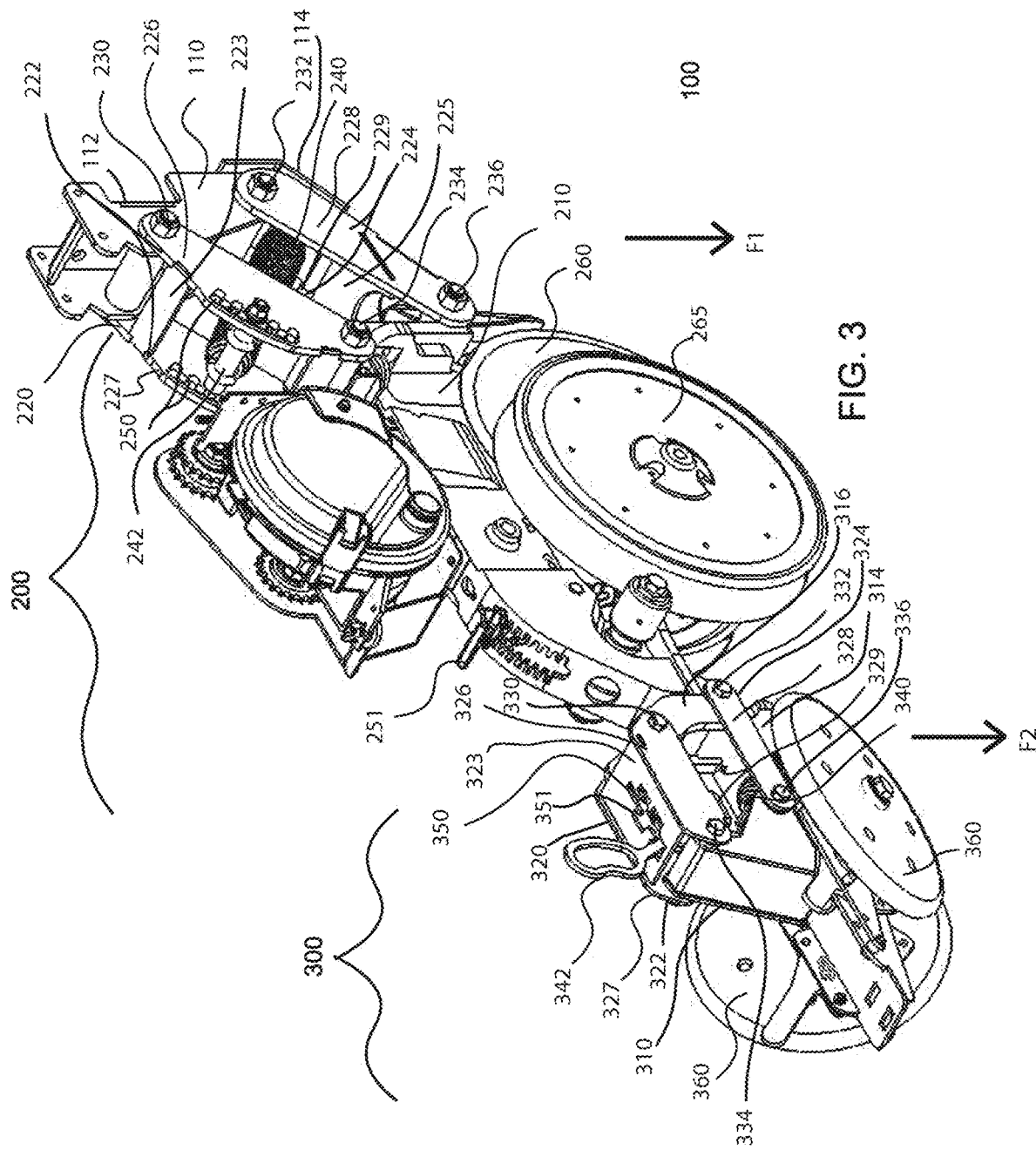

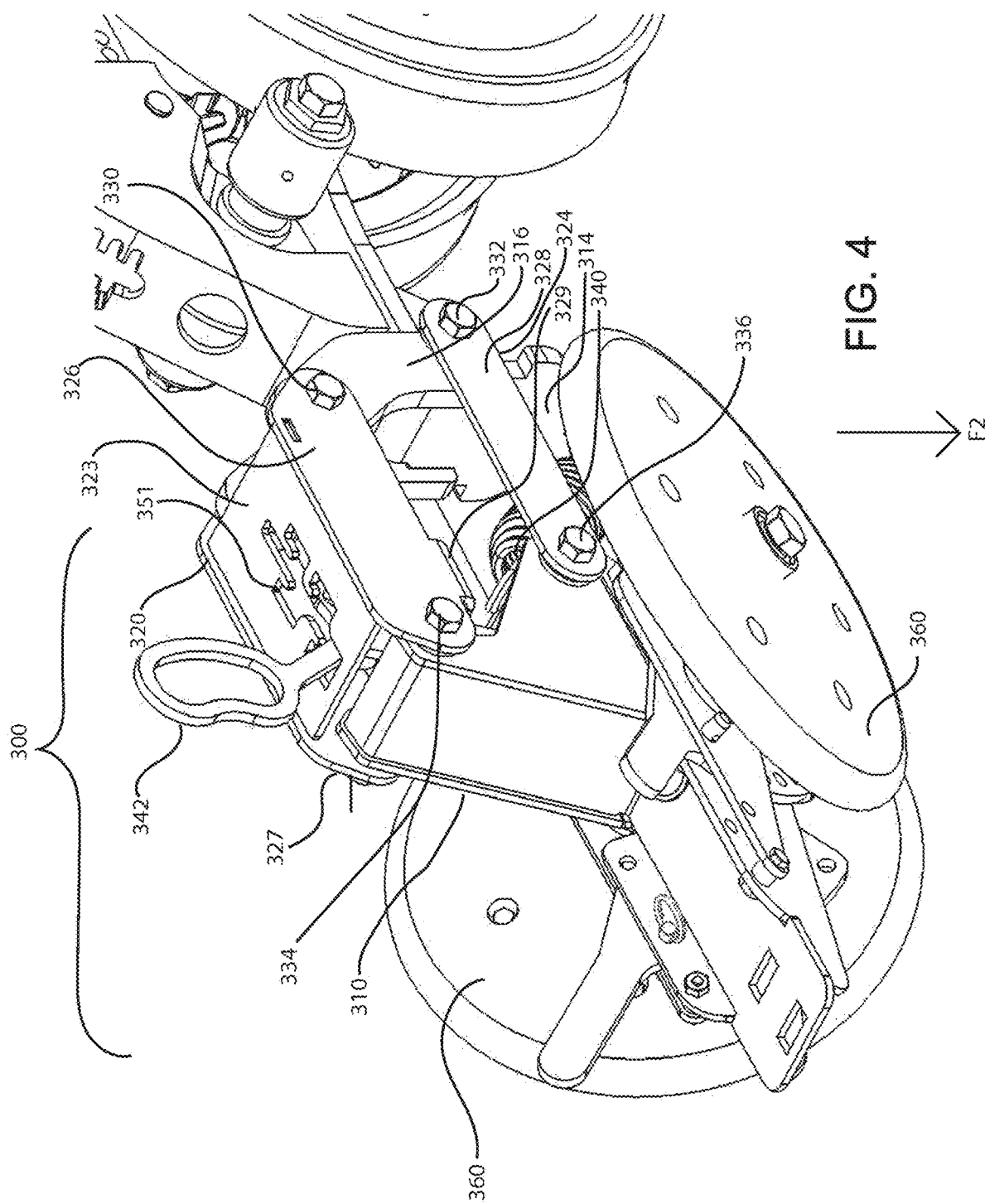

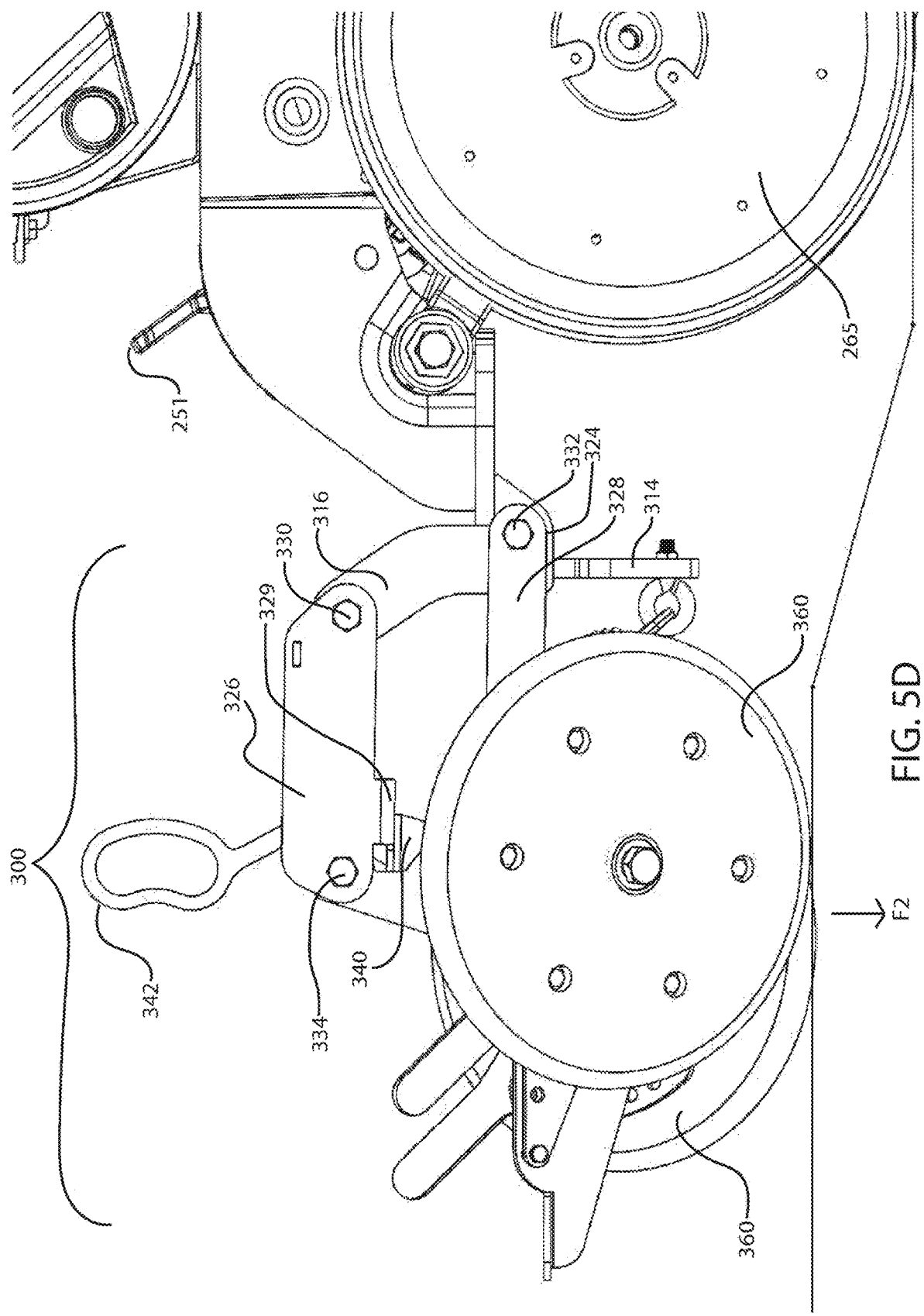

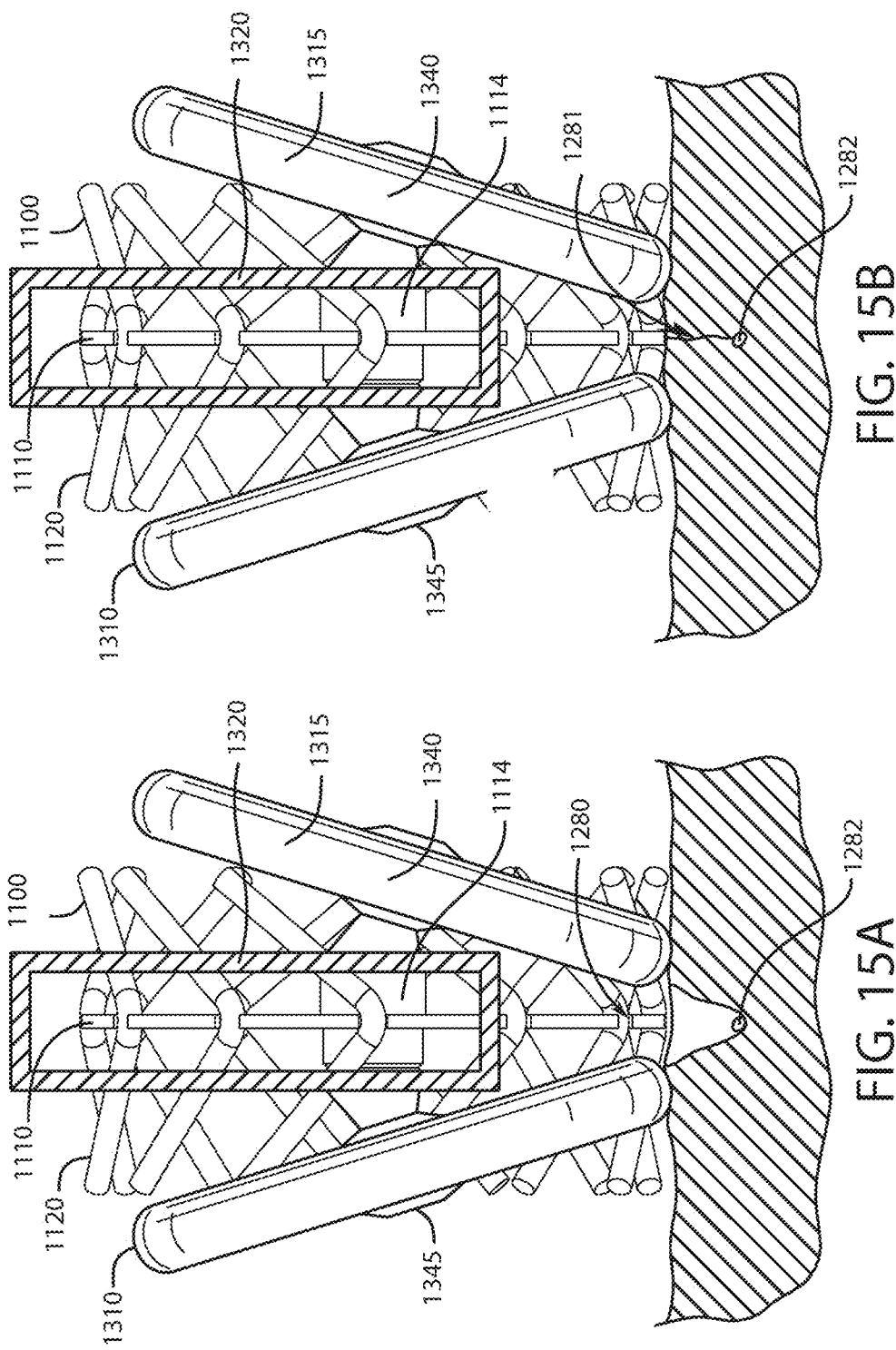

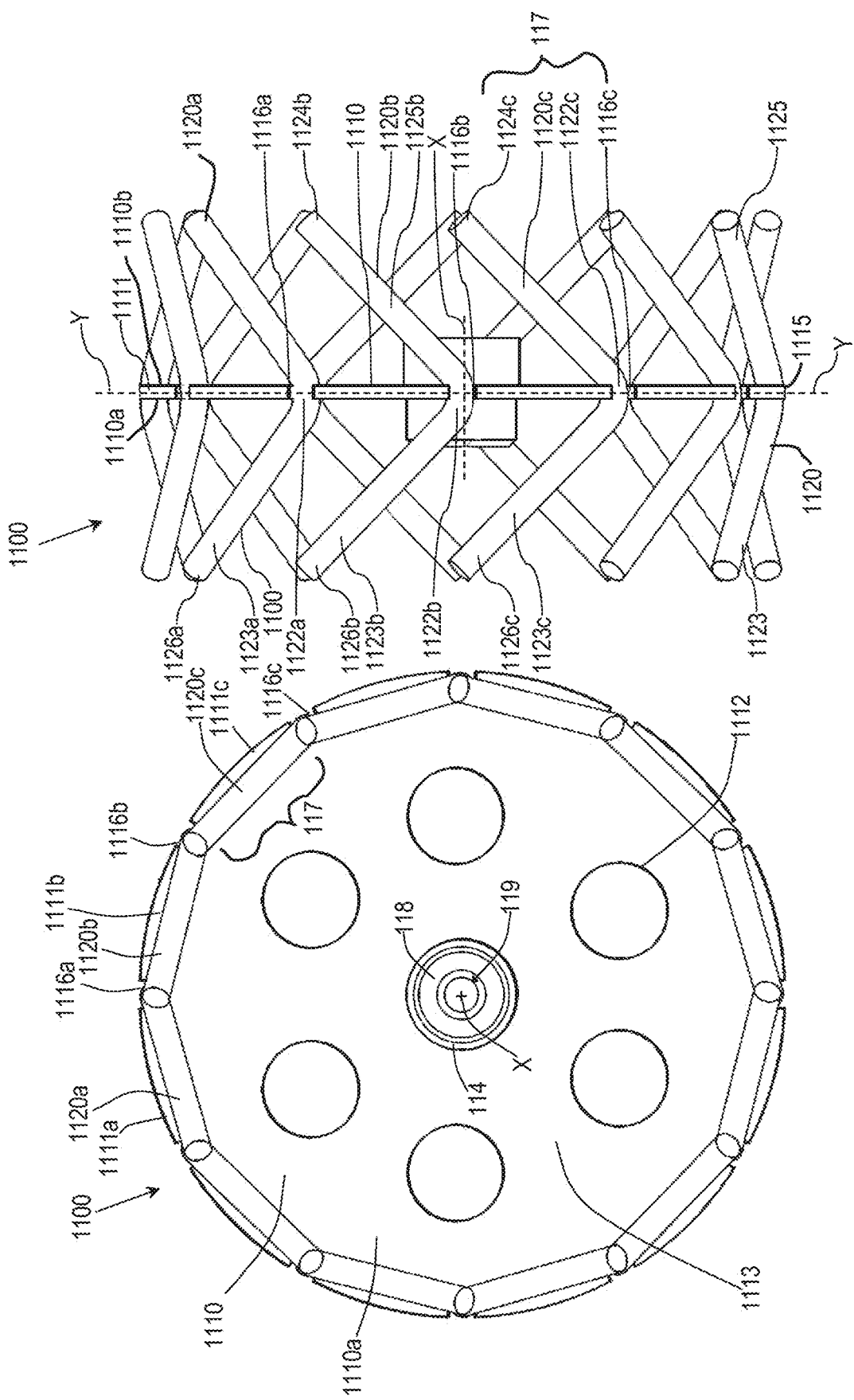

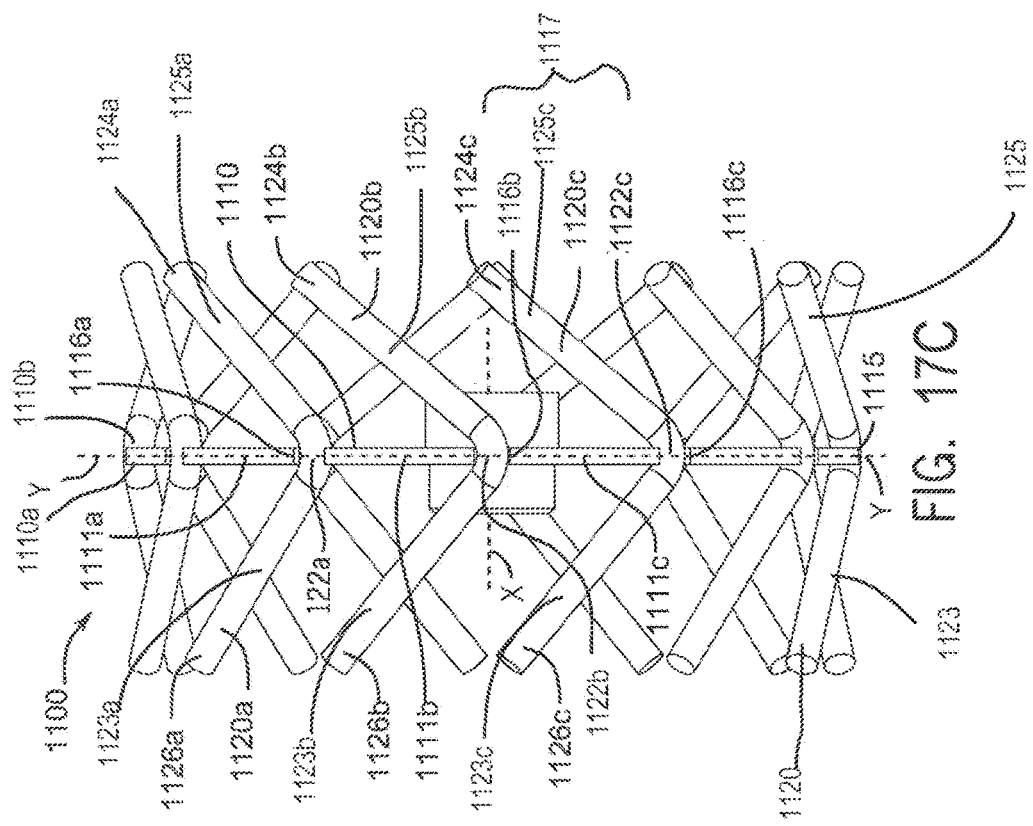
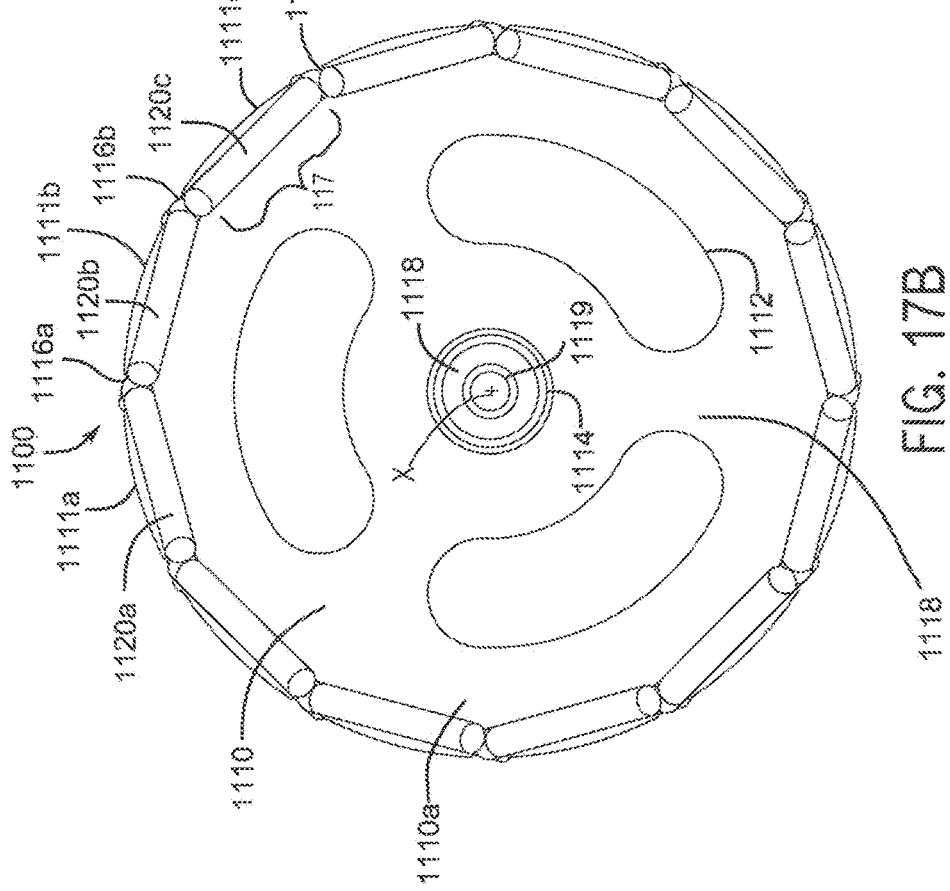

PRESS WHEEL WITH ANGLED TINES

CROSS-REFERENCE TO RELATED APPLICATIONS

This application is a continuation application of U.S. Non-Provisional application Ser. No. 17/002,084 filed 25 Aug. 2020 entitled "Trailing arm device and assembly with parallel linkage," which is a continuation application of U.S. Non-Provisional application Ser. No. 14/835,553 filed 25 Aug. 2015 entitled "Press Wheel," which claims priority to U.S. Provisional Application No. 62/041,551 filed 25 Aug. 2014 entitled "Press wheel," all of which are hereby incorporated by reference herein in their entireties.

TECHNICAL FIELD

The technical field relates to agricultural seed planters and drills. More specifically, the technical field relates to parallel linkage-connecting mechanisms between opening assemblies and closing assemblies on planters and drills.

BACKGROUND

Agricultural seed planting is typically accomplished by multi-row planters. Each planter may include multiple row units adapted for opening a seed furrow, depositing seeds within the furrow, and closing the seed furrow around the seeds. In some cases, each row unit of the planter may also open a fertilizer furrow adjacent to each seed furrow, deposit liquid fertilizer in each fertilizer furrow, and close each fertilizer furrow.

Some planters are equipped or retrofitted to be equipped with fertilizer depositing equipment (e.g., fertilizer furrow opener discs and fertilizer deposit tubes) located on a leading or front side of the planter. Planters so configured can have problems in fields with moist or wet soil. Specifically, disturbing the soil with the fertilizer equipment located in front of the planter gauge wheels can cause the moist or wet soil to accumulate on the gauge wheels. The soil accumulation increases the effective diameters of the gauge wheels and causes the planter to run too shallow with respect to the depositing of the seed in the seed furrows.

Planters are increasingly used in no-till situations, resulting in the planter traversing fields with substantial deviation in the field surface and a substantial amount of obstructions (e.g., debris, clods, stubble, old furrows, etc.). Furthermore, in certain Midwest farm areas, ditches must be plowed in fields between planting seasons to facilitate the drainage of spring showers from the fields. Most planters have proven ineffective in such rough field surface conditions. It is not unusual for the use of planters in rough field conditions to result in seed depths that radically range between too deep and too shallow. Also, it is not unusual for the use of planters in such field conditions to result in the planter components being damaged.

There is a need in the art for a planter capable of providing liquid fertilizer in rough fields without adverse impact on seed depth and damage to planter components. There is also a need in the art for a planter capable of maintaining a parallel relationship to the field with adequate but separate pressure adjustments between opener assemblies and closer assemblies.

A press wheel or firmer wheel is a wheel attachment on an agricultural unit for compacting the soil in the seeded furrows after the soil has been planted and, in some instances, after a closing wheel has deposited loose soil overtop of the seed. Traditional press wheels are frequently rubberized tires that are pulled across a furrow. This type of press wheel tire tends to smear the soil over the area on which they press. In response to a hot, windy day, the soil will crack and become like concrete over the seed trench area.

The use of press wheels on planters to compact soil around and over seeds deposited in the bottom of a seed furrow has been practiced for many years. The purpose of compacting the soil is to promote seed germination by minimizing air pockets, thus improving the capillary action of the moisture in the soil as well as reducing wind erosion of the soil over the seed. Traditional press wheels compress and mold the bottom of the furrow to establish an environment conducive to good germination, but they tend to displace the soil away from the furrow by smashing it with portions other than the tread of the wheel. Forcing the soil in undesired directions may result in soil conditions conducive to drying and cracking.

Some traditional press wheels, particularly in dry soil conditions, cause the sides of the furrow to cave in as the press wheels pass and the seeds are then covered by random depths of the soil. Movement of the press wheels through the furrow actually promotes collapse of the furrow sides. The sides of the furrows have little resistance to being washed in the first time it rains. The loosened condition of the sides of the furrows provides little resistance to wind erosion as well as to erosion from rain.

Some traditional wheels do not even compress over the top of the furrow but instead work the sides of the furrow again, leaving undesirable conditions on the top of the furrow. These wheels also may form rooster tails, kicking up dirt in random directions and leaving it uncompressed.

Another problem is that to avoid plugging of the press wheels. For heavy liquid fertilizers, it has been found that the liquid dispensing device in some instances functions most efficiently if the liquid fertilizer is diluted so that the fertilizer flows evenly and without plugging. However, the greater volume of liquid in the furrow additionally produces wetness in the furrow that can cause the press wheels to build up with mud, which, in turn, leads to closing problems with the press wheels.

SUMMARY

In one embodiment of an agriculture planter, the planter may include a planter frame, a seed hopper and a trailing arm assembly. The planter frame may include a hitch tongue extending forward from the planter frame. The trailing arm assembly may be coupled to a rear portion of the planter frame via a parallel linkage and extend rearward from the planter frame, and include separate, but adjustable, trailing arm assemblies for the opening implements and the closing implements.

In accordance with various embodiments, a trailing arm assembly may include a frame bracket attachable to a planter towing frame, a first frame, and a parallel linkage connecting the frame bracket and the first frame with a first pivot and a second pivot on the frame bracket and a first pivot and a second pivot on the first frame. The trailing arm assembly may also include an adjustable biasing member extending from the parallel linkage to the frame bracket. The parallel linkage may be connected between the first frame and the frame bracket such that the parallel linkage maintains a parallel orientation of the first frame. The orientation may be orthogonal to the resultant downward force F1 exerted by the adjustable biasing member on the parallel linkage. The adjustable biasing member is adjustably connected to a portion of the parallel linkage and adjustably engages a plurality of detents formed in the portion of the parallel linkage, wherein the adjustable biasing member is attached to the first frame below at least one pivot of the parallel linkage. The parallel linkage may be a four bar parallel linkage having an upper set of links and a lower set of links. The upper set of links in the four bar parallel linkage may be cross-braced with one or more plates forming a continuous frame between a first side and a second side of the upper link. The lower set of links in the four bar parallel linkage may be cross-braced with one or more plates forming a continuous frame between a first side and a second side of the lower link.

In accordance with various embodiments, the first frame forms a portion of an opener assembly including an opener disk and a gauge wheel. The first frame includes an adjustment mechanism operable to change the position of the gauge wheels relative to the first frame. The trailing arm assembly may include a second frame. The second frame may be a closer assembly frame having one or more closing wheels. The first frame and the second frame may be connected to one another such that they operatively move independently with respect to each other in the vertical direction and the second frame is connected to the first frame via a second parallel linkage. The second parallel linkage may be a four bar parallel linkage having a pair of upper links and a pair of lower links. The upper set of links in the four bar parallel linkage may be fixedly connected to one another by a plate. The second parallel linkage may include a second biasing member. The second biasing member may be adjustable.

In accordance with various embodiments, an adjustment lever may be connected to a first end of the biasing member with the second end of the biasing member connected to the first frame. Movement of the adjustment handle in a first direction causes the force from the biasing member to increase and movement of the adjustment handle in the opposite direction causes the force from the biasing member to decrease. The upper set of links in the four bar parallel linkage may be connected via a plate having an aperture defined therein with the aperture forming a plurality of separate detents which hold the adjustment lever movably in place, while allowing that the adjustment lever to be adjustable between the separate detents. The trailing assembly may include one or more gauge wheels adjustably connected to the first frame and connected to an adjustment handle such that movement of the adjustment handle changes the vertical relationship between the one or more gauge wheels and the first frame.

In accordance with various embodiments, a trailing assembly wheel may include a hub which rotates about an axis. The wheel may also include a rim extending generally radially from the axis. The rim may have a center plane. The center plane may be defined as a plane perpendicular to the axis and generally bisecting the rim. The center plane may define the center of the wheel. The wheel may also include a plurality of tread portions extending away from the center plane. The plurality of tread portions may have voids between adjacent tread portions on the same side of the rim. In response to the wheel rotating and placing adjacent treads proximal to the ground, the voids between the adjacent tread portions may allow soil to pass between the treads when the treads contact the ground. The wheel may be at least one of a press wheel or a closing wheel.

In accordance with various embodiments, the tread portions may be formed from a tine extending proximal to the radial surface of the rim in a direction that includes a component in a radial direction, a component in an axial direction, and/or a component in the tangential direction. Each tine may have a connection end and a termination end. The plurality of tines positioned on the same side of the rim may be structurally related to one another only by their attachment to the rim. The connection end of a first tine may be in axial alignment with the termination end on an adjacent tine. The plurality of tines may include opposing tines that are formed symmetrically on opposite sides of the rims. Each of the opposing tines may reside in individual planes. The opposing tines may be formed from a bent length of elongated metal. The distance from the axis to any point along the length of any of the tines is equal to or less than the distance from the axis to an exterior edge of the rim.

In accordance with various embodiments, an agricultural seed planter and drill assembly may include a pair of closing wheels operable to close a furrow. The agricultural seed planter and drill assembly may also include a press wheel. The press wheel may have a hub which rotates about an axis. The press wheel may also have a rim extending generally radially from the axis. the rim may have an opposing first surface and second surface that are perpendicular to the axis and are located approximately at the center of the press wheel. The press wheel may include a plurality of tread portions extending away from the rim. The plurality of tread portions may have voids between adjacent tread portions on the same side of the rim. The voids may be located such that in response to the press wheel rotating and placing adjacent treads proximal to the ground, the voids between the adjacent treads limit the press wheel from contacting the ground by components of the press wheel other than the rim and/or the tread portions. The press wheel may be centered behind the pair of closing wheels operable to engage the top of the closed furrow.

In accordance with various embodiments, each of the tread portions may be formed from a tine extending proximal to the radial surface of the rim in a direction that includes a component in a radial direction, a component in an axial direction, and/or a component in the tangential direction. Each tine may have a connection end and a termination end. The plurality of tines positioned on the same side of the rim may be structurally related to one another only by their attachment to the rim. The connection end of a first tine is in axial alignment with the termination end on an adjacent tine. The plurality of tines may include opposing tines that are formed symmetrically on opposite sides of the rims. Each of the opposing tines may be planer. The opposing tines are formed from a bent length of elongated metal. A portion of the rim extends radially beyond the plane formed by the tine proximal to that portion of the rim. distance from the axis to the any point along the length of any of the tines is equal or to or less than the distance from the axis to an exterior edge of the rim. The rim may have a radial surface which extends radially beyond the plane formed by the tine proximal to that portion of the rim. The press wheel may be positioned relative to at least one of the closing wheel and an opening wheel such that the radial surface of the rim is operable to cut the surface of the ground above the planting location of the seed.

In another example, a press wheel is disclosed. The press wheel includes a hub, which rotates about an axis. The press wheel further includes a rim extending generally radially from the axis. The rim defines a circumferential portion and a center plane defined as a plane perpendicular to the axis and bisecting the rim. The press wheel further includes a plurality of tread portions connected to the rim along the circumferential portion and defining voids between adjacent tread portions. Each of the tread portions includes a tine having a first tine portion extending from a first side of the rim and a second tine portion extending from a second side of the rim. The first and second tine portions define a tine plane that is inset relative to the circumferential portion and intersecting a tine plane of an adjacent tread portion adjacent the circumferential portion.

In another example, the tine may include a connection end connected to the rim. The first and second tine portions extend from the connection end. Further, the first tine portion may define a first tine portion terminal end axially aligned with the connection end of the adjacent tread portion. The connection end may be aligned with the circumferential portion. The connection end and an outermost edge of the rim adjacent the connection end maybe configured to contact aground surface together.

In another example, the tine plane may define a chord with each of the first and second sides of the rim. The tine plane may be perpendicular to the center plane. The first and second tine portions may form a V-shaped pattern.

In another example, a wheel is disclosed. The wheel includes a hub, which rotates about an axis. The wheel further includes a rim extending generally radially from the axis. The rim may have a center plane defined as a plane perpendicular to the axis and generally bisecting the rim. The wheel further includes a plurality of tread portions extending away from the center plane. The plurality of tread portions may have voids between adjacent tread portions that are located on a same side of the rim. Further, in response to the wheel rotating, consecutive adjacent tread portions may be placed proximal to the ground. Further, each of the tread portions includes a tine extending away from the center plane and having a component in one or more of a radial direction, a component in an axial direction, or a component in a tangential direction. The tine portion may define a chord relative to a radial surface the rim.

In another example, the rim and the one or more of the tread portions may be configured to contact the ground at the same time. Further, the rim and one or more of the tread portions may be positioned in relationship to one another and may be configured such that both the rim and one or more of the tread portions contact the ground for firming a surface of soil of seeded furrows to aid in the sprouting of plants. For example, an exterior edge of the rim may be coplanar with a portion of each of a first tine portion of the tine that extends from a first side of the rim, and a second tine portion of the tine that extends from a second side of the rim, opposite the first side.

In another example, a terminal end of the tine may be axially aligned with a connection end of an adjacent tine. The tine portion may define the chord as being aligned with, or separated form, a chord of an adjacent tread portion. In some cases, the tine may be seated in the rim.

In another example, a wheel is disclosed. The wheel includes a hub, which rotates about an axis. The wheel further includes a rim extending generally radially from the axis. The rim may define a circumferential portion and a center plane defined as a plane perpendicular to the axis and bisecting the rim. The wheel further includes a plurality of tread portions extending away from the center plane. The plurality of tread portions may have voids between adjacent tread portions that are located on a same side of the rim, which in response to the wheel rotating operably places consecutive adjacent tread portions proximal to the ground. Further, each of the tread portions may be formed from a tine extending from a radial surface of the rim in a direction that includes a component in one or more of a radial direction, a component in an axial direction, or a component in a tangential direction. Further, the tine and the radial surface may define a tine plane that forms a chord along the radial surface that interests no more than two chords of adjacent tread portions within the circumferential portion.

In another example, the tine may include a connection end extending from the radial surface, and a terminal end axially aligned with the circumferential portion defined by an outer edge of the rim about the radial surface. The terminal end may be axially aligned with a terminal end of an adjacent tread portion. Further, a portion of the connection end may be flush with the outer edge. The circumferential portion may define an arcuate circumferential edge between adjacent tread portions.

BRIEF DESCRIPTION OF THE DRAWINGS

FIG. 3 is a top-rear isometric view of a trailing arm assembly forming part of the planter.

FIG. 4 is a top-rear isometric view of a closer trailing arm assembly forming a part of the trailing arm assembly of FIG. 3.

FIG. 5D is a side view of a closer trailing arm assembly forming a part of the trailing arm assembly of FIG. 5C.

FIG. 15A illustrates a sectional view of the agricultural planter looking rearward, showing an open furrow in accordance with an embodiment of the present invention.

FIG. 15B illustrates a sectional view of the agricultural planter looking rearward, showing a closed furrow in accordance with an embodiment of the present invention.

FIG. 16B illustrates a side view of the press wheel shown in FIG. 16A.

FIG. 16C illustrates a front view of the press wheel shown in FIG. 16A.

FIG. 17B illustrates a side view of the press wheel shown in FIG. 16A.

FIG. 17C illustrates a front view of the press wheel shown in FIG. 16A.

DETAILED DESCRIPTION

Figure 1:
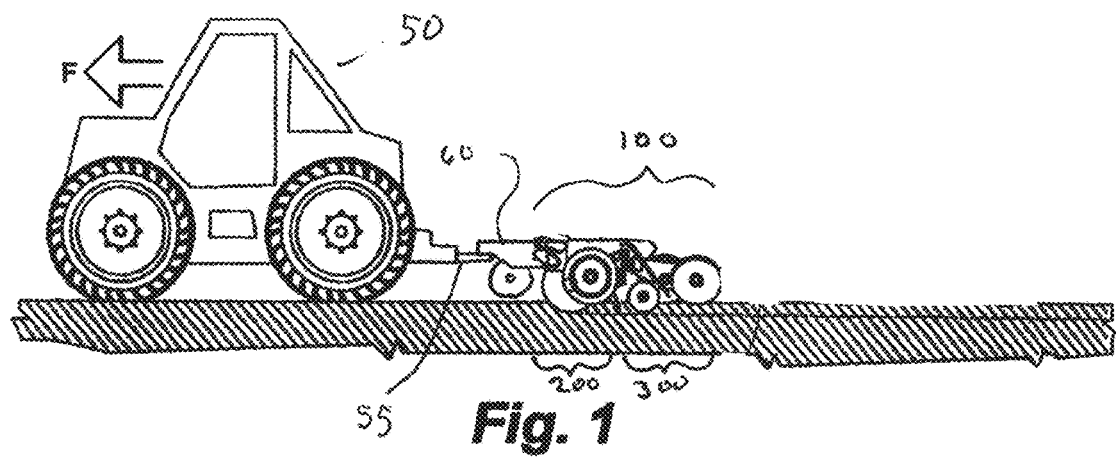
FIG. 1 is a side view of an agriculture tractor pulling an agriculture planter towing a liquid fertilizer tank trailer.

Disclosed herein is an agriculture planter having one or more trailing arm assemblies 100. Each trailing arm assembly 100 may be variously equipped with a fertilizer furrow opener assembly 200. Each trailing arm assembly 100 may also be variously equipped with a trailing furrow closer assembly 300. The furrow opener assembly 200 may include an opener disc 260. The furrow closer assembly 300 may include a closer wheel 360.

In accordance with one embodiment, the fertilizer furrow opener assembly 200 may be connected to a planter frame 60 via a parallel linkage 220, such as a four bar parallel linkage. This configuration, along with the location of the trailing arm assemblies 100, provides a number of advantages. For example, the parallel linkage 220 allows the furrow opener assembly 200 and the furrow closer assembly 300 to move vertically following the terrain (e.g., contours of the field), obstacles (e.g., debris or the like) or similar changes in the field. The may be connected by a pivoting hitch 530 (see FIG. 9). The movement allows the trailing arm assemblies 100 to follow or oscillate up and down as the discs and wheels negotiate over or through an obstruction in a field surface 400 without adversely impacting seed deposit depth or resulting in damage to the planter components. The parallel linkage 220 allows the trailing arm assemblies 100 to operate in substantially the same orientation throughout its range of motion relative to the planter frame 60. For example, the orientation may be parallel to the frame, the field or the original position of the trailing arm assembly. The position may be in a plane that is orthogonal to the downward force exerted on the trailing arm assemblies 100 by a biasing member. The orientation may be consistent through its entire range of motion. The ability of the trailing arm assemblies 100 to adjust to the contours of the field surface 400 facilitates the disc (e.g., 260) being in consistent contact with the field surface 400 to improve opening a fertilizer furrow and the trailing furrow closer wheel 360 being in contact with the field surface 300 to improve closing the seed and fertilizer furrows. The ability of the trailing arms 100 to oscillate over variances in the field surface 400 allows for the discs 260, 360 and wheel 265 to maintain a force in a consistent downward direction. In other words, the trailing arms 100 have relatively constant downward pressure, which allows for continuous opening and closing of furrows due to the constant pressure, which limits the seed depth from becoming too shallow or too deep.

Also, the trailing arm 100 being located at the rear or trailing end of the planter eliminates the issues with soil buildup on the gauge wheels 265 caused by fertilizer equipment being located on the front or leading end of the planter. The following discussion may include components for opening a fertilizer furrow, delivering liquid fertilizer from the distribution tube into the furrow, and closing the seed and fertilizer furrows.

Figure 2:
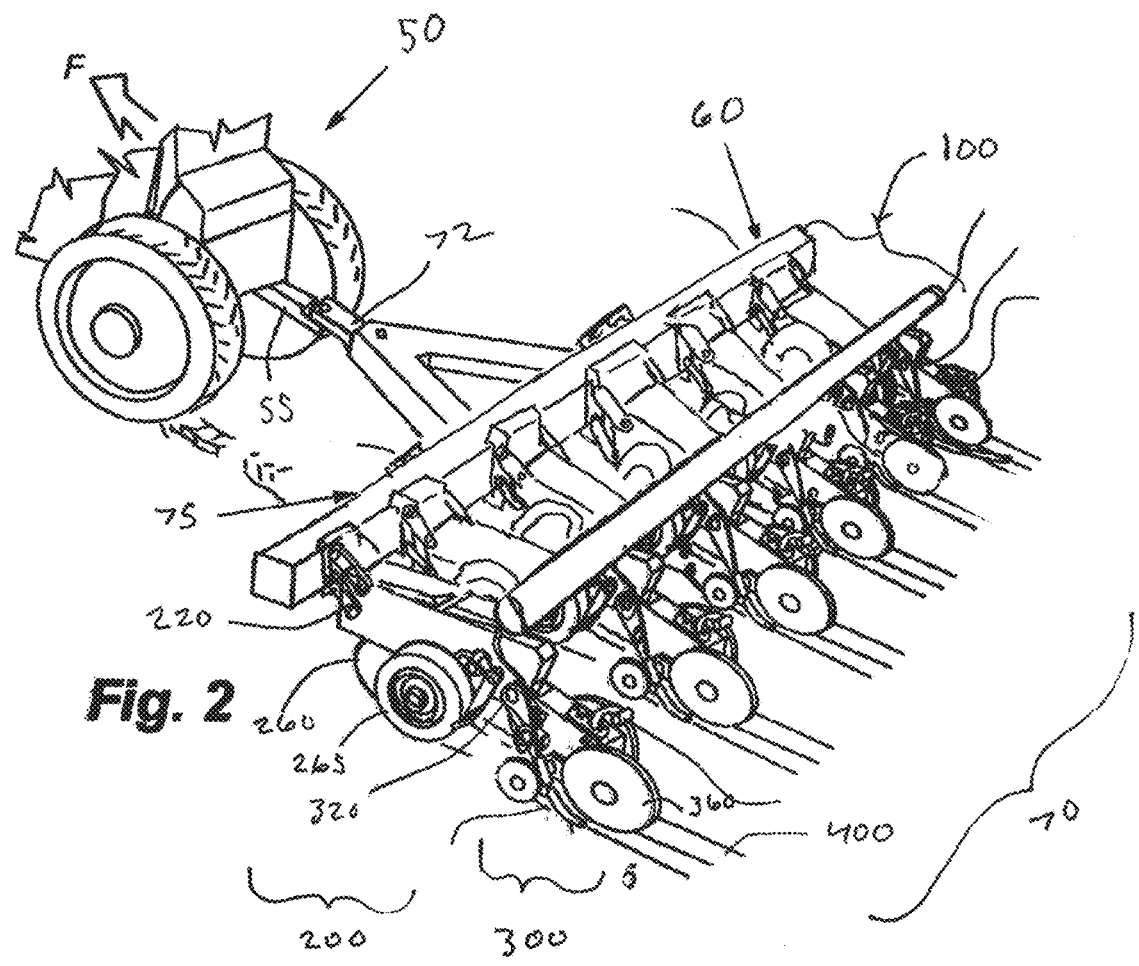
FIG. 2 is a top-rear isometric view of the planter.

For a detailed discussion of the planter and its features, reference is made to FIGS. 1 and 2. FIG. 1 is a side view of an agriculture tractor 50 pulling the agriculture planter 70 and FIG. 2 is a top-rear isometric view of the planter 70.

As shown in FIG. 1, the planter 70 may include a tongue or hitch 72 for hitching the planter 70 to the hitch 55 of the tractor 50. The tractor 50 tows the planter 70 in the direction of arrow F and provides power to the planter 70 (e.g., via a power take off ("PTO")) for powering the operations of the planter 70.

As illustrated in FIG. 2, the planter 70 may include a frame 75 from which the hitch 72 extends and the various planter components are supported. The various components of the planter 70 may include a plurality of trailing arm assemblies 100. The trailing arm assemblies 100 may function as row units for planting seeds and distributing liquid fertilizer.

For a discussion of the various components of the trailing arm assembly 100 and the operation of those components, reference is made to FIGS. 3-8. Each trailing arm assembly may include an opener assembly 200. Each trailing arm assembly 100 may additionally or alternatively include a closer assembly 300. The opener assembly 200 may include an opener frame 210. One or more of a furrow opener disc 260, a gauge wheel 265, seed hopper, and fertilizer reservoir may be attached to the opener frame 210. The seed furrow opener disc 260 creates a furrow in which the planter 70 deposits seed in a manner well known in the art. The gauge wheel 265 assists in determining the depth at which the planter opener assembly 200 deposits the seed. The gauge wheel 265 is mounted to the frame 210 via a gauge wheel lever arm, which is pivotally coupled to the frame 210.

The opener trailing arm assembly 200 may be coupled to the frame 75 via a connection that allows the trailing arm to move relative to the frame 75. In accordance with various embodiments, the connection may be configured such that the approximate relative orientation between the opener trailing arm assembly 200 and the frame 75 may be maintained through the range of motion of the trailer arm assembly 200. Any mechanical connection operable to maintain this relationship may be used. For example, the opener trailing arm assembly 200 may connect to the frame 75 via a parallel linkage 220. In various embodiments, the parallel linkage 220 may be a four bar parallel linkage.

While an opener four bar parallel linkage 220 is shown in the figures, other connection mechanisms may be used as well. In various other examples, a slide mechanism, rail mechanism or a similar mechanism may connect the trailing arm assembly to the frame.

Figure 6A:
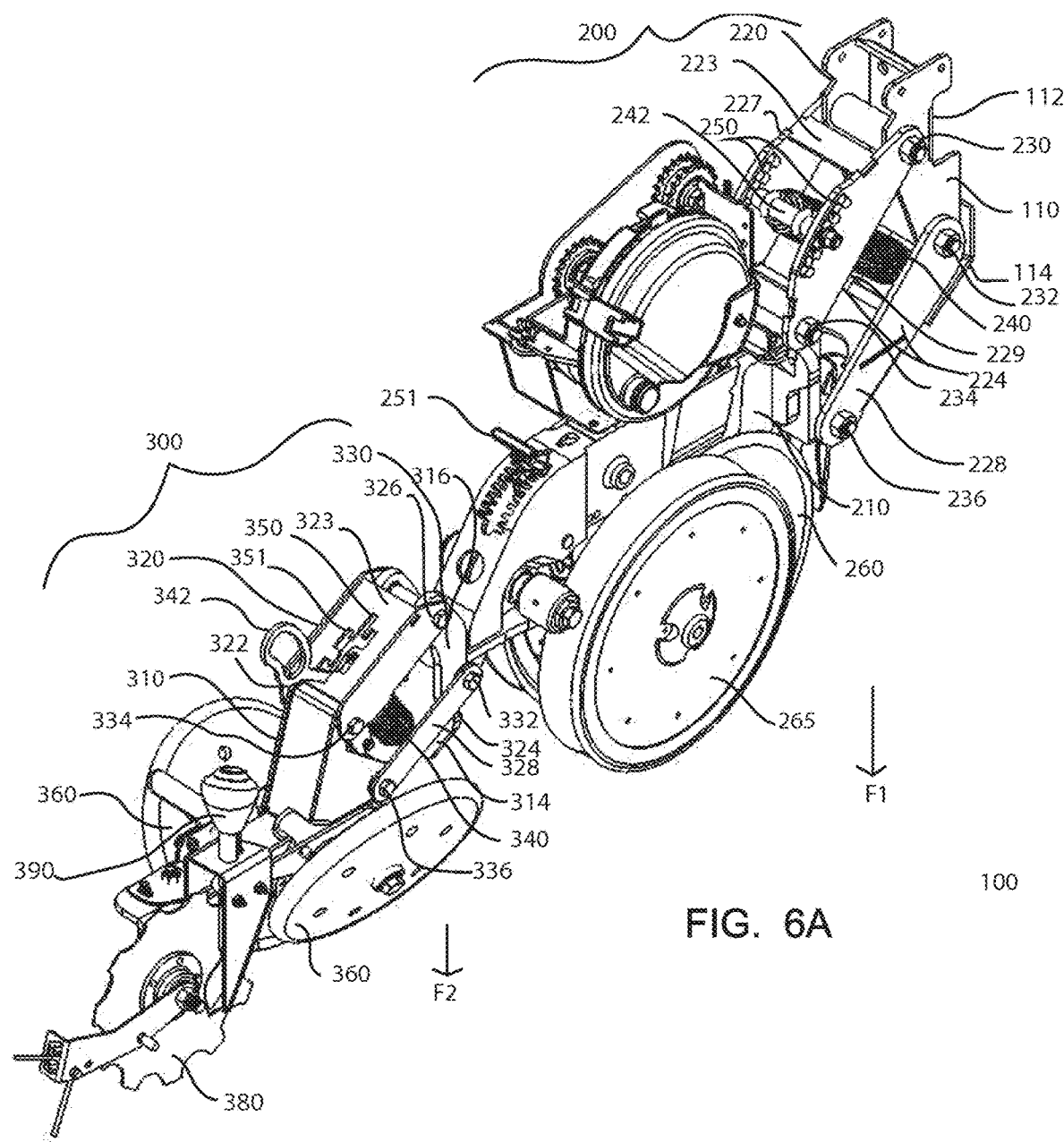
FIG. 6A is a top-rear isometric view of a trailing arm assembly forming part of the planter having a fertilizer disc and a fertilizer distribution system.
Figure 6B:
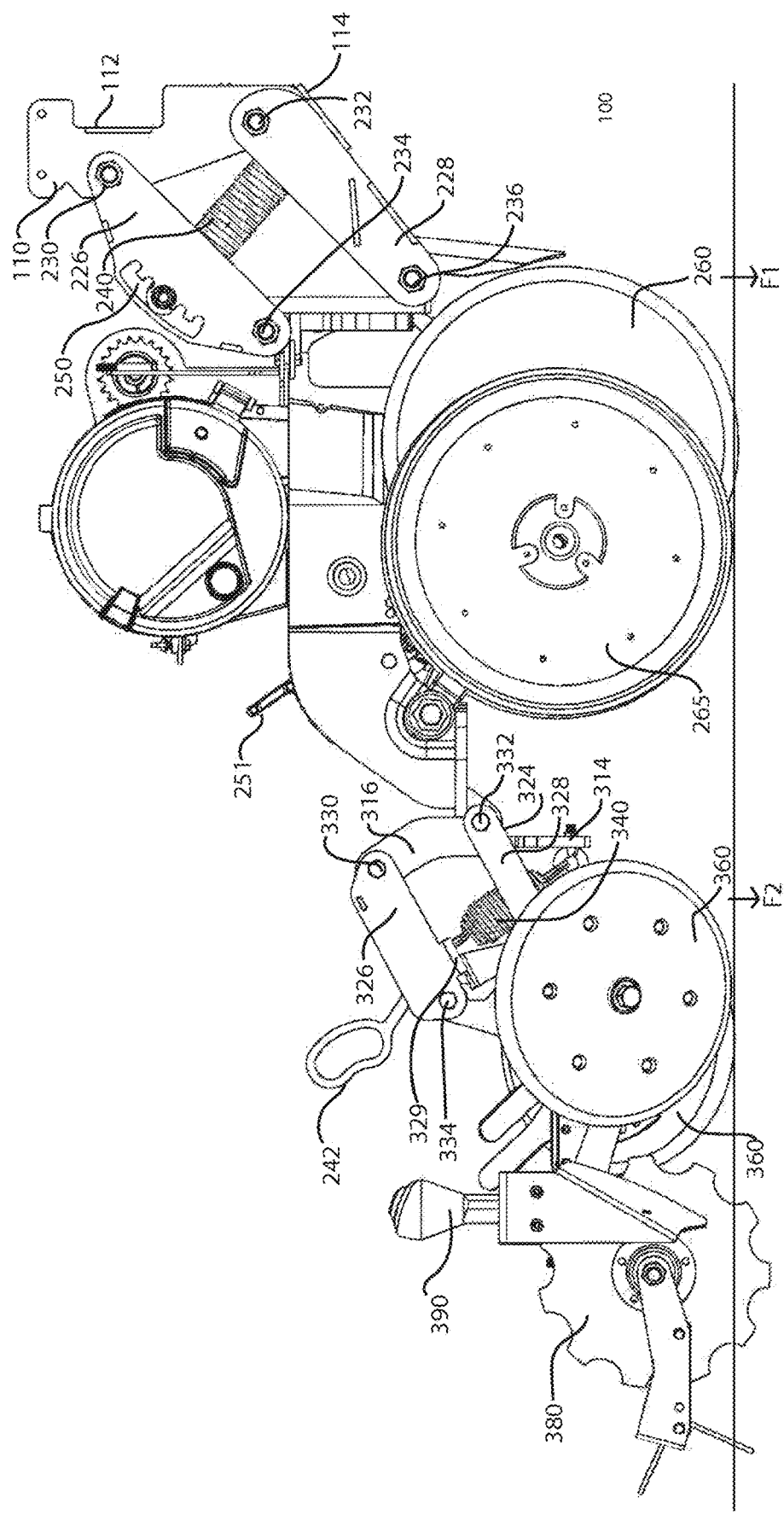
FIG. 6B is a side view of a trailing arm assembly forming part of the planter having a fertilizer disc and a fertilizer distribution system.
Figure 6C:
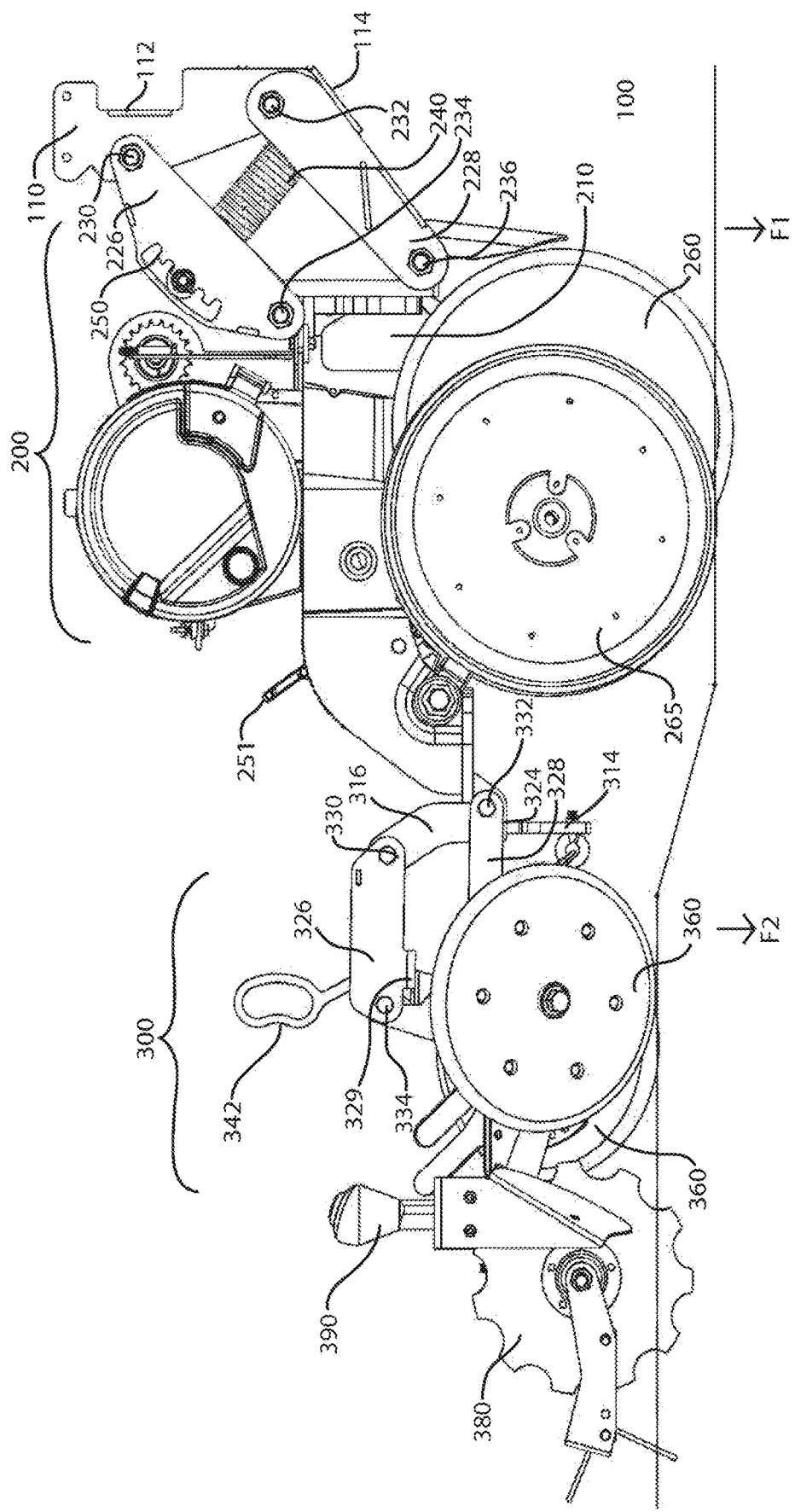
FIG. 6C is a side view of a trailing arm assembly forming part of the planter with the closer trailing arm assembly in an articulated position relative to the position shown in FIG. 6B.
Figure 7A:
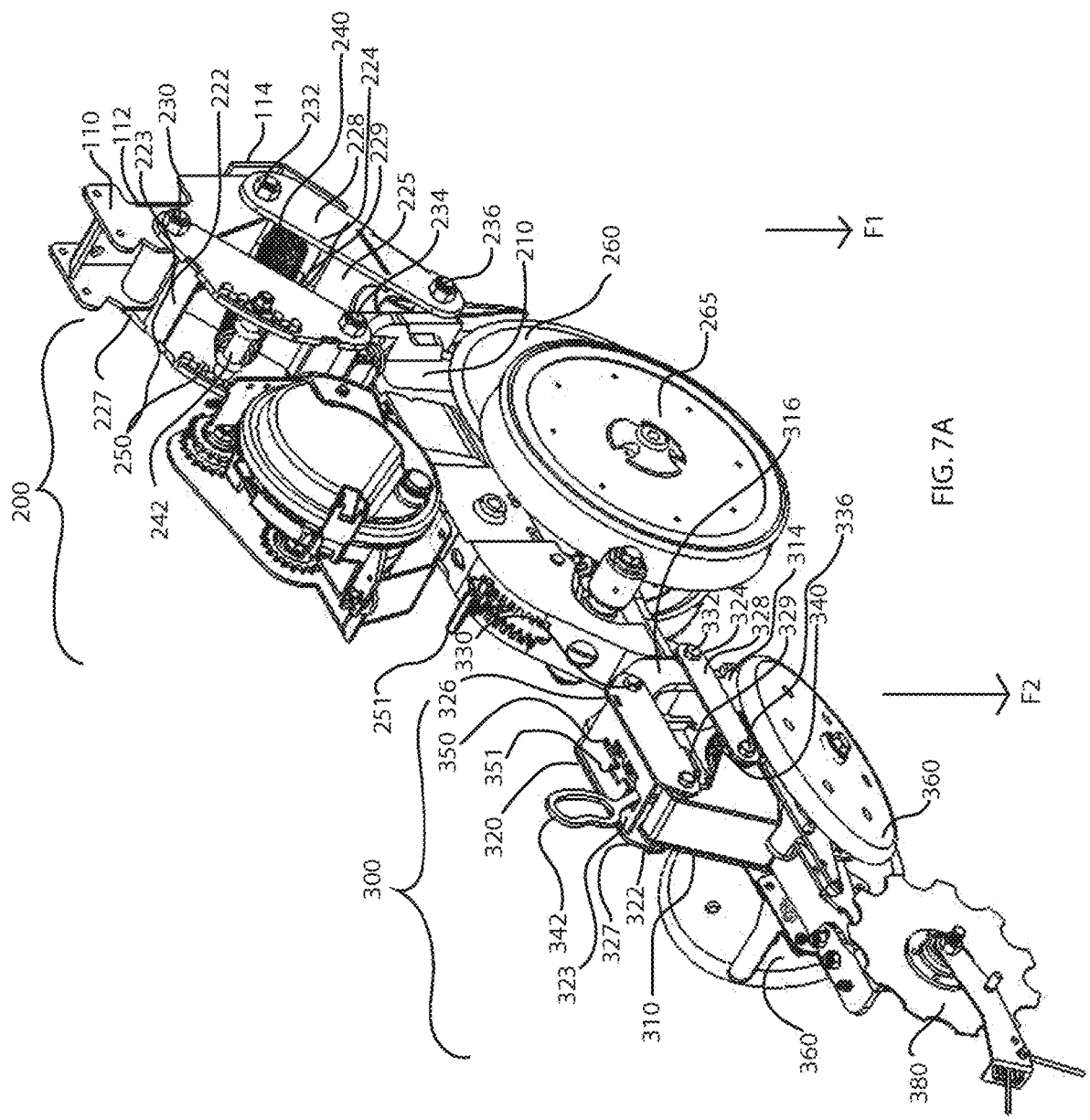
FIG. 7A is a top-rear isometric view of a trailing arm assembly forming part of the planter having a fertilizer disc.
Figure 7B:
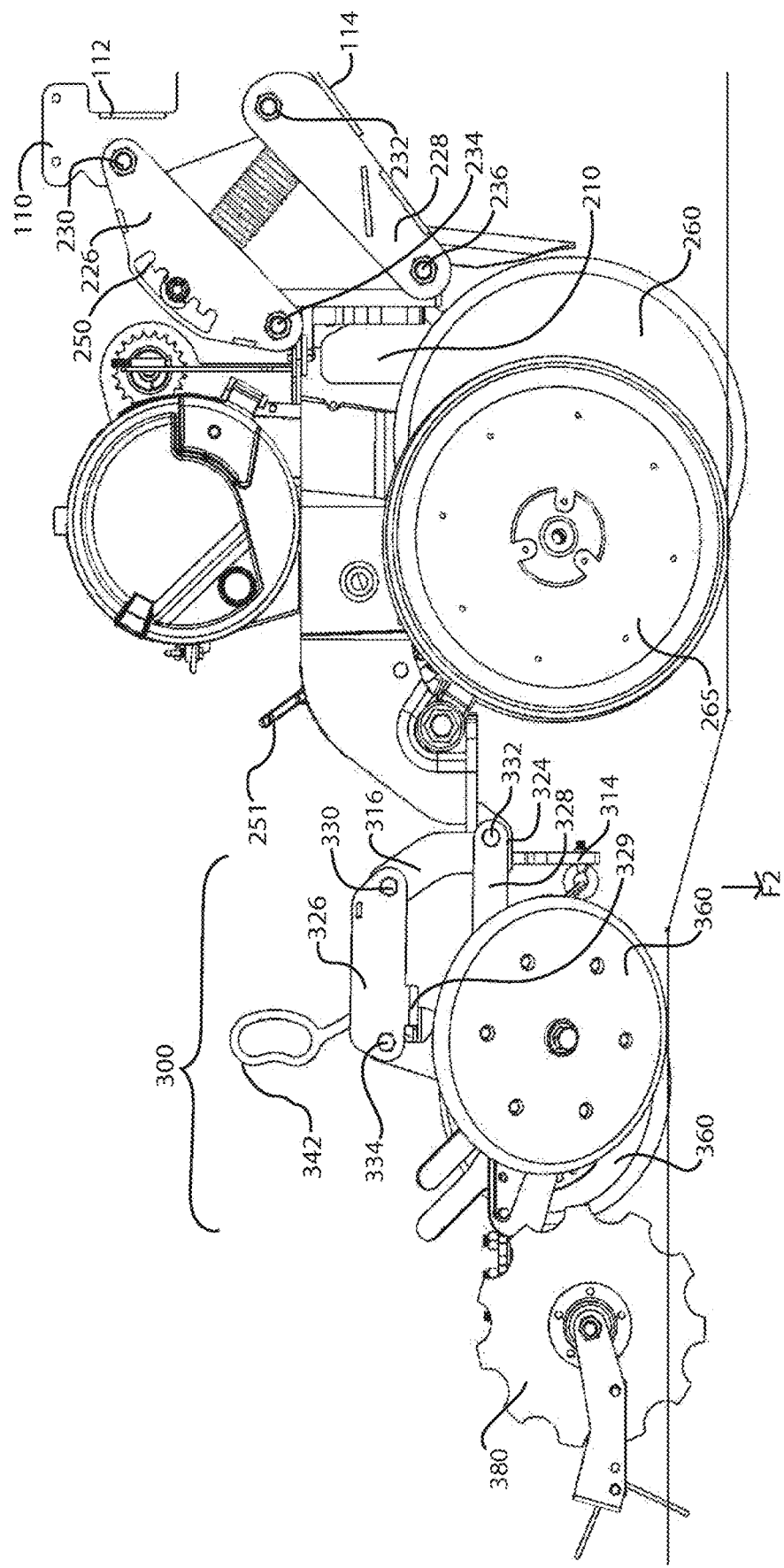
FIG. 7B is a side view of a trailing arm assembly forming part of the planter having a fertilizer disc.
Figure 8:
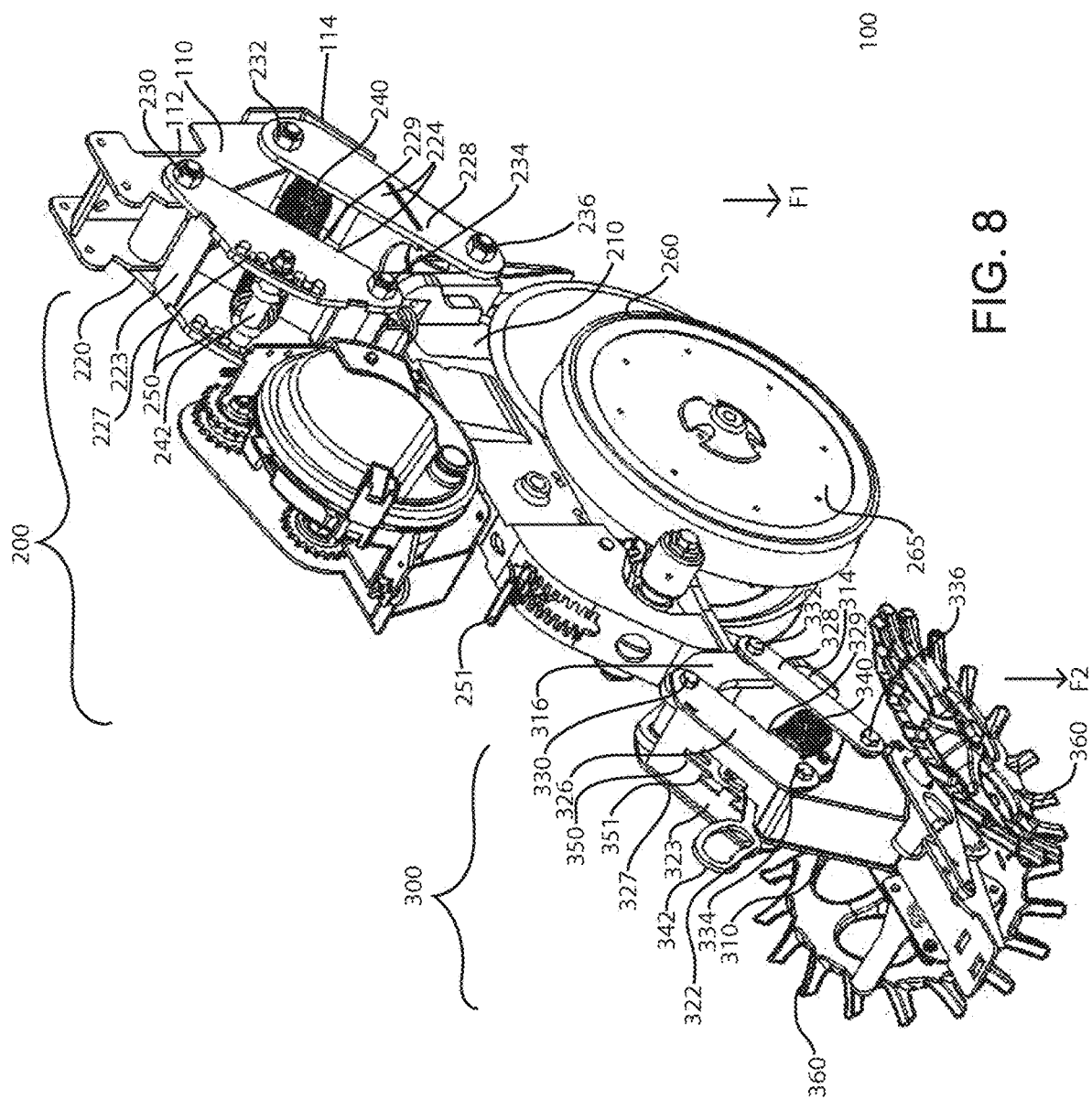
FIG. 8 is a top-rear isometric view of a trailing arm assembly forming part of the planter having an alternate style of closer wheel.

As indicated above, in various embodiments, the trailing arm assembly 100 may include a closing trailing arm assembly 300. The closing trailing arm assembly 300 may include a closer frame 310. The closer frame 310 may be connected to one or more furrow closer discs 360, fertilizer opener discs, fertilizer injectors or similar planter implements. The seed furrow closer disc 360 closes a furrow over a deposited seed in a manner well known in the art. Any type of Implement may be used. For example, FIGS. 1-7 show a typical closer wheel on the closing trailing arm assembly 300. FIG. 8 shows an alternate style mohawk closing wheel on closing trailing arm assembly 300.

The closer trailing arm assembly 300 may be coupled to the opener frame 210 via a connection that allows the closer trailing arm 300 to move relative to the opener frame 210. In accordance with various embodiments, the connection may be configured such that the approximate relative orientation between the closer trailing arm assembly 300 and the opener frame 210 may be maintained through the range of motion of the closing trailing arm assembly 300. Any mechanical connection operable to maintain this relationship may be used. For example, the closer trailing arm assembly 300 may connect to the opener frame 210 via a parallel linkage 320. In various embodiments, the parallel linkage 320 may be a four bar parallel linkage.

While a closing four bar parallel linkage is shown in the figures, other connection mechanisms may be used as well. In various other examples, a slide mechanism, rail mechanism, or the like may connect the trailing arm assembly to the frame.

Figure 9:
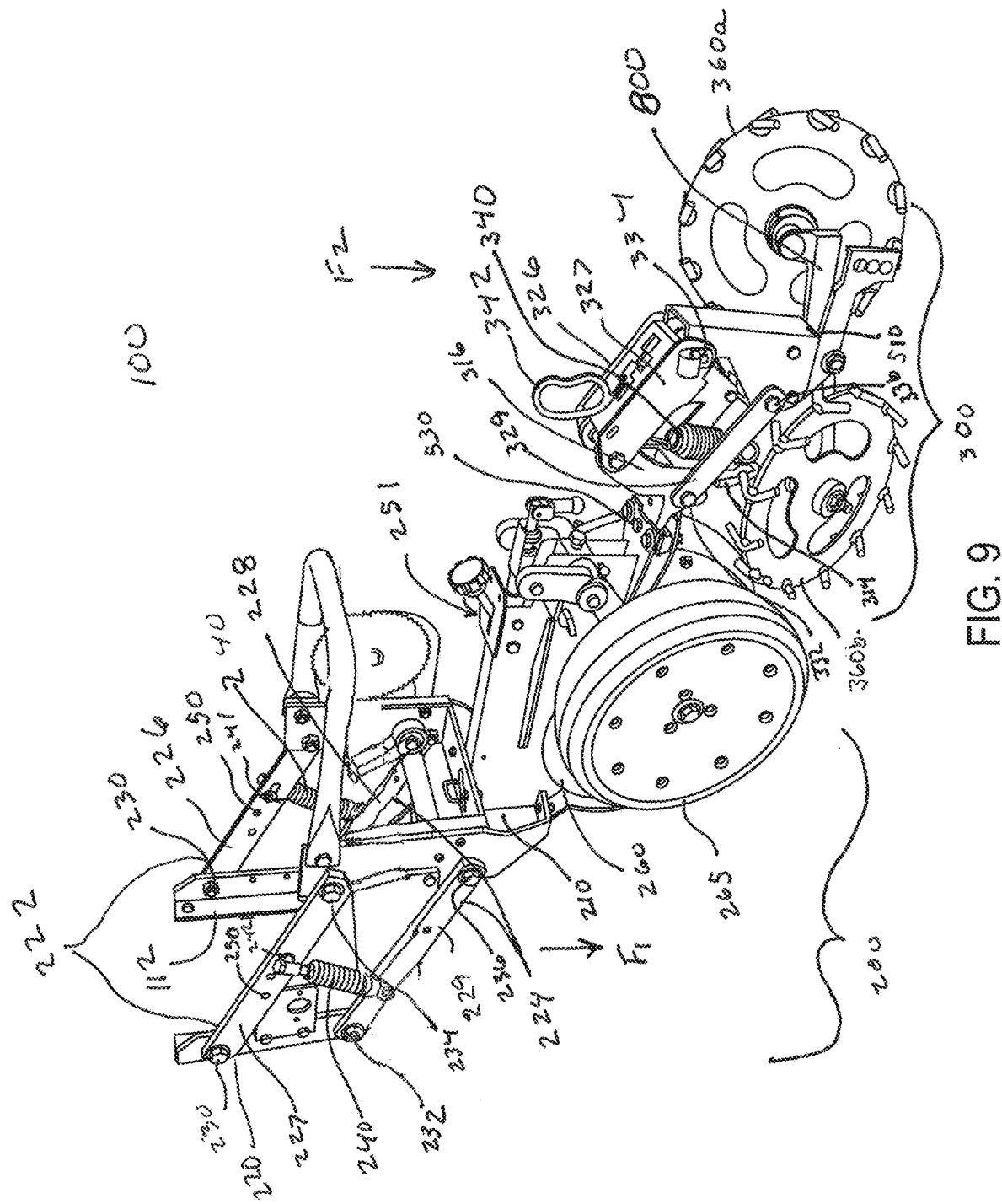
FIG. 9 is a top-rear isometric view of a trailing arm assembly forming part of the planter having closer wheel connected to a walking arm.

In accordance with various embodiments, the parallel linkage 220 may have a first link 226 and a second link 228. The first link 226 may have two pivots 230, 234. The pivot 230 may be located on a frame bracket 110. The pivot 234 may be located on the first frame 210. In this arrangement, the first link 226 allows movement between the frame bracket 110 and the first frame 210. The second link 228 may have two pivots 232, 236. The pivot 232 may be located on a frame bracket 110. The pivot 236 may be located on the first frame 210. The first link 226 and the second link 228 may be positioned in parallel relative to one another, meaning planes passing through pivots 230, 232 and pivots 232, 236, respectively, may be parallel to one another. Pivots 232 and 230 may be positioned relative to one another in positions that are the same or substantially similar to pivots 236 and 234. In this relationship, as the first link 226 and second link 228 articulate through their range of motion, they remain parallel to one another. Pivots 236 and 234 also maintain their position relative to one another. This arrangement allows the frame 210 to generally maintain its angular orientation throughout its range of motion. As shown in FIG. 9, the pivots may be discontinues across the links. For example, each end of each link may have its own pivot as shown in the exemplary FIG. 9.

In embodiments wherein the parallel linkage 220 is a four bar parallel linkage, the linkage 220 may also include a third link 227 and a fourth link 229. Links 227 and 226 have the same pivots 230, 234 and form a top linkage 222. Links 228 and 229 have the same pivots 232, 236 and form a bottom linkage 224.

In accordance with various embodiments, the frame bracket 110 may be fixedly attachable or removably attachable to a planter towing frame 75. The frame bracket 110 may have a engagement portion 112. The engagement portion 112 may be flat (see FIG. 9) or C-shaped (see FIG. 3) operable to engage around frame 75. Such an engagement portion may provide stability proximal to the sides of the linkage 220 such that twisting of the trailing arm assembly 100 is minimized. The frame bracket 110 may also include a mounting plate 114 that connects to a biasing member 240. The mounting plate 114 may be located above, below, or in between pivots 230 and 232. As shown in the FIGS. 3 and 5, the plate 114 may be below the pivots 230, 232 and also extend out under the top and bottom linkages 222, 224. By extending out and under the linkages 222, 224, the plate 114 may be positioned to stop the linkages from operating beyond a certain point. For example, the plate may limit the bottom linkage 224 from extending beyond 10-80 degrees off of the horizontal plane by being positioned to contact the linkage at an angular orientation between 20-70 degrees off horizontal. In other examples, this angle may be between 20-70 degrees or more particularly between 30-60 degrees. In one example, this angle may be approximately 35 degrees. By anchoring the biasing mechanism on the plate 114, which forms part of the bracket 110, at least one end of the biasing mechanism may be anchored to the frame 75 such that that anchor point has limited or no movement relative to the frame 75.

The plate 114 may also form an anchor point for the biasing mechanism 240 below the pivots 230, 232. In such a position, a tension-based biasing mechanism 240 may be used. One example of such a biasing mechanism may be a tension spring. The plate 114 may also anchor the biasing mechanism 240 between the pivots 230, 232 with the biasing mechanism being a torsion spring, for example. The plate 114 may also anchor the biasing mechanism 240 above the pivots 230, 232 with the biasing mechanism being a coil spring, air bag, or similar type of extension mechanism, for example. In another example, the biasing mechanism may be a hydraulic cylinder operable to extend or contract. A person of ordinary skill in the art, based on these examples, will appreciate that any of a variety of biasing member may be used with the system.

In accordance with various embodiments, the upper set of links 222 in the four bar parallel linkage 220 may be cross-braced such that link 226 and link 227 are integrally formed. Such integral formation may increase the lateral rigidity of the linkage 220. Similarly, the lower set of links 224 may be cross-braced such that links 228 and 229 are integrally formed. The integral formation of either or both the upper and lower links may be accomplished by a variety of means. For example, the links may be cast, molded, machined, stamped, welded or formed by any other method. In one example, one or more plates 223 may connect one side of the upper links 222 with the other side of the upper links 222. Similarly, plates 225 may connect one side of the lower links 224 with the other side of the lower links 224. The plates 222 and 225 may be welded in place or attached with fasteners.

In accordance with various embodiments, the adjustable biasing member 240 may extend from the parallel linkage 220 to the frame bracket 110. The adjustable biasing member 240 may be anchored to either the upper or lower links 222, 224 on one end of the adjustable biasing member 240 and anchored to the frame bracket 110 on the opposite end of the biasing member 240. The biasing member may be positioned such that the biasing member biases the linkage 220 in a downward direction. In one example, the plate 114 may be positioned below the pivots 230 and 232, with the biasing member 240 anchored to the plate 114 on one end and the biasing member 240 being anchored to the upper link 222 on the opposite end. In such an embodiment, the biasing member may also be an extension spring operable to exert a downward force on the linkage 220 by pulling the upper link toward the plate 114. While the biasing member may exert a force directly between the linkage 220 and the plate 114, the resultant force when reacting with the structure of the linkage 220 may be represented as F1.

In accordance with various embodiments, the parallel linkage 220 may be connected between the first frame 210 and the frame bracket 110 such that the parallel linkage maintains an angular orientation of the first frame 210. This angular orientation may be orthogonal to the effective downward force F1 of the adjustable biasing member 240. While the actual force exerted by the biasing member 240 may not be vertical, the interaction between the biasing member 240 and the parallel linkage 220 may result in a vertical force on the first frame 210. This vertical force may drive the first frame 210 and all implements attached thereto (e.g., the opener wheel 260 and the gauge wheel 265) against the ground 400.

In accordance with various embodiments, the biasing member 240 may be adjustable. For example, the biasing member 240 may be adjustably connected to a portion of the parallel linkage (e.g., the upper linkage 222). The adjustable connection may allow the biasing member 240 to move along the length of the parallel linkage, with a position on one end of the parallel linkage placing the biasing member 240 in greater tension than a position on the opposite end of the parallel linkage 220 or with the position on one end of the parallel linkage 220 providing the biasing member 240 with greater mechanical advantage relative to the frame 110. For example, an adjustable connection 250 may connect the biasing member 240 to the parallel linkage 220 at any of a variety of positions along about 50% of the length of the parallel linkage 220. In one example, the adjustable connection may be a plurality of detents 250 formed in the parallel linkage 220. The adjustable connection 250 may be an aperture extending through one or more of the links 226, 227, 228, or 229. The aperture may be an elongated slot with shorter slots extending transversely therefrom. An anchor member 242 may engage the aperture and be operable to slide along the elongated slot between the shorter slots. The biasing mechanism may pull the anchor member into the shorter slots, thereby forming a plurality of detents, allowing adjustability between each of the plurality of shorter slots. In one example, the anchor member 242 may be a pin that may extend between link 226 and link 227. Each link may have the adjustable connection aperture 250 formed therein with the pin 242 engaged on each side. The biasing mechanism may connect to the pin forming the anchor on one side of the biasing mechanism with the upper linkage 222. The pin may then be adjustable between the plurality of detents defined by the aperture 250. In other examples, adjustment control 250 may be similar or the same as those discussed below with regards to the closer trailing arm assembly 300.

Figure 5A:
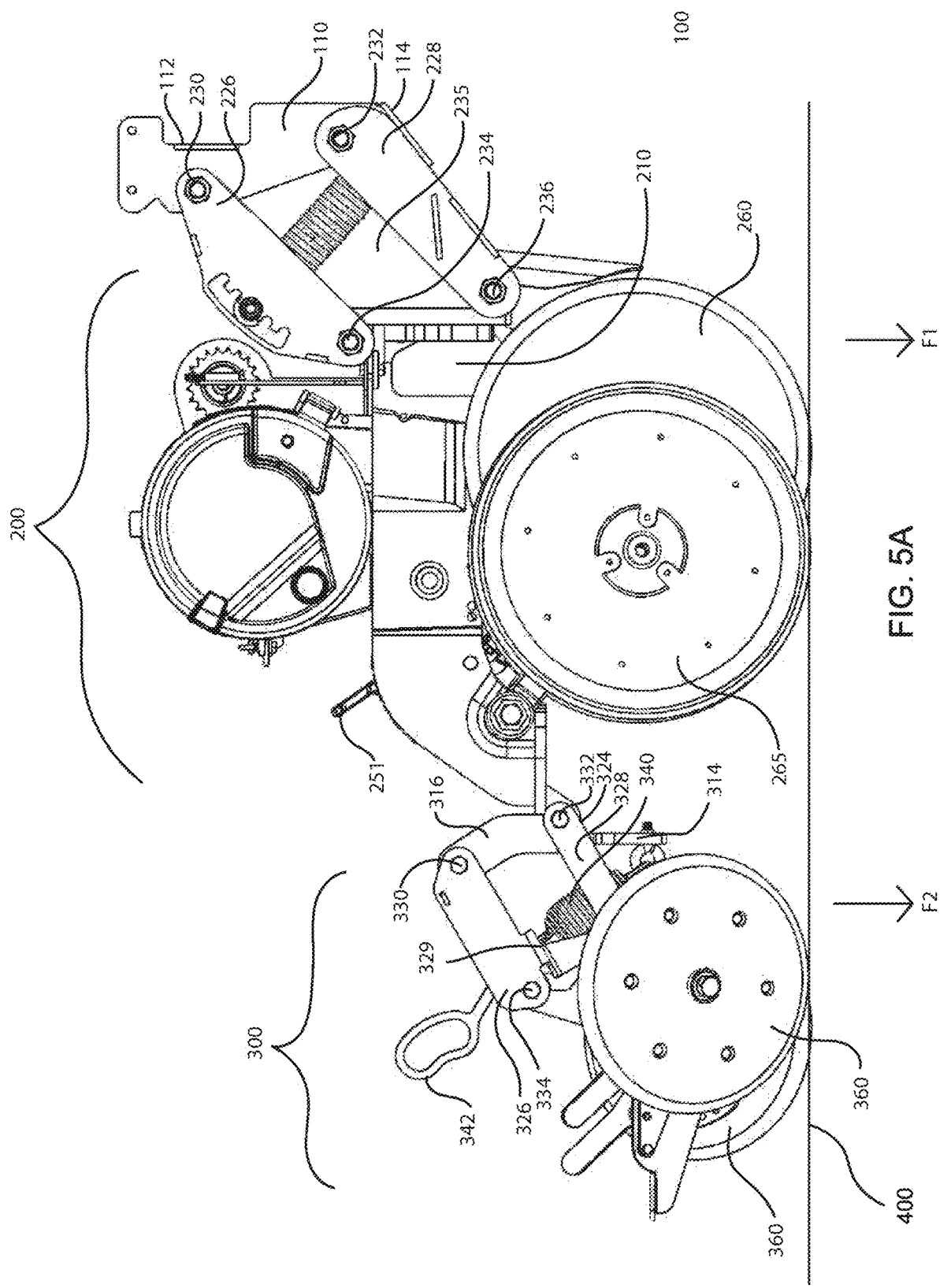
FIG. 5A is a side view of a trailing arm assembly forming part of the planter.

In accordance with various embodiments, the first frame may include an adjustment mechanism operable to change the position of the gauge wheels 265 relative to the first frame 210. The trailing arm assembly 200 may include an adjustment lever 251. This lever 251 may allow the downward force exerted by the gauge wheels 265 to be adjusted. A linkage may extend between a bottom end of the lever 251 and the opener frame 210. The position of the lever 251 may be set to set the gauge wheels 265 at a desired position relative to the opener frame 210. The relationship between the opener frame 210 and the frame 75 is influenced by the parallel linkage 220 and the biasing member 240. The influence may cause a change in force against the gauge wheels as the lever 251 is adjusted. When the lever 251 is in the first position fully extending the gauge wheels away from the frame 210, the resulting downward force on account of the biasing member 240 may be at a maximum for the particular detent in which the biasing member 240 is set. To fully maximize this downward force, the biasing member 240 may be located in the detent on the linkage 220, which maximizes the bias. (For example, as shown in FIG. 1, the detent distal from the bracket 110 provides the greatest mechanical advantage for the biasing member 240 and therefore the greatest downward force.) With the force F1 maximized in the distal detent, the lever 251 may be positioned such that the wheels are fully extended, maximizing the overall force. The force may also be minimized by positioning the biasing member 240 in the detent in the minimum force position (e.g., as shown in FIG. 5A, the detent proximal to the bracket 110 which provides the least mechanical advantage for the biasing member 240 and therefore the least downward force). With the force F1 minimized in the proximal detent, the lever 251 may be positioned such that the wheels are fully retracted to the frame 210, minimizing the overall force. One of ordinary skill in the art may recognize that intermediate adjustments may be made between the linkage control 250 and the frame control 251. It may also be noted that while the frame control 251 may have an effect on force, it may also be used to merely set the depth of the opener disc 260 by adjusting the gauge wheels 265 relative to the opener disc 260.

As discussed above, and in accordance with various embodiments, the planter may also include a second trailing arm assembly 300. The second trailing arm assembly 300 may include implements operable to close and/or fertilize a furrow. This second trailing arm assembly 300 may include a closer frame 310. The closer frame 310 may include one or more closing wheels 360. As shown in FIGS. 6-8, the closer frame 310 may also connect to a fertilizer disc 380 and/or a fertilizer distribution system 390.

Figure 5B:
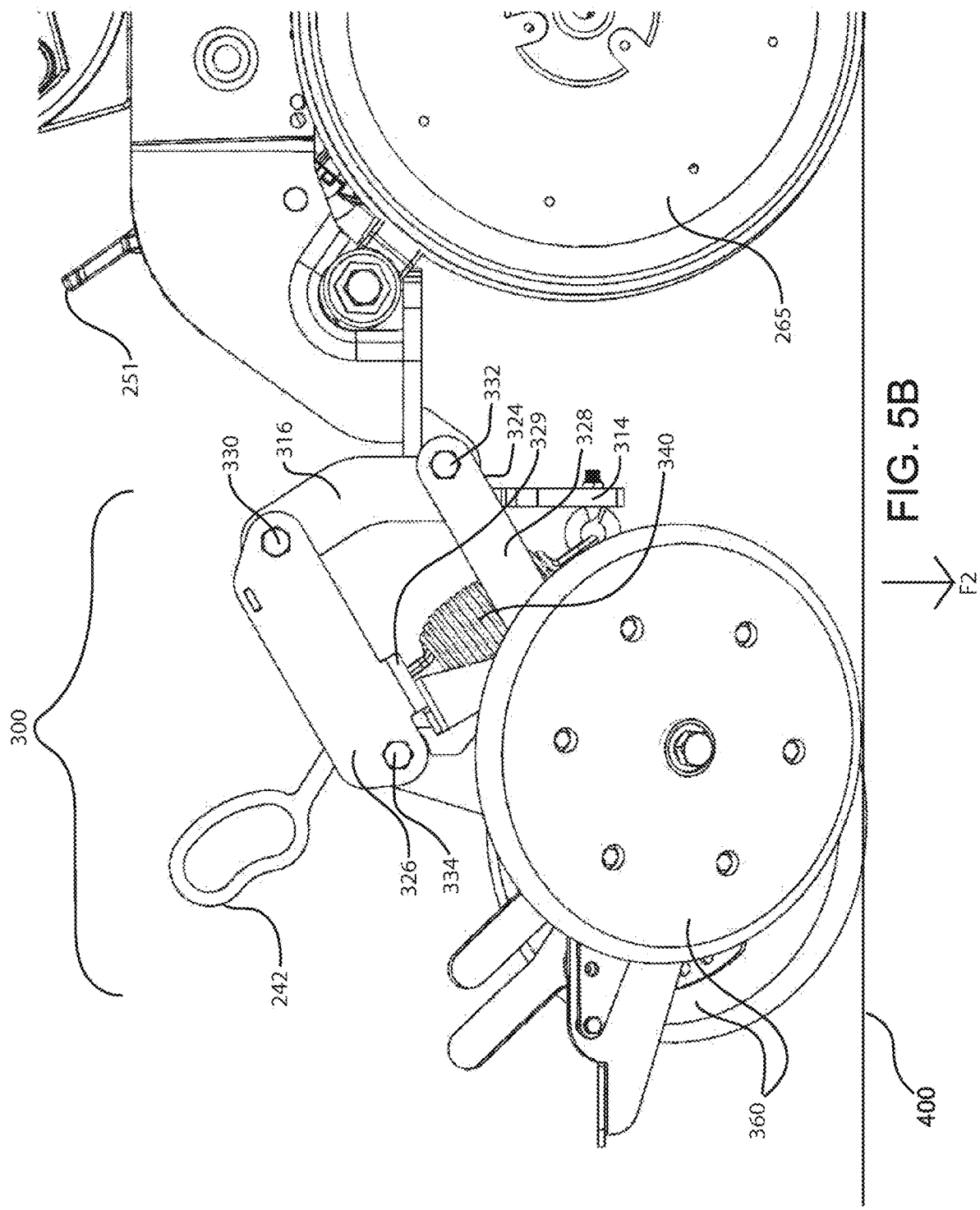
FIG. 5B is a side view of a closer trailing arm assembly forming a part of the trailing arm assembly of FIG. 5A.
Figure 5C:
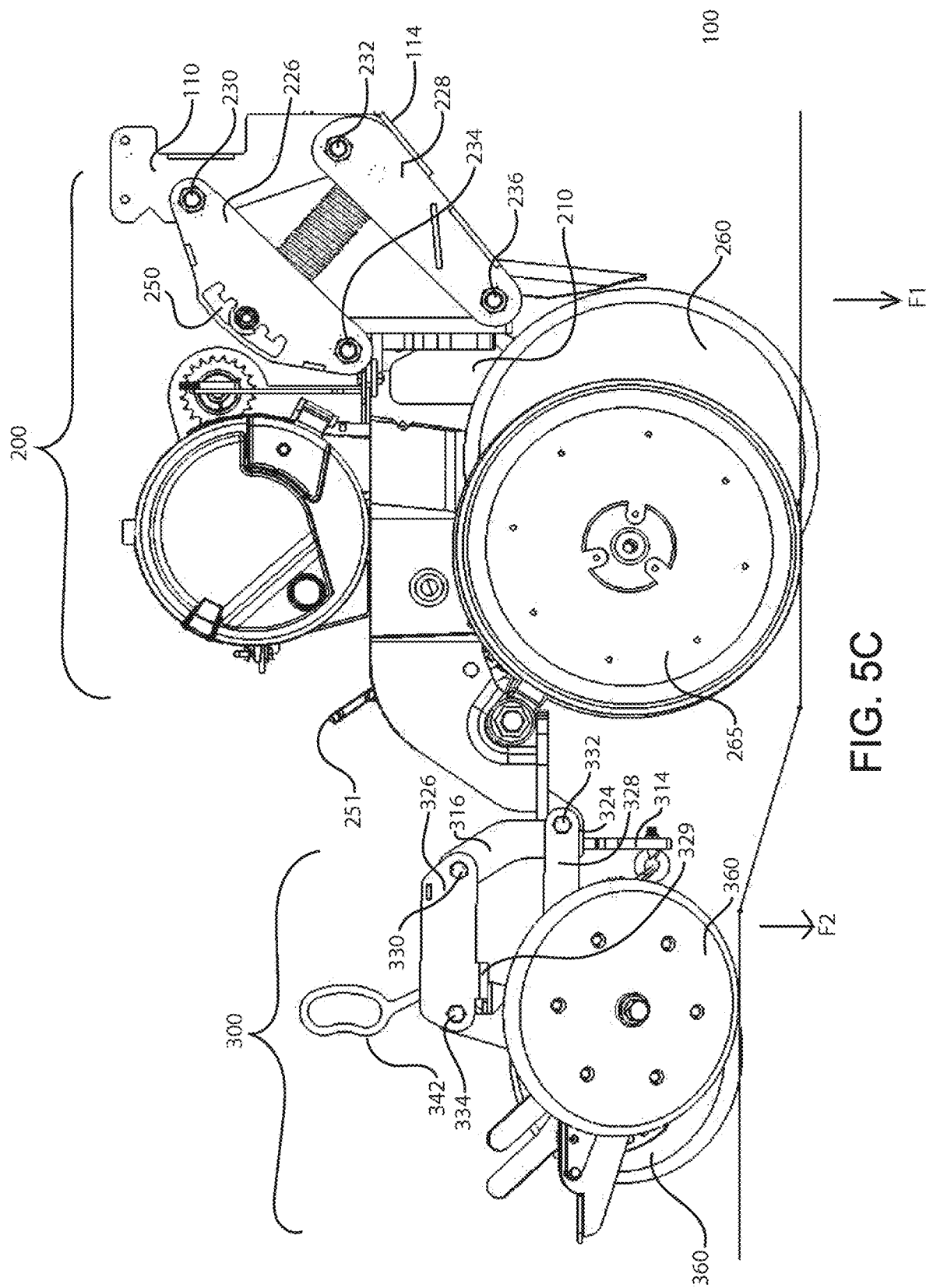
FIG. 5C is a side view of a trailing arm assembly forming part of the planter with the closer trailing arm assembly in an articulated position relative to the position shown in FIG. 5A.

The opener frame 210 and the closer frame 310 may be connected to one another such that the closer frame 310 may operatively move independently with respect to the opener frame 210 in the vertical direction. As shown in FIGS. 5A and 5B, the closing wheels 360 may generally operate at a similar level as the gauge wheels 265. However, the closer trailing arm assembly 300 may articulate vertically relative to the opener trailing arm assembly 200 as shown in FIGS. 5C and 5D. Here, the closer trailing arm assembly 300 operates on a higher level (due to, e.g., an obstacle or field 400 contour or the like) than the opener trailing arm assembly 200.

As discussed above, the closer trailing arm assembly 300 may be connected to the opener trailing arm assembly 200 in any manner known, especially in such a way as to provide the vertical articulating independence discussed above. In accordance with various embodiments, the closer frame 310 may be connected to the opener frame 210 via a second parallel linkage 320. The parallel linkage 320 may have a first link 326 and a second link 328. The first link 326 may have two pivots 330, 334. The pivot 330 may be located on the opener frame 210. The pivot 334 may be located on the closer frame 310. In this arrangement, the first link 326 allows movement between the opener frame 210 and the closer frame 310. The second link 328 may have two pivots 332, 336. The pivot 332 may be located on the opener frame 210. The pivot 336 may be located on the closer frame 210. The first link 326 and the second link 328 may be positioned in parallel relative to one another, meaning planes passing through pivots 330, 332 and pivots 332, 336 respectively may be parallel to one another. Pivots 332 and 330 may be positioned relative to one another in positions that are the same or substantially similar to pivots 336 and 334. In this relationship, as the first link 326 and second link 328 articulate through their range of motion, they remain substantially parallel to one another. Pivots 336 and 334 also maintain their position relative to one another. This arrangement allows the frame 310 to generally maintain its angular orientation throughout its range of motion.

In embodiments wherein the parallel linkage 320 is a four bar parallel linkage, the linkage 320 may also include a third link 327 and a fourth link 329. Links 327 and 326 have the same pivots 330, 334 and form a top linkage 322. Links 328 and 329 have the same pivots 332, 336 and form a bottom linkage 324.

In accordance with various embodiments, the opener frame bracket 210 may include a bracket 316 fixedly attached or removably attachable thereto. The closer frame 310 may be movably attached to the bracket 316 via the parallel linkage 320. The attachment may be such that it provides stability to the sides of the linkage 320 such that twisting of the trailing arm assembly 300 is minimized. The bracket 316 may also include a mounting plate 314 that connects to a biasing member 340. The mounting plate 314 may be located above, below, or in between pivots 330 and 332. As shown in the FIGS. 3 and 5, the plate 314 may be below the pivots 330, 332. Similar to plate 214, plate 314 may extend out under the top and bottom linkages 322, 324. By extending out and under the linkages 322, 324, the plate 314 may be positioned to stop the linkages from operating beyond a certain point similar to those discussed above. However, as shown in FIGS. 3, 5 and 9, the plate 314 may have lateral tabs, which perform a similar function. In this way, the plate 314 may limit the bottom linkage 324 from extending beyond a certain point. The plate 314 may also anchor the biasing member 340 below the rear lower pivot 332. In one example, the plate 314 may support an anchor 315 for a biasing mechanism 340. (See FIG. 10) The anchor 315 may be an eye bolt located below the rear lower pivot 332 such that it can exert a downward force on the linkage 300.

The plate may also anchor biasing mechanism 340. By anchoring the biasing mechanism 340, at least one end of the biasing mechanism 340 may be anchored to the opener frame 210 such that that anchor point has limited or no movement relative to the opener frame 210. The plate 314 may form an anchor point for the biasing mechanism 340 below the pivots 330, 332. In such a position, a tension-based biasing mechanism 340 may be used. One example of such a biasing mechanism may be a tension spring. Similar arrangements to those discussed above with regards to biasing mechanism 240 may be employed with the biasing mechanism 340. A person of ordinary skill in the art, based on these examples, will appreciate that any of a variety of biasing members may be used with the system.

In accordance with various embodiments, the upper set of links 322 in the four bar parallel linkage 320 may be cross-braced such that link 326 and link 327 are integrally formed. Such integral formation may increase the lateral rigidity of the linkage 320. Similarly, the lower set of links 324 may be cross-braced such that links 228 and 229 are integrally formed. The integral formation of either or both the upper and lower links may be accomplished by a variety of means. For example, the links may be cast, molded, machined, stamped, welded or formed by any other method. In one example, one or more plates 323 may connect one side of the upper links 322 with the other side of the upper links 322. Similarly, plates 325 may connect one side of the lower links 324 with the other side of the upper links 324. The plates 322 and 325 may be welded in place or attached with fasteners.

In accordance with various embodiments, the adjustable biasing member 340 may extend from the parallel linkage 320 to the opener frame 210. The adjustable biasing member 340 may be anchored to either the upper or lower links 322, 324 on one end of the adjustable biasing member 340 and anchored to the opener frame 210 on the opposite end of the biasing member 340. The biasing member may be positioned such that the biasing member biases the linkage 320 in a downward direction. In one example, the plate 314 may be positioned below the pivots 330 and 332, with the biasing member 340 anchored to the plate 314 on one end and the biasing member 340 being anchored to the upper link 322 on the opposite end. In such an embodiment, the biasing member 340 may also be an extension spring operable to exert a downward force on the linkage 320 by pulling the upper link 322 toward the plate 314. While the biasing member may exert a force directly between the linkage 320 and the plate 314, the resultant force when reacting with the structure of the linkage 320 may be represented as F2.

In accordance with various embodiments, the parallel linkage 320 may be connected between the closer frame 310 and the opener frame 210 such that the parallel linkage maintains an angular orientation of the closer frame 310. This angular orientation may be orthogonal to the effective downward force F2 of the adjustable biasing member 340. While the actual force exerted by the biasing member 340 may not be vertical, the interaction between the biasing member 340 and the parallel linkage 320 may result in a vertical force on the closer frame 310. This vertical force may drive the closer frame 310 and all implements attached thereto (e.g., the opener wheel 360 and the gauge wheel 365) against the ground 400.

In accordance with various embodiments, the biasing member 340 may be adjustable. For example, the biasing member 340 may be adjustably connected to a portion of the parallel linkage (e.g., the upper linkage 322). The adjustable connection may allow the biasing member 340 to move along the length of the parallel linkage 320, with a position on one end of the parallel linkage placing the biasing member 340 in greater tension than a position on the opposite end of the parallel linkage or with the position on one end providing the biasing member 340 with greater mechanical advantage than the position on the other end. For example, an adjustable connection 350 may connect the biasing member 340 to the parallel linkage 320 at any of a variety of positions along about 50-80% of the length of the parallel linkage 320. In one example, the adjustable connection 250 may be a plurality of detents 351 formed in the parallel linkage 320. The adjustable connection 350 may be an aperture extending through one or more of the links 326, 327, 328, or 329 similar to the structure discussed above with respect to linkage 220 and adjustable connection 250. Or the adjustable connection may be an aperture 350 extending through the connecting plate 323. The aperture may be an elongated slot 350 with shorter slots 351 extending transversely therefrom. An anchor member 342 may pass through the aperture 350 and be operable to slide along the elongated slot 350 between the shorter slots 351. In one example, the anchor member 342 may be a lever that may extend through plate 323. The biasing mechanism 340 may connect to the lever 342, forming the anchor on one side of the biasing mechanism 340 with the upper linkage 322. The pin may then be adjustable between the plurality of detents 351 defined along aperture 350.

In accordance with various embodiments, the planter may have the first trailing arm section 200 attached to the planter frame 75 via a four bar parallel linkage 220 and the second trailing arm section 300 attached to the first trailing arm section 200 via the second four bar parallel linkage 320. The first four bar parallel linkage 220 and the second four bar parallel linkage 320 may be biased toward the ground 400. The first bias mechanism 240 may bias both the first trailing arm section 200 and the second trailing arm section 300. The second bias mechanism 340 may only bias the second trailing arm section 300. The first and second bias mechanisms may include their own individual adjustment systems 250 and 350, respectively. These mechanisms may adjust the respective forces exerted by the bias mechanisms associated therewith. A third adjustment mechanism 251 may be included in the first trailing arm section 200. The third adjustment mechanism 251 may adjust the position of the first trailing arm section 200 (more specifically, the frame 210 associated therewith) with respect to the ground. This adjustment may translate into an additional adjustment of force on the first biasing mechanism 240.

It may be noted that the directions used herein may be generally stated, while in actual application in the field the conditions may vary the practical effect. For example, a tractor 50 pulling planter 70 up a hill may result in the forces F1 or F2 being non-vertical while still being generally normal to the ground or normal to the direction of travel of the system as a whole. Or, as debris or small hills may have a very temporary effect on the angle of the system as a whole, the overall effect or the larger average effect is that the effective force is generally normal to the average plane of the field 400 or generally normal to the average direction of travel of the system.

As shown in FIG. 9 the closing assembly 300 may include staggered closing wheels 360a and 360b attached an articulating bracket 800. The articulating bracket 800 may provide an additional degree of articulation relative to the closing assembly 300. As indicated above, opener assembly 200 provides a first degree of articulation moving the components rearward of opener assembly 200, e.g. the closing assembly 300 and the articulating bracket 800. The closing assembly 300 provides a second degree of vertical articulation that is independent of the opener assembly 200, but articulates the components rearward of the closing assembly 300, e.g. the articulating bracket 800. The articulating bracket 800 provides a third degree of vertical articulation that is independent of the opener assembly 200 and the closing assembly 300. The articulating bracket 800 is operable to move components attached thereto without causing movement of forward components such as the opener assembly 200 and the closing assembly 300. For example, staggered closer wheels or a fertilizer disc may be attached to the articulation bracket 800. These components may articulate independent of the linkage of the closing assembly 300. In accordance with one embodiment, the articulation bracket 800 may be a pivotable arm bracket as disclosed in any of the various embodiments of U.S. Pat. Pub. No. 2013/0263767, which is hereby incorporated by reference in its entirety. As shown, in FIG. 9 the staggered closing wheels 360a and 360b may be v-tine closing wheels discussed in more detail below.

The articulation of the articulation bracket 800 may be limited by an upper stop 510. The stop may limit the upward travel of the rear portion of the articulation bracket 800. The stop 510 may part of or a protrusion extending from the closing frame 310. As shown in FIG. 9 (and also FIG. 21) the stop 510 may be a sheet metal bracket that connects the pivot 334 and pivot 336 forming a part of the parallel link suspension.

Figure 10:
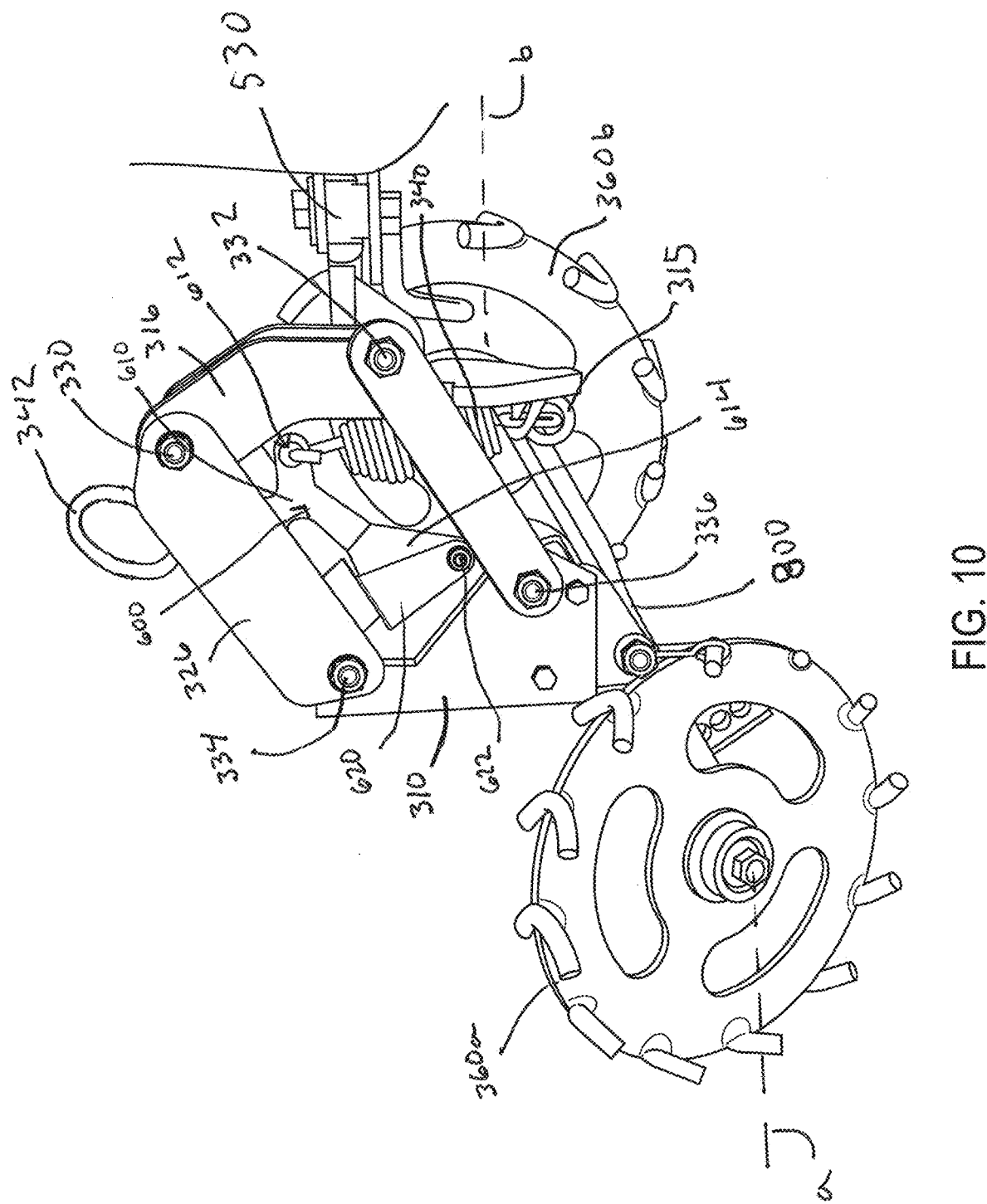
FIG. 10 is a side plane view of a trailing arm assembly forming part of the planter having closer wheel connected to a walking arm with the walking arm in a rear closing wheel down position and the rear four-link in a down position.
Figure 11:
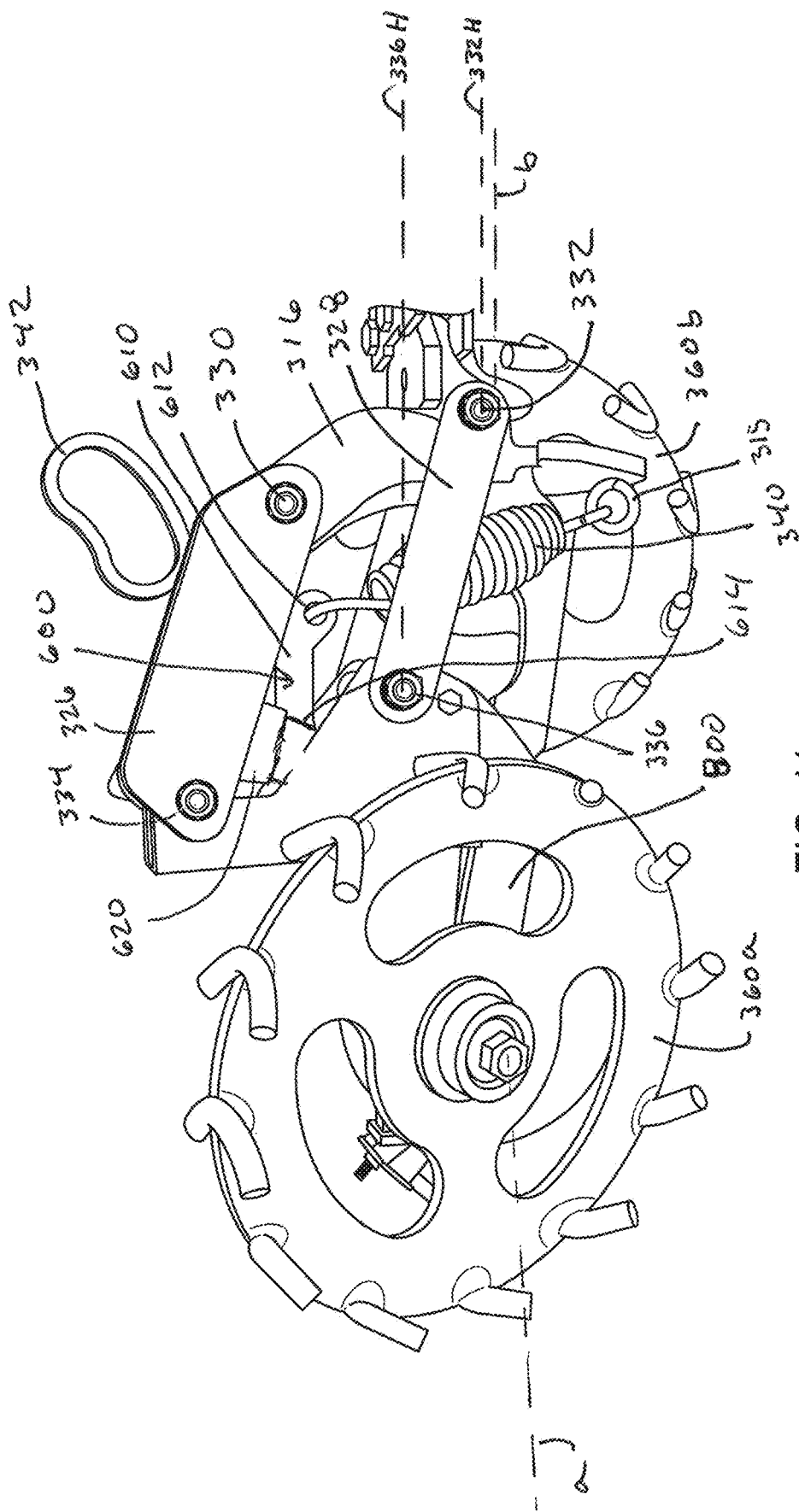
FIG. 11 is a side plane view of a trailing arm assembly forming part of the planter having closer wheel connected to a walking arm with the walking arm in a rear closing wheel upper position and the rear four-link in an upper position.

As shown in FIGS. 10 and 11, the closing assembly 300 may provide articulation to the closing wheels and/or fertilizer disc between a lower position shown by dotted line "a" in FIG. 10 and an upper position shown by line "a" in FIG. 11. FIG. 10 shows the trailing arm assembly 300 having the closer wheel 360a connected to an articulating bracket 800 with the closing wheel 360a in a down position and the rear four-link in a down position. In this position, both closing wheels 360a, b, may be positioned below the hitch 530. FIG. 11 shows the trailing arm assembly 300 with the closer wheel 360a connected to an articulating bracket 800 in a wheel upper position and the rear four-link in an upper position. In this configuration, the rear closing wheel 360a may be close to or above the hitch 530 with the front closing wheel 360b being close to the same height as the hitch 530 or about the same height as the rear lower pivot 332. The difference in height is illustrated as the comparison between line 332H and line b. In some embodiments, the combination of the articulating bracket 800 and the rear parallel link may allow at least one of the closing wheels to articulate between at least half the wheel height and 1 and ½ wheel heights.

Figure 12:
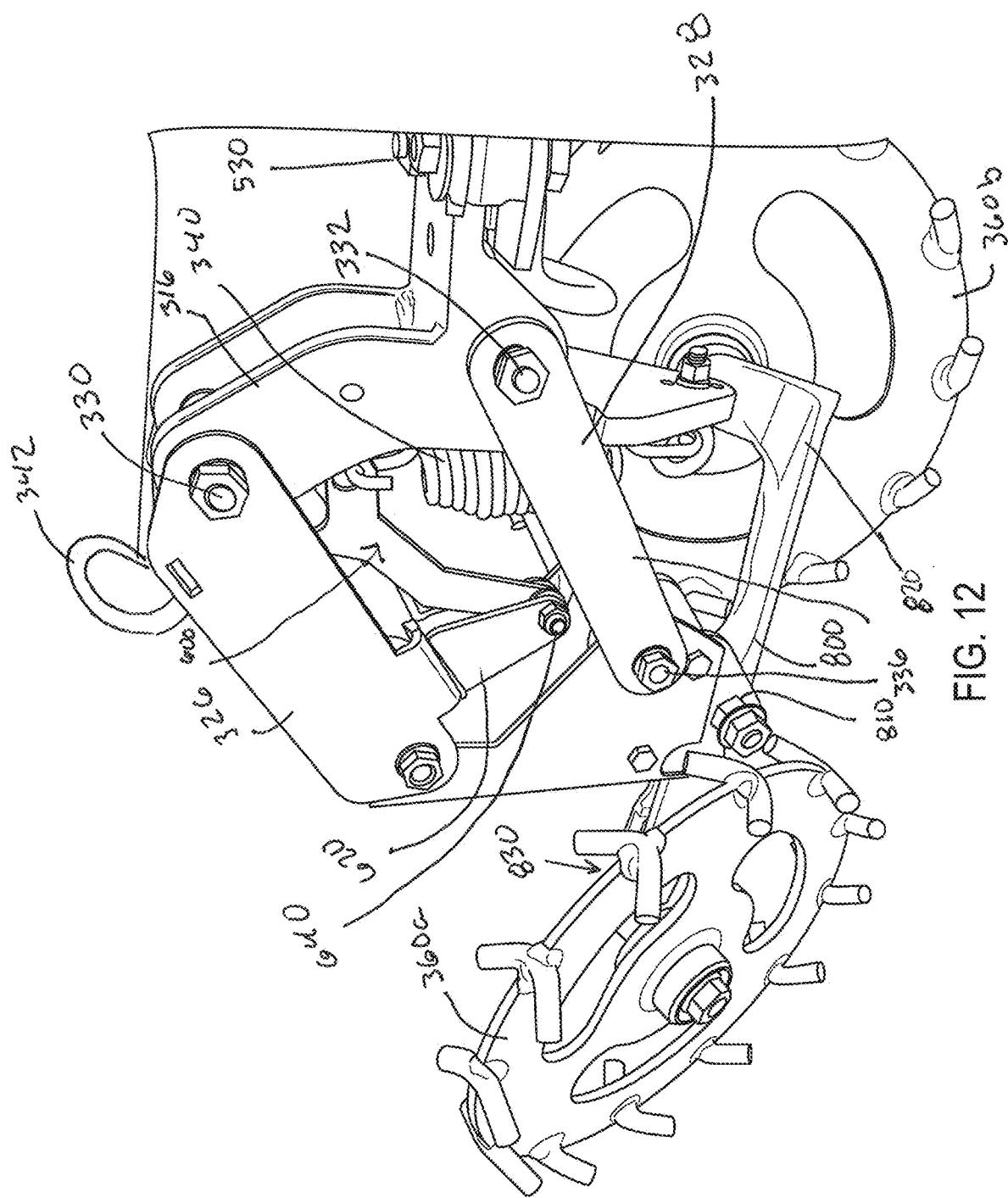
FIG. 12 is a side isometric view of a trailing arm assembly forming part of the planter having an alternate style of closer wheel.

As shown in FIGS. 10-12, the biasing member 340 may be adjustable via handle 342. The 340 may be attached to the anchor 315 which is located below the rear lower pivot 332. The biasing member may exert a down ward force on the upper linkage. The tension in the biasing member 340 may be adjusted via adjustment linkage 600. The biasing member 340 may attached to a first end 612 of the adjustment linkage 600. The adjustment linkage 600 may pivot about a pivot 622 that is connected to the upper linkage via bracket 620. By moving the handle 342 backwards, the adjustment linkage 600 may pivot raising the first end 612 elongating the biasing member 340 and thereby creating more tension in the member. The tension may be communicated through the pivot 622 and bracket 620 into the upper linkage creating a downward force on the linkage.

As indicated above the planter unit may utilize multiple articulating trailing arm assemblies. These assemblies may assert a uniform downward force that is generally perpendicular to the ground. This force may be beneficial to utilizing press wheels and closing wheels as they typically bring up the rear of the mechanism. In accordance with various embodiments these wheels may be a v-tined wheel suitable to condition the soil as press wheels, closing wheels, or some other implement.

Aspects of the subject matter discussed herein include the use of a wheel on the rear of a agricultural seed planter and drill. The wheel includes a center rim and tines extending from the rim. The rim may also extend radially beyond the tines such that when pressing down on top or side of the closed furrow, the rim makes small cuts into the soil to aid in the sprouting of the plant. The tines are arranged on the exterior portion of the rim such that at least a portion of at least one tine may be in contact with the soil during a full rotation of the wheel. The rim and tines press down on top of the closed furrow over the planted seed or the side of an open furrow to close the furrow. As the press wheel rotates, the tines contact the soil proximal to the location over or near the seed. As the wheel continues to rotate the tines begin to engage the soil outwardly.

Figure 13:
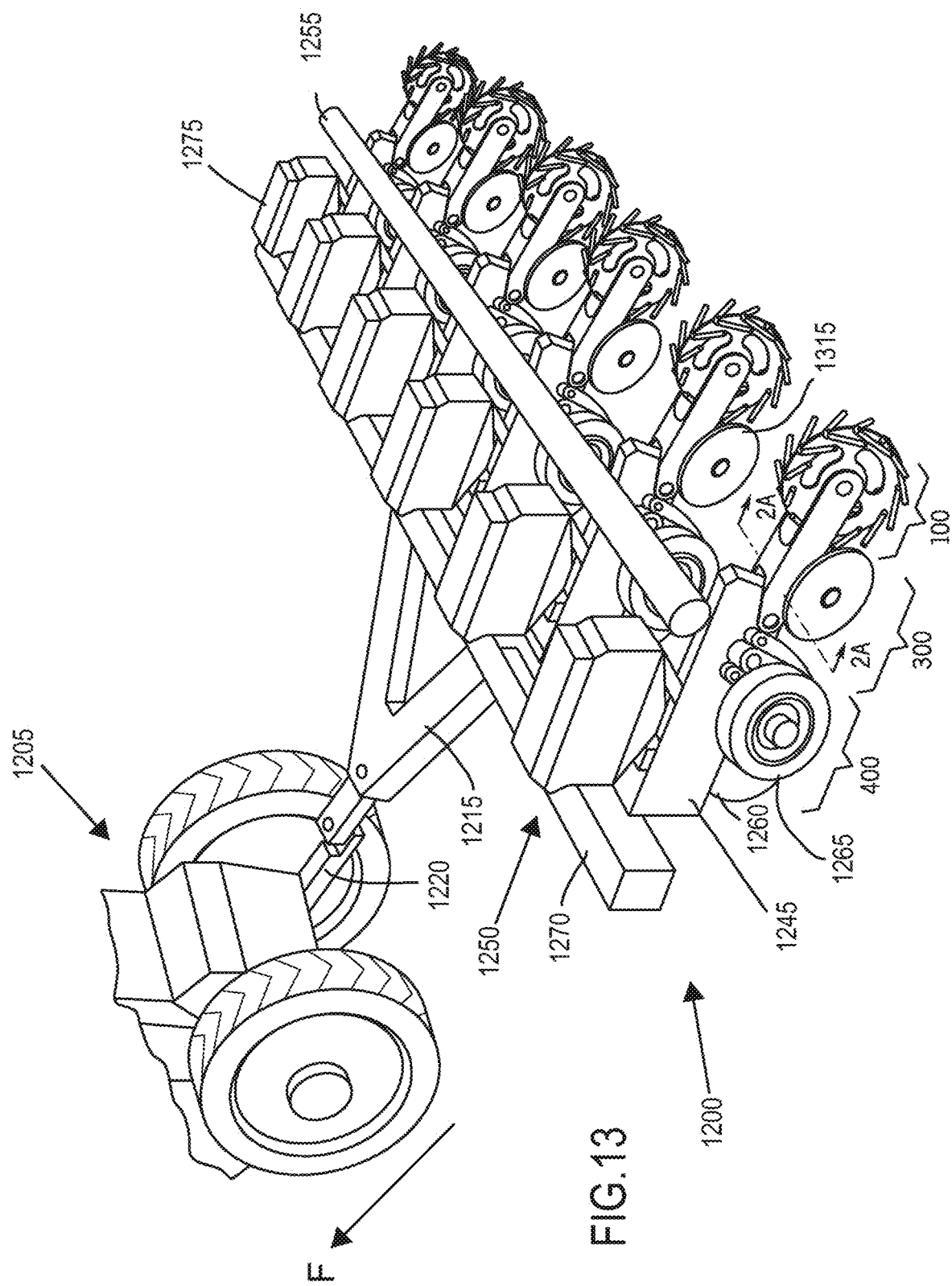
FIG. 13 illustrates a top-rear perspective view of an agricultural tractor pulling an agricultural planter with a press wheel in accordance with an embodiment of the present invention.

In accordance with various embodiments, as shown in the top-rear perspective view of FIG. 13, an agricultural seed planter and drill 1200 may include a tongue or hitch 1215 for hitching the planter 1200 to the hitch 1220 of the tractor 1205. The tractor 1205 tows the planter 1200 in the direction of arrow F and provides power to the agricultural seed planter and drill 1200 via a power take-off for powering the operations of the planter 1200.

As illustrated in FIG. 13, the agricultural seed planter and drill 1200 may include a frame 1245 from which the hitch 1215 extends and the various planter components are supported. The various components of the agricultural seed planter and drill 1200 may include row units 1250 and a liquid fertilizer distribution tube 1255. The distribution tube 1255 distributes the liquid fertilizer to the various row units 1250.

In accordance with various embodiments, the agricultural seed planter and drill 1200 may have a series of the row units 1250. Each row unit may include a furrow opener disc 1260, a gage wheel 1265, a frame 1270, and a seed hopper 1275. The seed furrow opener disc 1260 creates a furrow 1280 (see FIG. 15A) in which the planter 1200 deposits seed 1282 (see FIG. 15A) in accordance with any manner known. The gage wheel 1265 assists in determining the depth at which the planter 1200 deposits the seed. The agricultural planter 1200 may have a series of trailing arm assemblies 1300 each equipped with a trailing furrow closer wheel 1315 (while not shown as the wheels described herein the wheels 315 may also be the wheel 1100) followed by a press wheel assembly 1100. This configuration allows for treating the soil after the furrow has been closed by the closing wheel. In accordance with various embodiments, the wheel 1100 may form part of the main agricultural seed planter assembly 1200 or the wheel 1100 may extend off of the main agricultural seed planter assembly via a trailing arm frame 1320 or another bracket.

Figure 19:
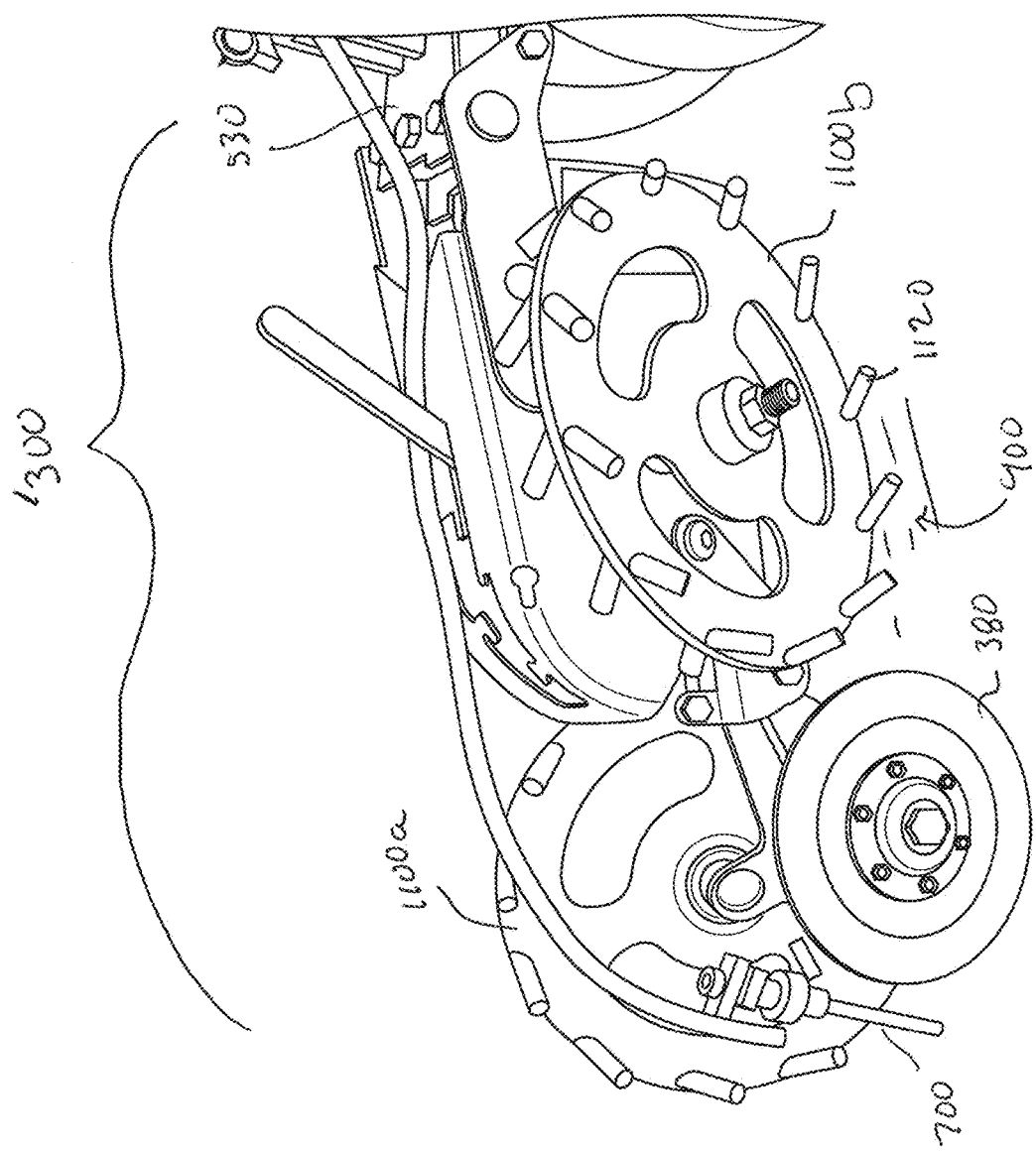
FIG. 19 illustrates a perspective view of a tail section having a closing wheel assembly in accordance with various embodiments.
Figure 20:
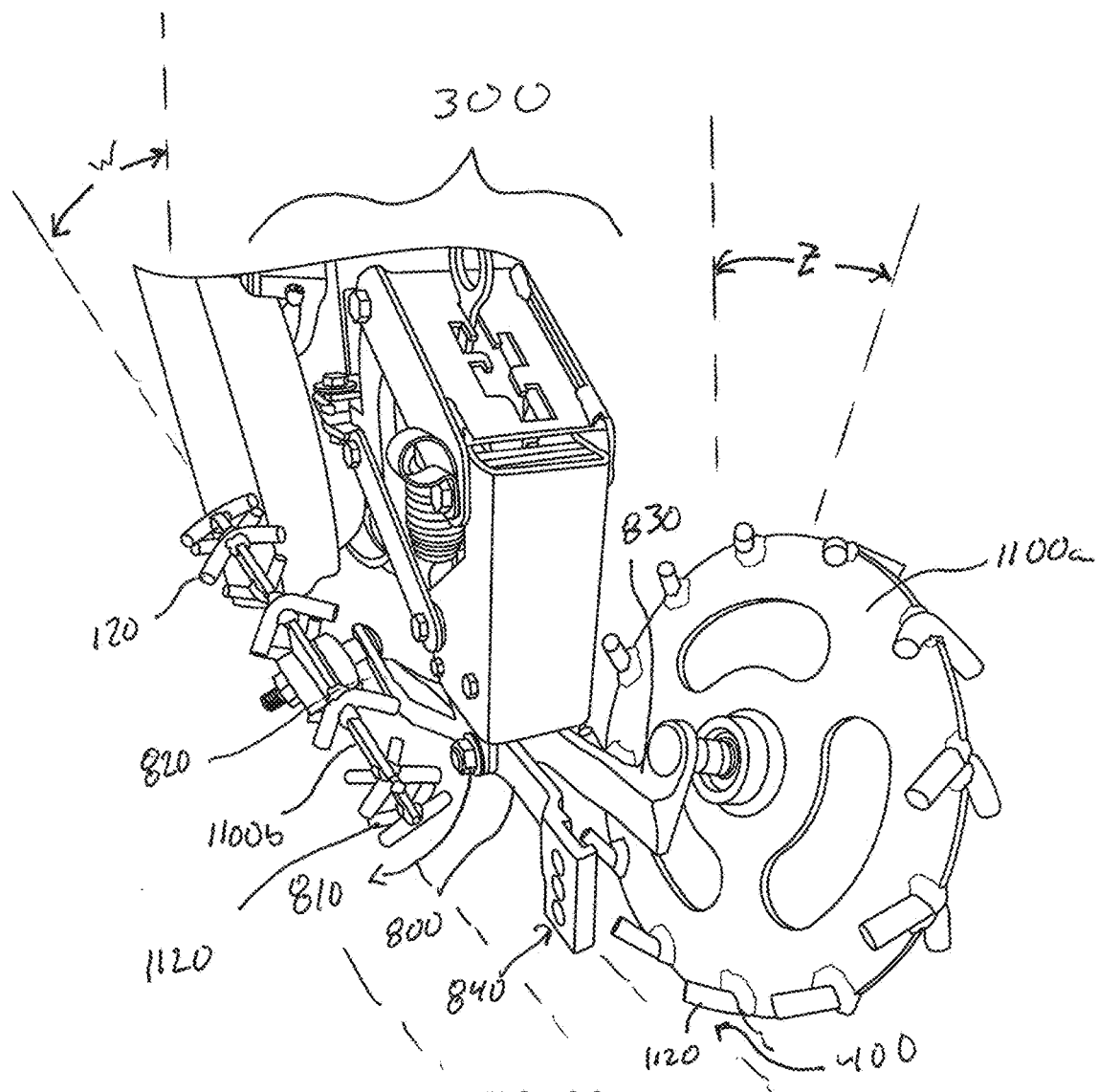
FIG. 20 illustrates a rear perspective view of a tail section having a closing wheel assembly on a walking arm in accordance with various embodiments.

In various embodiments, the planter 1200 may include a fertilizer furrow opener disc 1305 operable to cut a furrow proximal to the seed furrow 1280 for depositing fertilizer at the time of planting. In various embodiments, the planter 1200 may include a fertilizer furrow opener disc 1305 leading the furrow closer wheel 1315 (which can be wheels 1100 as shown in FIGS. 19 and 20) and/or the press wheel assembly 1100.

As described herein, the wheel 110 may be described as a press wheel however it may also be utilized as a closing wheel or other such implement suitable to condition the soil 400 in different ways. For example, the press wheel assembly 1100 may condition soil over the area affected by the closed fertilizer furrow in addition to the seed furrow 1280. Reference to wheel assembly 1100 does not limit it to such a use as other embodiments are discussed herein and a person of ordinary skill in the art understands the general application as a farm implement based on the disclosure provided herein.

Figure 14:
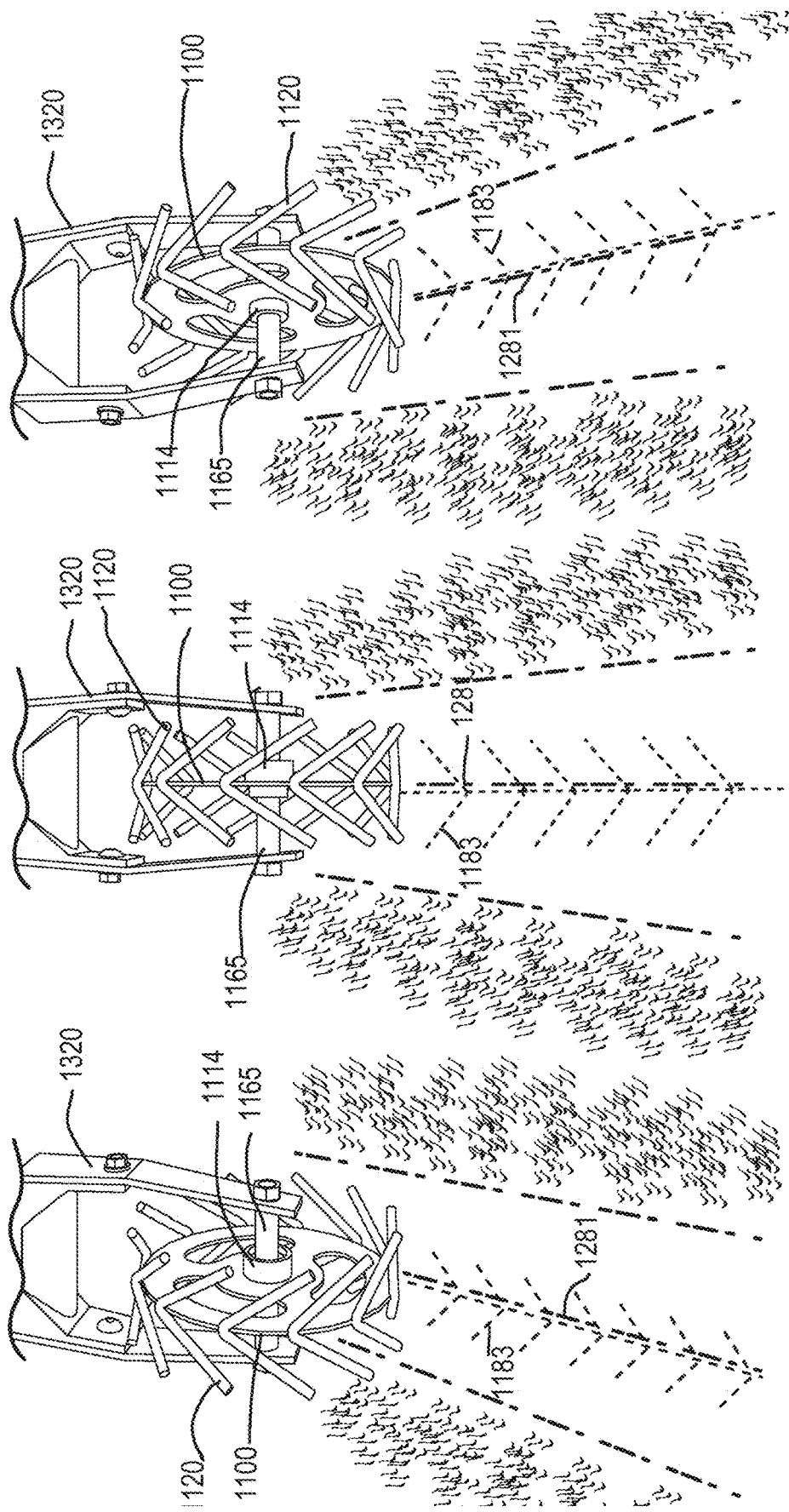
FIG. 14 illustrates a rear view of the agricultural planter showing the press wheel in accordance with an embodiment of the present invention.

In one embodiment, the closing wheels 1315 include an exterior radial surface 1340 which contacts the soil closing the open furrow. As the closing wheels 1315 close the open furrow 1280, a closed furrow seam 1281 is formed as the walls collapse against one another. In accordance with various embodiments, as illustrated in FIGS. 14 and 3A-B, the press wheel 1100 may follow the closing wheels 1315 and condition the closed furrow seam 1281. In doing so, the press wheel 1100 applies a downward pressure on the closed furrow 1281. The pressure against the soil may come from tread portions 1120 and/or a rim. The pressure may be applied without applying pressure from webbing or other material linking the tread portions 1120 at any point other than that proximal to a center plane. In one example, the tread portions 1120 may extend from each side of a center plane, which as shown in FIG. 14 may be a rim. Each tread wheel may include a plurality of tread portions 1120a, 1120b, and 1120c as shown in FIGS. 16-17.

In accordance with various embodiments, the press wheel 1100 may be approximately centered on the closed furrow seam 1281. This position may be independent of the location of either the opening wheels 1260 or the closing wheels 1315. But, the closing wheels 1315 may be positioned on the sides of the open furrow 1280 in order to close the furrow. As such, additionally or alternatively the press wheel 1100 may be centered between the closing wheels. However, in embodiments with a single closing wheel or offset closing wheels, the press wheel may be positioned on the side of the closing wheel which directs soil into the open furrow. In accordance with various embodiments, the press wheel 1100 may be positioned relative to the opening wheel (or opening wheels) 1260 regardless of the presence or position of closing wheels. In such an embodiment, the press wheel 1100 may follow the opening wheel 1260. The press wheel 1100 may be positioned so that the press wheel 1100 is centered in line with or approximately in line with the location at which the opening wheel 1260 engages or is designed to engage the soil. In other embodiments, the press wheel 1100 may be offset from the location of engagement between either the opening disk and the soil or the closing disk and the sides of the furrow 1280. For example, the press wheel 1100 may be aligned such that one set of tines 1120 may extend from one side of the press wheel 1100 and may engage or press on the closed furrow seam 1281.

As the press wheel 1100 creates a downward pressure, the press wheel 1100 and the tread portions 1120 may imprint a tread pattern 1183 on the ground. The tread pattern 1183 may resemble a chicken track. The imprint pattern may be formed because the volume between tread portions 1120 may not contact the soil, limiting contact to either or both of the rim and the tread portion 1120. In one example, two lines may extend from and at an angle to a line passing at or close to the closed furrow seam 1281. The two lines may be angled in the same direction. The lines may be symmetric, having a common point meeting proximal to the center plane and pointing away from the direction of travel of the tractor 1205. In another example, the lines may be non-symmetric but still have a common point meeting proximal to the center plane and pointing away from the direction of travel of the tractor 1205. In another example, the lines may be staggered, not having a common point proximal to the center plane but still angled such that the imprint points away from the direction of travel of the tractor 1205.

Now referring to FIG. 15A which depicts a sectional view of the agriculture planter looking rearward and showing an open furrow 1280, the agricultural seed planter and drill 1200 may include a trailing arm assembly 1300. The trailing arm assembly may include a trailing arm frame 1320 attached to the furrow closer wheels 1310/1315 (various embodiments may utilize a single closing wheel). These closing wheels 1310/1315 may be aligned or staggered. These closing wheels 1310/1315 may be positioned such that they straddle the open furrow 1280. As the opening wheels 1260 form the furrow, the closing wheels 1310/1315 may be positioned relative to the opening wheels 1260 such that the opening wheels 1260 open a furrow that would be positioned between closing wheels 1310/1315. This relationship between opening wheels 1260, the open furrow 1280 and the closing wheels 1310/1315 allows the closing wheels 1310/1315 to close the furrow 1280 previously opened by the opening wheels 1260. FIG. 15A shows the furrow still open and FIG. 15B shows the operability of the closing wheels in closing the furrow 1280. The seed 1282 is positioned at the bottom of the furrow. However, even after the furrow 1280 is closed, a seam 1281 is still present. The seam 1281 is formed by the walls of the furrow coming together during the closing process, but the soil is not necessarily interlaced between the walls. As such, a seam 1281 remains. The seam 1281 may be easily opened by excess water or dry conditions may allow a crack to form at the seam 1281 that may damage the seed 1282 planted at the base. It is this seam 1281 that is beneficially treated by a press wheel 1100 by helping to interlace soil across the seam by applying pressure.

The trailing arm frame 1320 may include a pivot 1345 that may extend through the closing wheels 1310/1315. The trailing arm frame 1320 may be pivotally coupled on the rear of the agricultural planter 1200. The closer wheels 1310/1315 may be tilted or inclined such that the portion of the closer wheels 1310/1315 closest to the ground are closer to one another than the upper portions of the closer wheels 1310/1315. For example, each pivotal axis 1345 of closer wheels 1310/1345 may be between approximately 13 degrees and approximately 25 degrees from being horizontal. The trailing arm assembly 1300 may also include other features such as an adjustment lever that allows the down force exerted by the closer wheels 1310/1315 to be adjusted or a fertilizer furrow opener and delivery mechanism. Any combination of features may be included on the trailing arm assembly or the agricultural planter in general, such as those disclosed in U.S. Pat. No. 8,356,563 herein incorporated by reference.

In accordance with various embodiments, a press wheel 1100 may be support by an axle 1165 that rotates about axis X. The axel 1165 may rotate within hub 1114. Hub 1114 and the axle 1165 may be supported by the trailing arm frame 1320. Alternatively, as discussed above, some other bracket may support hub 1114 and/or the axle 1165. Any known or developed bracket or support may position the press wheel 1100 relative to one or more of the planter 1200, the opening wheel 1260, the closing wheels 1310/1315 to the trailing arm frame 1320 and/or the furrow 1280.

FIG. 15B is a sectional view of the agricultural planter looking rearward, showing a closed furrow in accordance with an embodiment of the present invention. As discussed above, the press wheel may pass over top of the closed furrow thereby conditioning the soil.

Figure 16A:
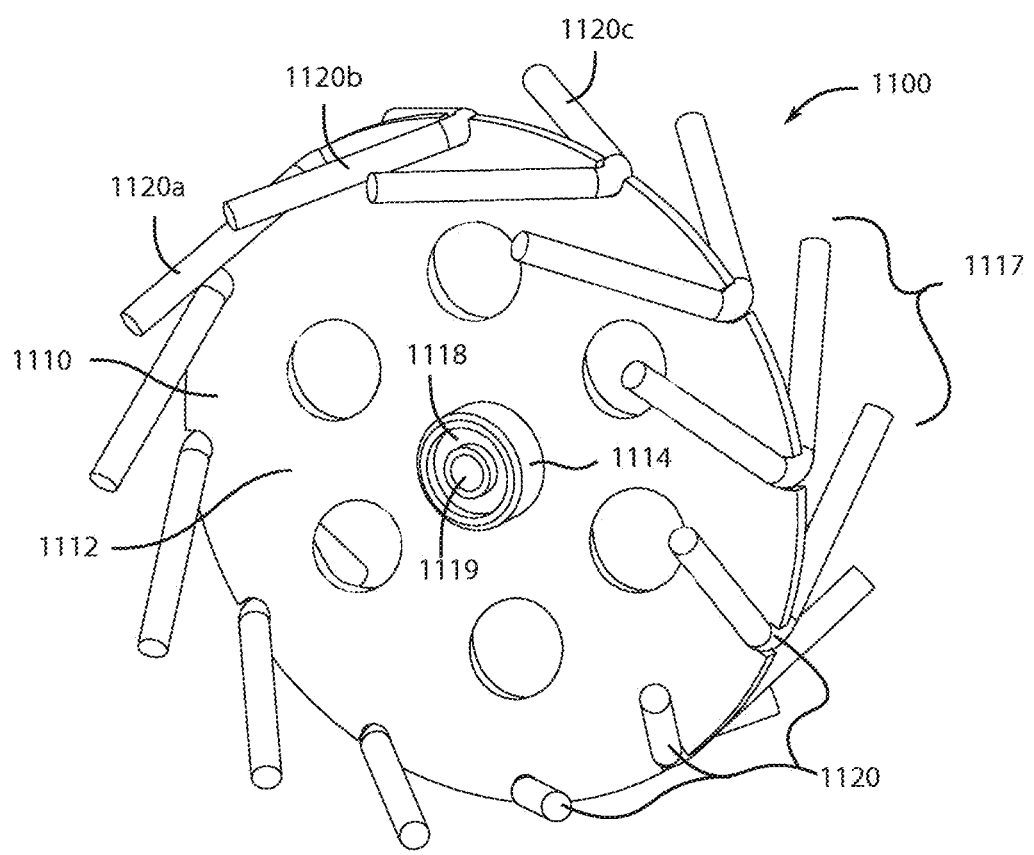
FIG. 16A illustrates a perspective view of a symmetric press wheel in accordance with an embodiment of the present invention.
Figure 18A:
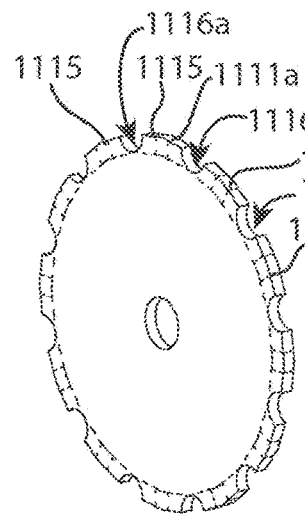
FIGS. 18A-F illustrate perspective views and front views of various embodiments of the press wheel rims without tines extending therefrom, particularly showing embodiments of the radial surface or edge of the press wheel rims.
Figure 18C:
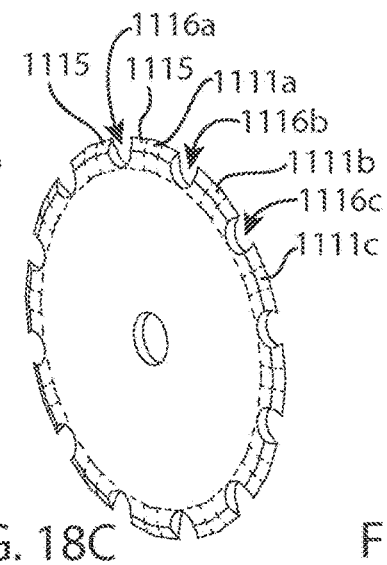
Figure 18E:
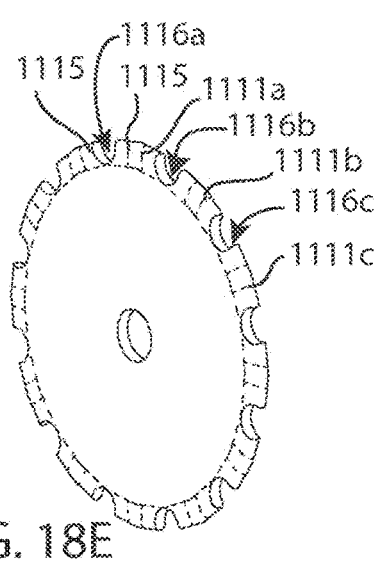
Figures 18B, 18D, 18F:
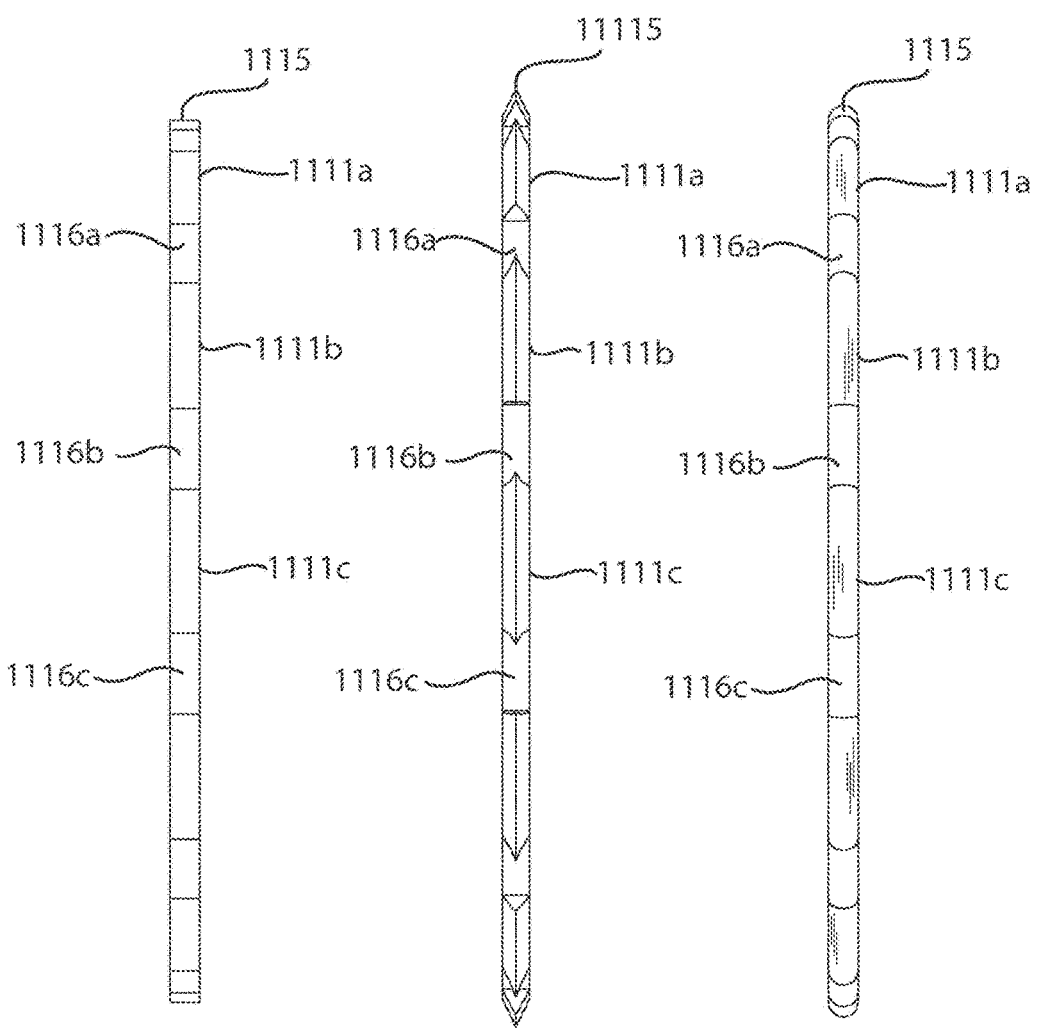

FIGS. 16A-C illustrate various views of a press wheel 1100. As indicated above, the press wheel may rotate about axis X. The press wheel may have a hub 1114 and a rim 1110 formed around the axis X. The rim 1110 may extend generally radially from the hub 1114 which may rotate about axis X on an axle 1165. The rim 1110 may have side wall surfaces 1110a and opposite surface 1110 band a radial surface or edge 1115. The outer radial surface or edge 1115 may include any of a variety of profiles. FIGS. 18A-F illustrate various embodiments of profiles for the radial surface or edge 1115 without the presence of tines extending therefrom. For example, the radial surface 1115 may be flat as illustrated in FIG. 18B. The radial surface 1115 may form a pointed edge as illustrated in FIG. 18D. The pointed edge may be sharp and knife like or it may merely taper to a round. The radial surface 1115 may form a rounded edge as illustrated in FIG. 18F. The various edge profiles may extend between a plurality of tread mounting features 1116. The tread mounting features 1116 may be apertures formed though the rim 1110 from a first surface 1110a to a second surface 1110b. The tread mounting features 1116 may be located wholly within the surface of the rim 1110 or they may pass though the rim and extend out and open the edge 1116 of the rim 1110. The tread mounting features 1116 may partition the radial edge of the rim 1115 into radial edge portions 1111. As shown, a plurality of tread mounting features 1116a, 1116b, and 1116c may form the adjacent radial edge portions 1111a, 1111b, and 1111c.

The rim 1110 may be formed from a portion of plate steel stamped into a circular plate. The side wall 1110a may include one or more apertures 1112 that extend through side wall 1110a. In embodiments having a plurality of apertures 1112, the space between the apertures 1112 may form spokes 1113. Each rim 1110 may have a plurality of spokes 1113. In one example, the rim 1110 may have three apertures and/or three spokes. The rim 1110 may have a center plane Y. The center plane Y may be defined as a plane perpendicular to the axis X. The center plane Y may generally bisecting the rim 1110. The center plane Y may define the center of the press wheel. While specific embodiments may be discussed herein, it may be noted that the rim 1110 may not be so limited but may be manufactured in accordance with any process to form any rim structure.

In accordance with various embodiments, the hub 1114 may be a central aperture 1119 in the rim 1110 allowing the rim 1110 rotate about an axle 1165. The internal aperture 1119 may extend axially through the press wheel 1100. In accordance with various embodiments, the hub 1114 may be operable to receive a bearing 1118 with the center of the bearing 1118 defining the aperture 1119 as shown in FIG. 16A. An aperture 1119 may pass axially through the bearing 1118. The hub 1114 may be defined by a cylindrical protrusion extending from the rim 1110. The cylindrical protrusion may be operable to provide additional support to the bearing 1118 and/or a shaft by providing greater width to the press wheel 1100 proximal to the interface between the press wheel 1100 and the axel shaft. The hub 1114 may be manufactured in accordance with any known process to form any known or developed structure of hub.

In accordance with various embodiments, the wheel 1100 may include a plurality of tread portions 1120. The tread portions 1120 may be formed on the radially exterior portion of the wheel 1100. The center plane Y may form a boundary from which the tread portions 1120 may extend in either direction. The tread portions 1120 may extend in only one direction from the center plane Y, or they may extend in both directions from the center plane Y. Adjacent tread portions 1120 on the same side of the center plane Y may have voids between each of the tread portions 1120. As used herein, the voids are a space sufficient to prevent the portion of the wheel 1100 between the adjacent tread portions from contacting the ground when in use. For example, the plurality of tread portions 1120 may have voids 1117 between adjacent tread portions on the same side of the rim such that in response to the wheel rotating and placing adjacent treads (e.g. treads 1120a and 1120b shown in FIG. 116A) proximal to the ground, the voids between the adjacent treads avoid allowing the wheel to contact the ground by components of the wheel other than the rim and/or the tread portions. In embodiment, wherein the tread portions are merely large treads extending from a tire with voids between the treads, the voids may also be sufficient to prevent the rim and any portion of the non-tread portion of the tire from contacting the ground. As indicated, the plurality of tines 1120 may be positioned on either one or both sides of the center plane Y. In accordance with various embodiments, the plurality of tines 1120 positioned on the same side of the rim 1110 may be structurally related to one another only by their attachment to the rim.

In accordance with various embodiments, the tread portions 120 may be defined as one or more tines extending out of the side wall of the rim and proximal to the radial surface of the rim. Each tine may have a plurality of connection ends (e.g. 1122a, 1122 b, and 1122c) and a termination end (e.g. 1124a, 1124b, 1124c, 1126a, 1126b, 1126c). The connection end may extend through mounting feature 116 and fixed relative to the radial surface 1116 of the rim 1110. The tines 1120 may have a first portion 1123 extending out of a first side of the rim 1110a. The tines 1120 may have a portion 1125 extending out of the second side of the rim 1110b. In one embodiment the first portion 1123 and the second portion 1125 of the tines may be connected at the connection end 1122a. The one or more tines (e.g. 1123a, 1123b, 1123c, 1125a, 1125b, and 1125c) may extend perpendicular to the center plane Y. The one or more tines may extend radially but away from the center plane Y toward the axis X (i.e. a combination radial and axial components of direction). The one or more tines may extend in a direction that if viewed from the side such as shown in FIG. 16A, the one or more tines may appear to form a chord across the circle. For the one or more tines to form a chord (at least as viewed from the side as shown in FIG. 16A), the direction of the tine may be described as having both an axial component (i.e. along axis X), a radial component (i.e. directed toward axis X), and a tangential component (i.e. parallel with center plane Y). The axial component may be perpendicular to the rim or the center plane Y. A combination of these various components may direct the tines in a variety of different directions. In accordance with one embodiment, the tines may be directed at an angle such that they form a portion of a chord, a full chord, or more than a full chord across the rim when viewed from a side view.

The formation of this side-viewed chord may be accomplished by structuring the wheel such that a first connection end 1122a of a first tine 1120a is in axial alignment with the termination end 1126b and/or 1124b on an adjacent tine. Stated another way, a line/axis parallel with axis X that may pass through 1122a may also pass through 1126b and/or 1124b. In some embodiments, only one side of the wheel 1100 may be aligned (e.g. a 1122a and 1124b may be aligned but not 1122a and 1126b). In some embodiments, there may be no alignment.

In accordance with various embodiments, each of the tines 1120 may form a substantially planer structure. Meaning, the axis of 1122a to 1124a may be in the same plane as the axis of 1122a to 1126a. This planer structure may be formed, for example, by placing a simple bend in a length of steel rod. The steel rod may be welded to the rim 1110. Thus, each tine 1120 may occupy a planar structure. The tines and rim may be formed using any known process or material. For example, polymer tines may be attached to a polymer rim using adhesive. Alternatively or additionally, various materials may be cast, mold, machined, or formed by any other suitable process to form the rim and tines. The tines may be manufactured having the same diameter throughout. In some embodiments, the tines may not have a consistent diameter but may narrow to a point or have some other profile.

Figure 17A:
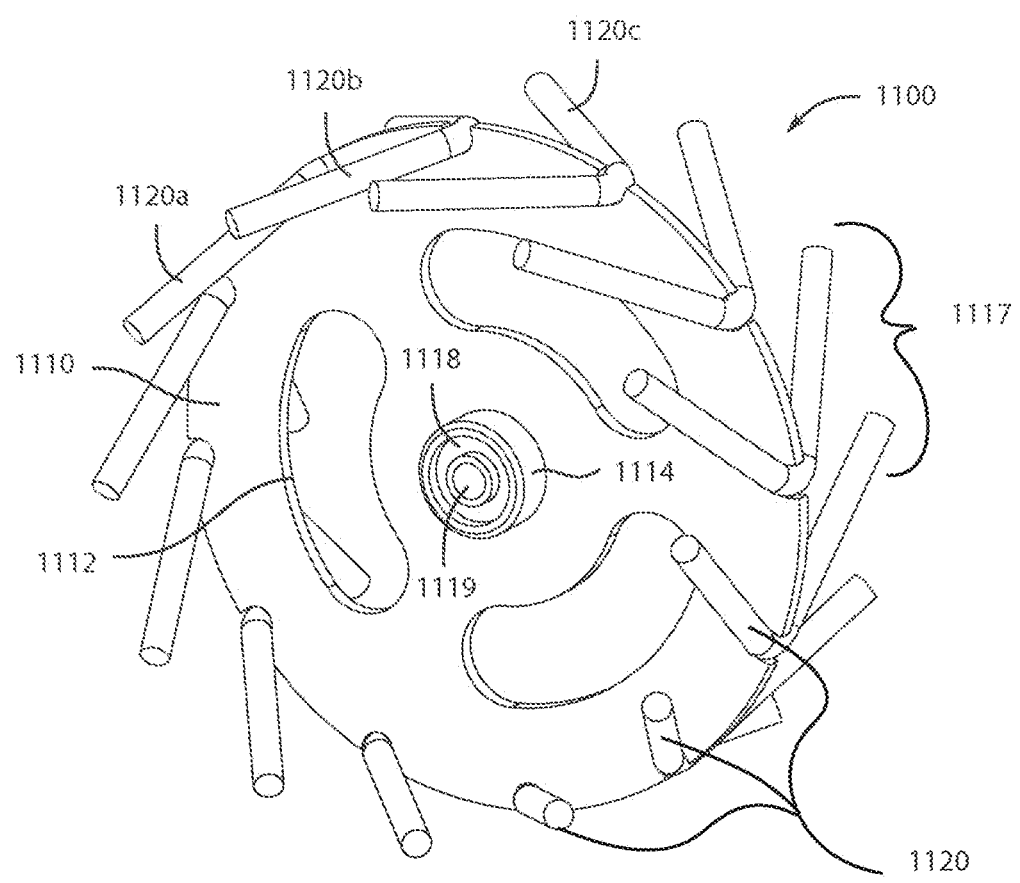
FIG. 17A illustrates a perspective view of a non-symmetric press wheel in accordance with an embodiment of the present invention.

In accordance with various embodiments, the plurality of tines 1120 may include opposing tines 1123 and 1125. The tines 1123 and 1125 may be formed symmetrically on opposite sides of the center plane as shown in FIGS. 16A-C. In various embodiments the tines 1123, 1125 may not be formed symmetrically on opposite sides of the center plane Y as shown in FIGS. 17A-C. The tines may be positioned at different angles, lengths, or positions extending from the center plane Y. Even in embodiments wherein tines 1123 and 1125 are made from a single portion of steel rod, the rod may be attached to rim 1110 such that tines 1123 and 1125 are not symmetric. This may be accomplished by rotating the rod such that the angles of each of tines 1123 and 1125 on each side or the rim 1110 are different. Additionally or alternatively, tines 1123 may be longer than tines 1125. Tines 1125 may be longer than tines 1123. One side may be larger in diameter than the other. Lengths, diameters, and/or other characteristics may alternate between sides.

Figure 21:
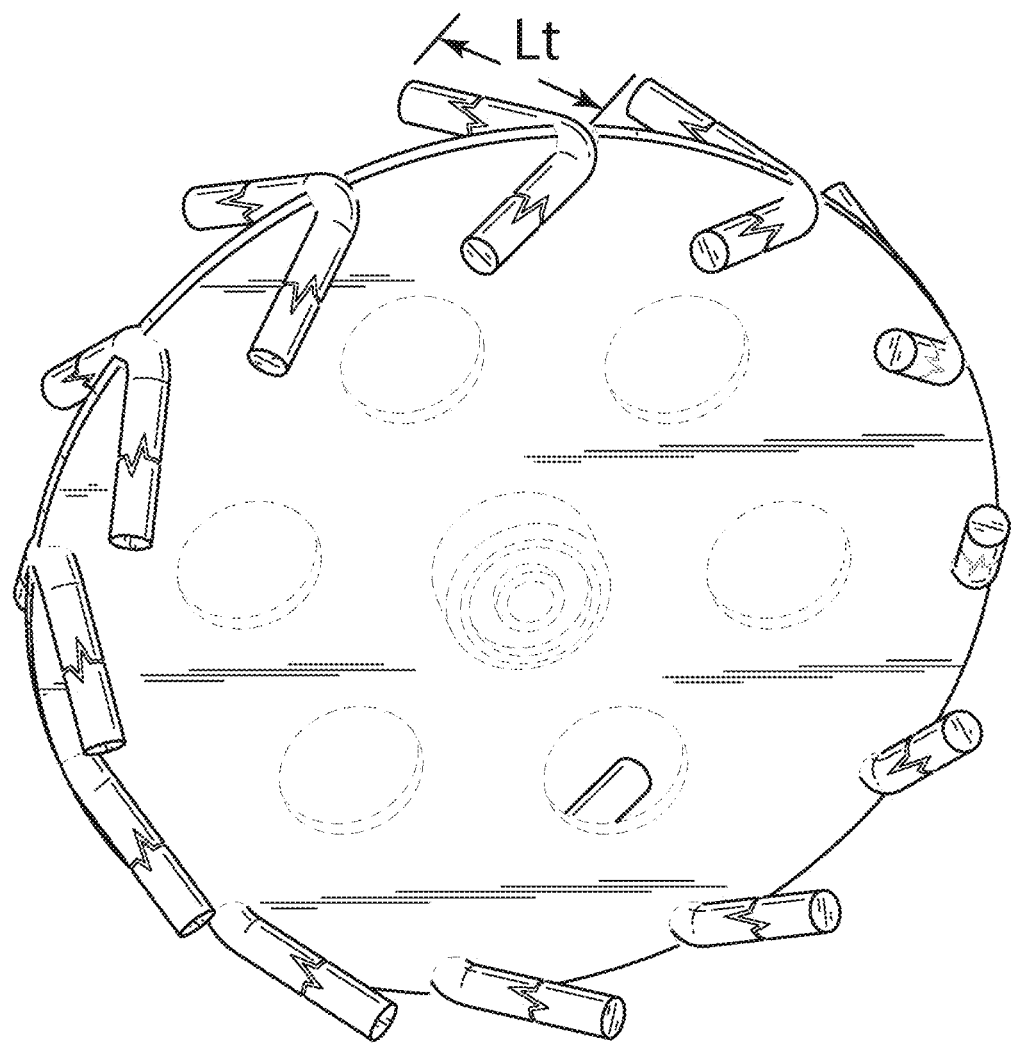
FIG. 21 illustrates a perspective view of a wheel in accordance with various embodiments.
Figure 22:
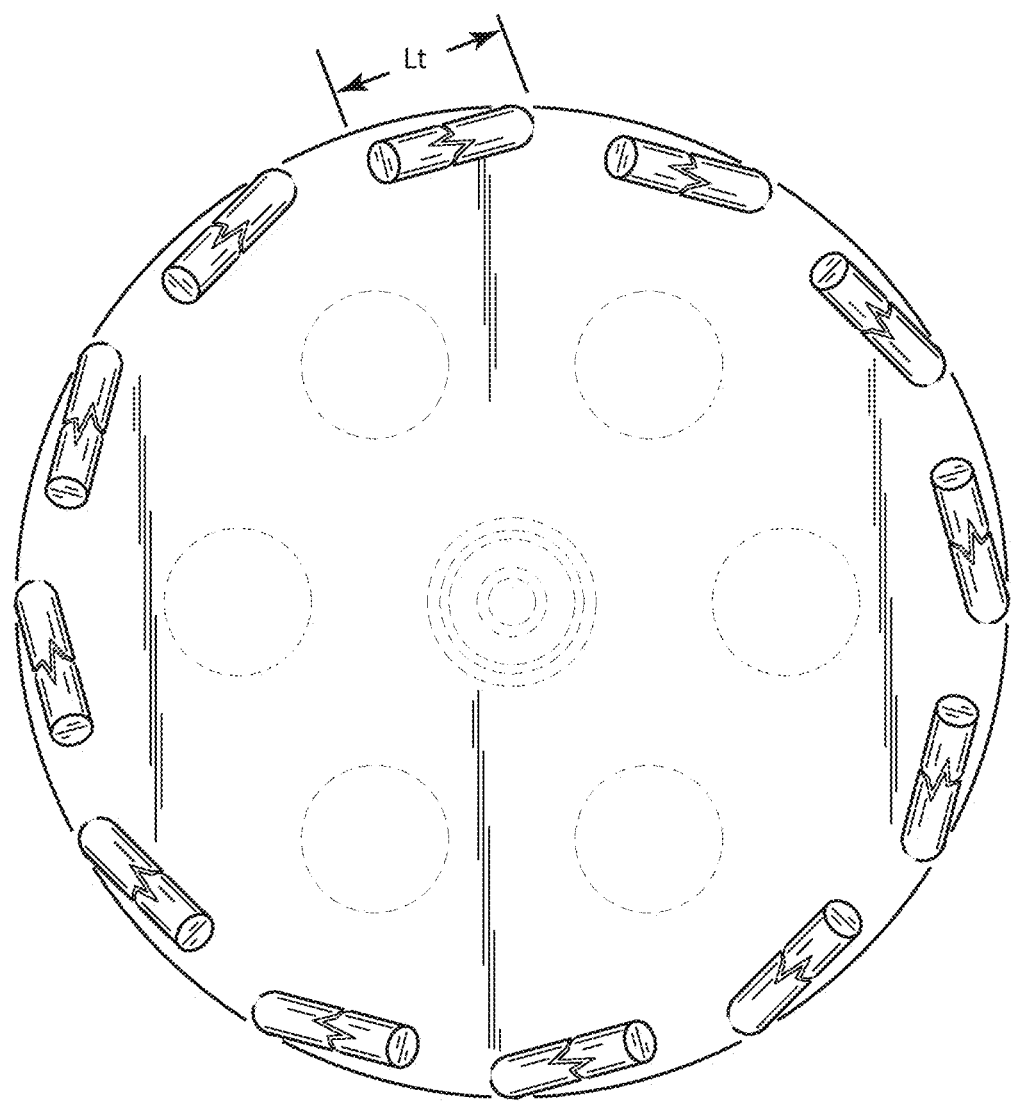
FIG. 22 illustrates a left side elevation view of the wheel of claim 21.
Figure 23:
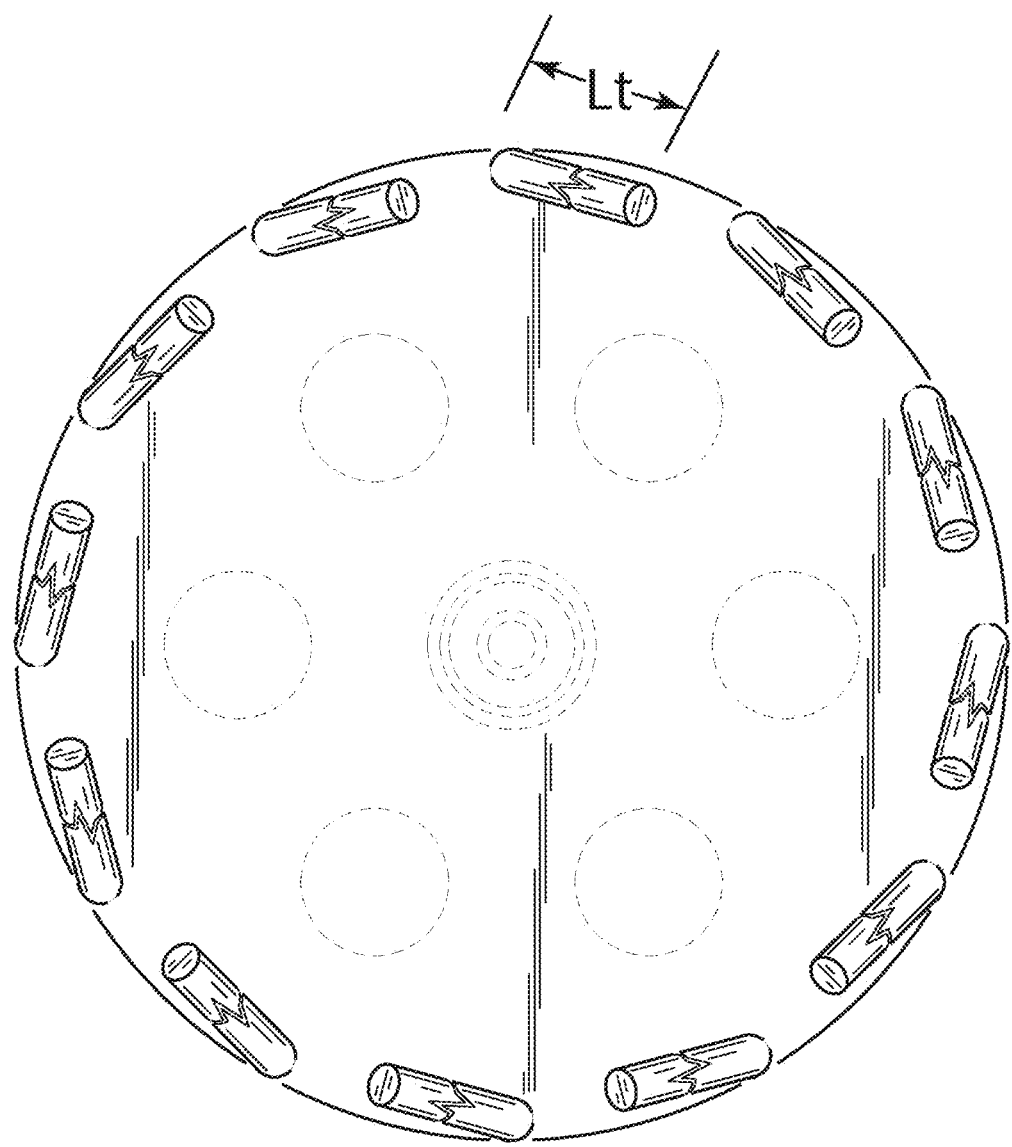
FIG. 23 illustrates a right side elevation view of the wheel of claim 21.
Figure 25:
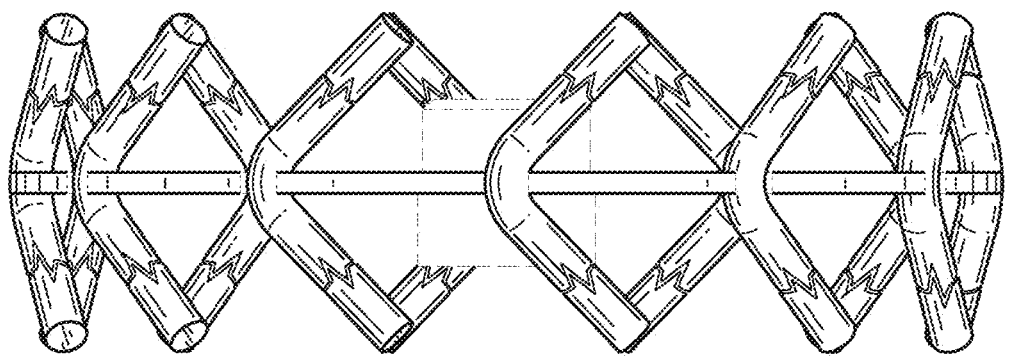
FIG. 25 illustrates a front view of the wheel of claim 21.
Figure 24:
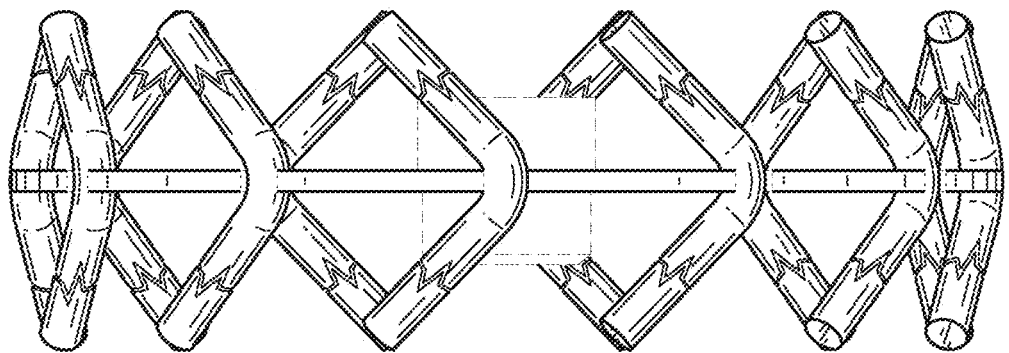
FIG. 24 illustrates a rear view of the wheel of claim 21.
Figure 26:
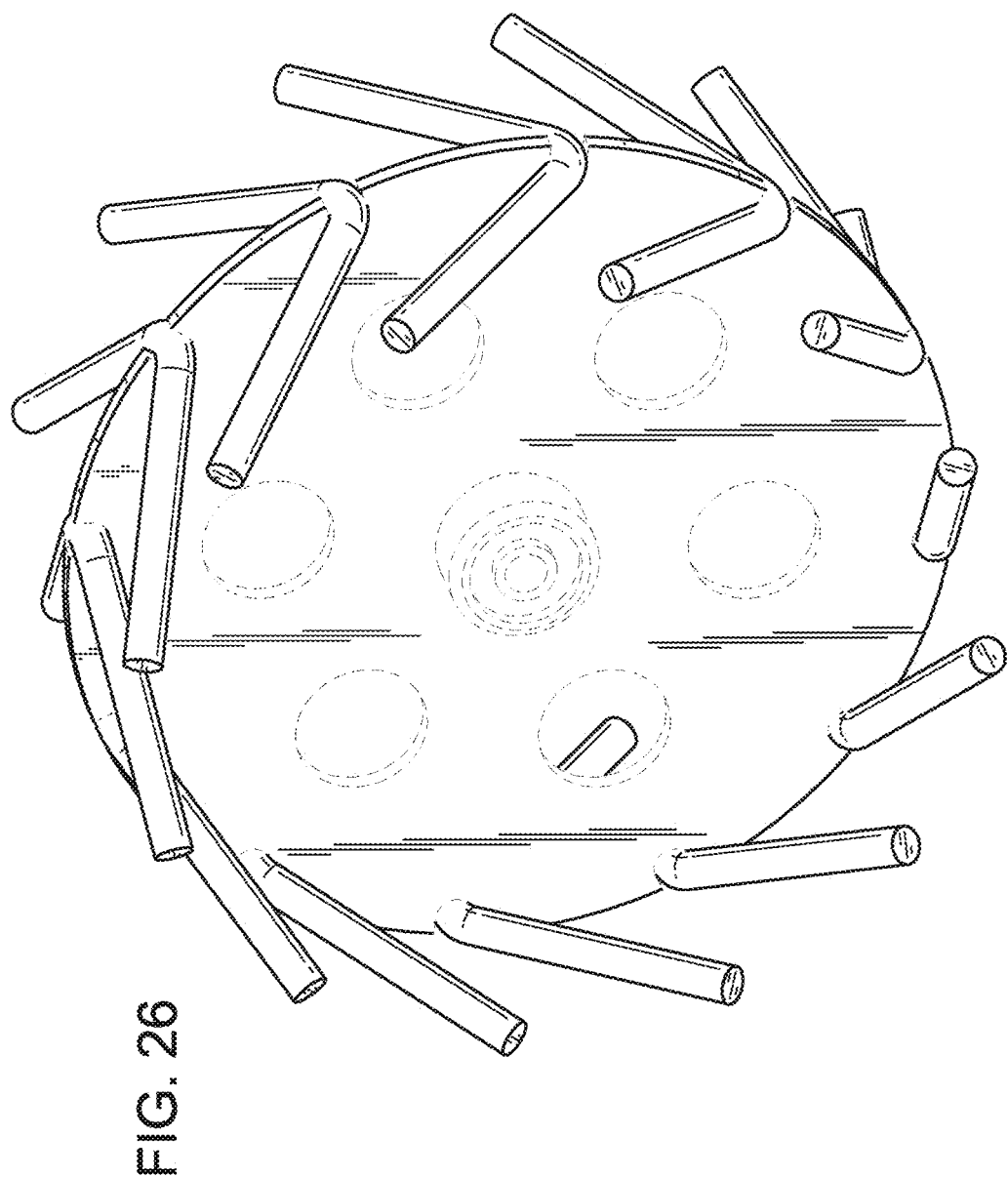
FIG. 26 illustrates a perspective view of a press wheel in accordance with various embodiments.
Figure 27:
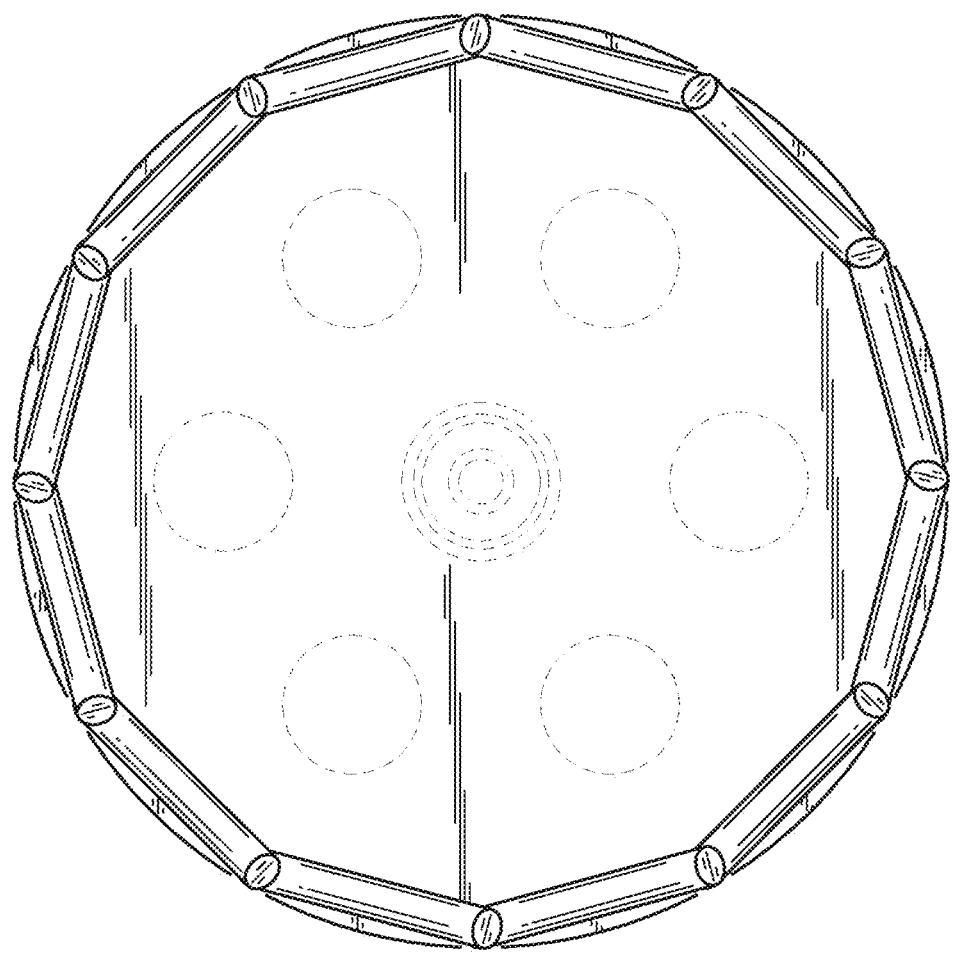
FIG. 27 illustrates a left side elevation view of the press wheel of claim 26.
Figure 28:
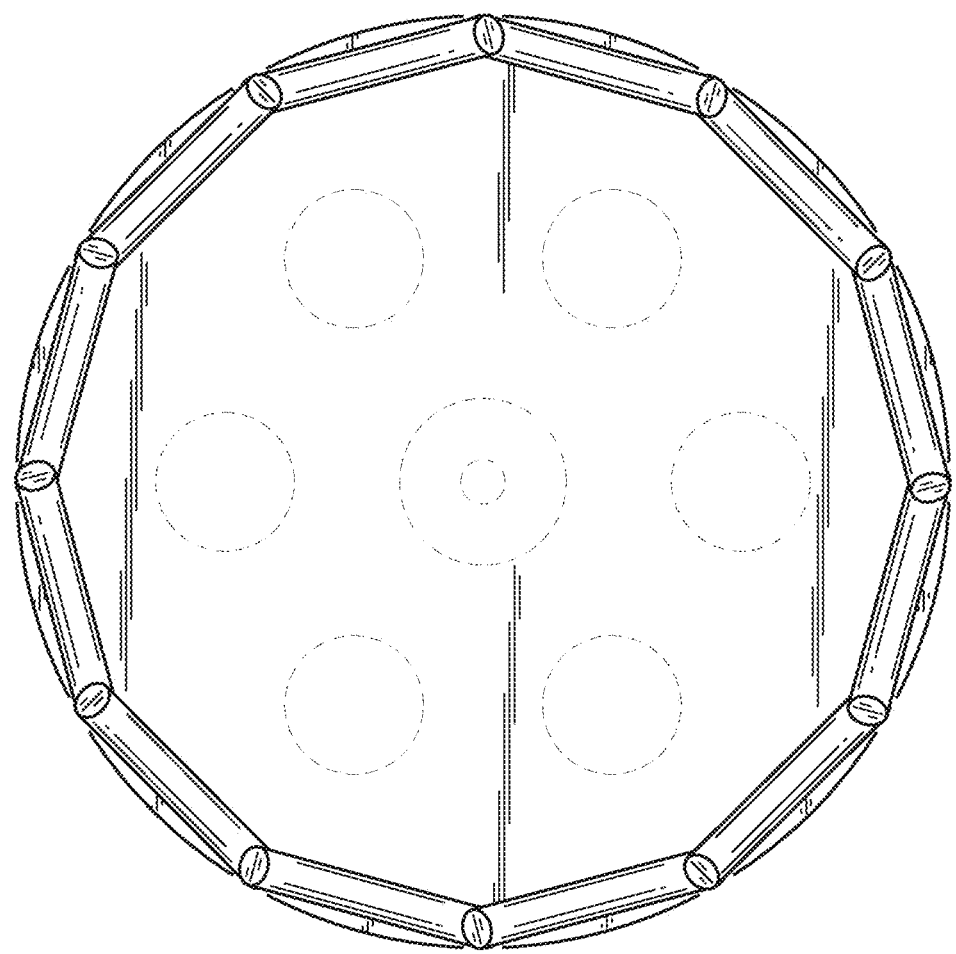
FIG. 28 illustrates a right side elevation view of the press wheel of claim 26.
Figure 30:
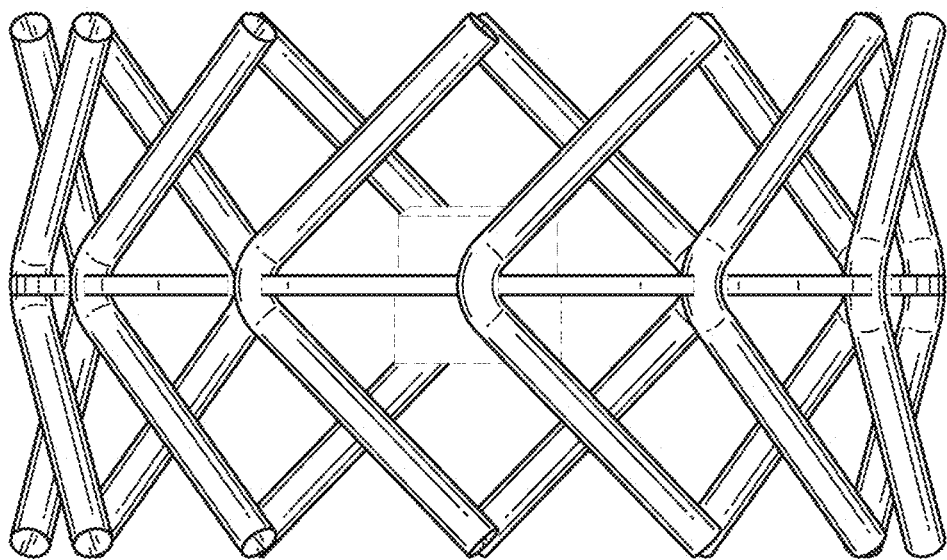
FIG. 30 illustrates a front view of the press wheel of claim 26.
Figure 29:
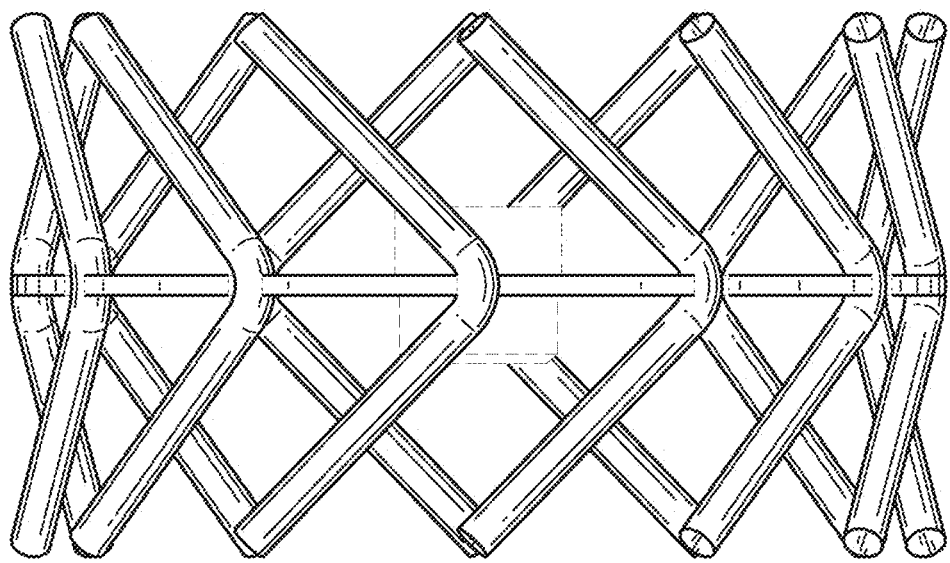
FIG. 29 illustrates a rear view of the press wheel of claim 26.
Figure 31:
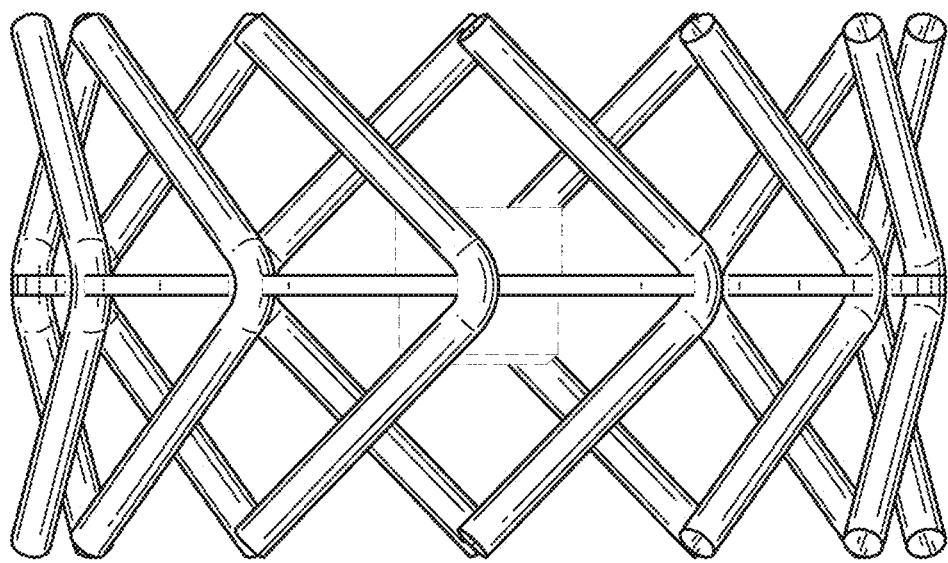
FIG. 31 illustrates a top view of the press wheel of claim 26.
Figure 32:
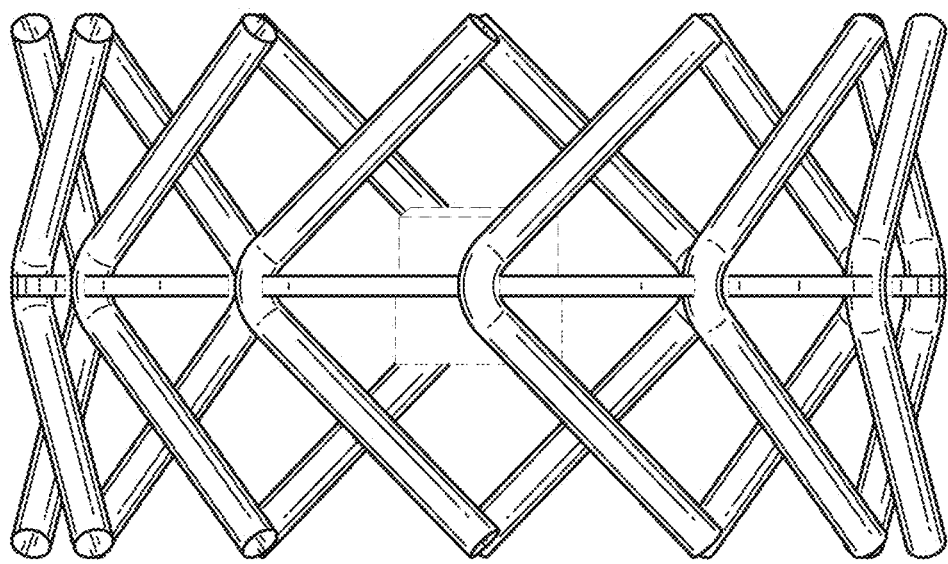
FIG. 32 illustrates a bottom view of the press wheel of claim 26.

In accordance with various embodiments, as shown for example in FIGS. 21-22 the tines 1123 may have a length Lt. The Length Lt may between ½ and 5 inches. The application of the wheel may influence the desired length of tine. For example, in applications in which the wheel 1100 is a closing wheel the tines may be limited in length to Lt being about ½ to 3 inches and preferably about 2 inches in length. Shorter tines aid in positioning the wheel 1100 at an angle such that it functions better as a closing wheel (See FIGS. 19 and 20). In another example, in application in which the wheel 1100 is a press wheel, the wheel 1100 may be positioned perpendicular to the ground such that the tines press on the ground evenly. In this example, the tines may have a length Lt between about 2 to 5 inches. The longer tines provide improved support against the ground thereby pressing a larger area of the ground.

In accordance with various embodiments, the plane formed by the tines may be perpendicular to the center plane and/or the rim. The plane formed by the tines may also cut chords across the rim. Stated another way, the perpendicular distance from the axis X to the any point along the length of any of the tines 1120 may be equal to or less than the radial distance from the axis X to an exterior edge of the rim 1110.

Figure 17D:
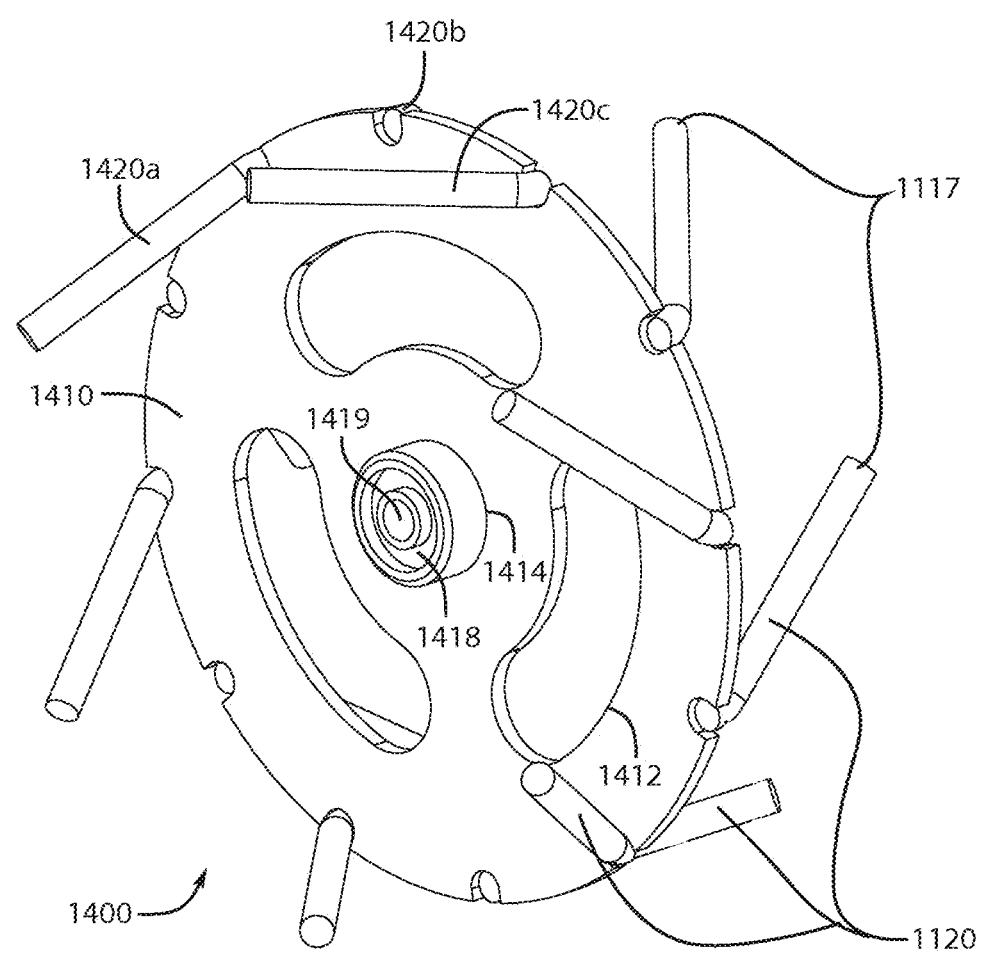
FIG. 17D illustrates a perspective view of an alternating tine press wheel in accordance with an embodiment of the present invention.
Figure 17F:
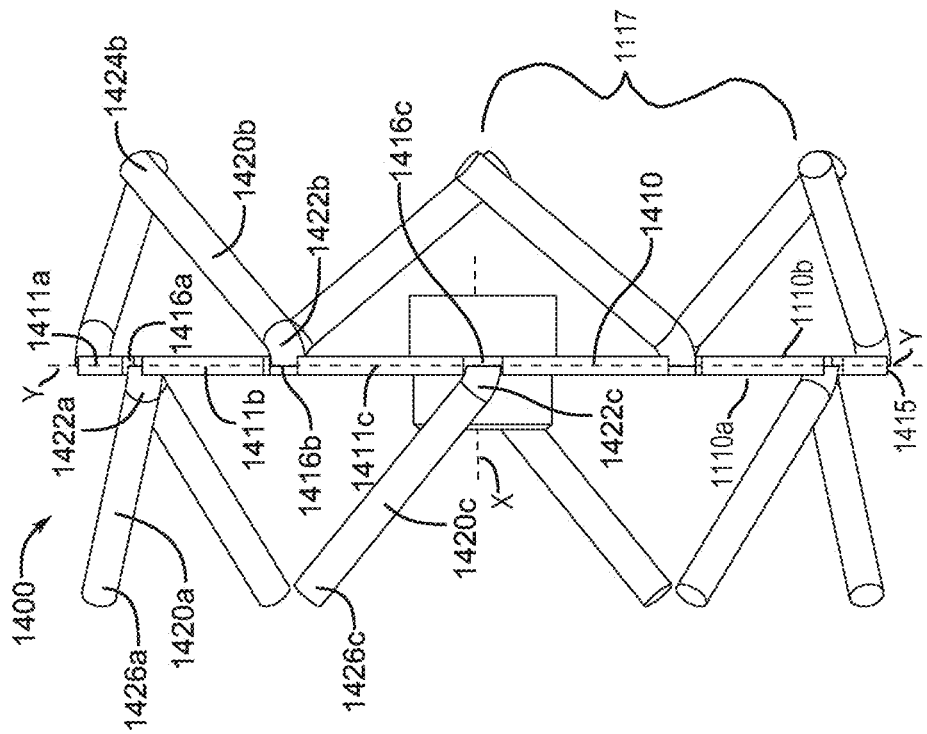
FIG. 17F illustrates a front view of the press wheel shown in FIG. 17D.
Figure 17E:
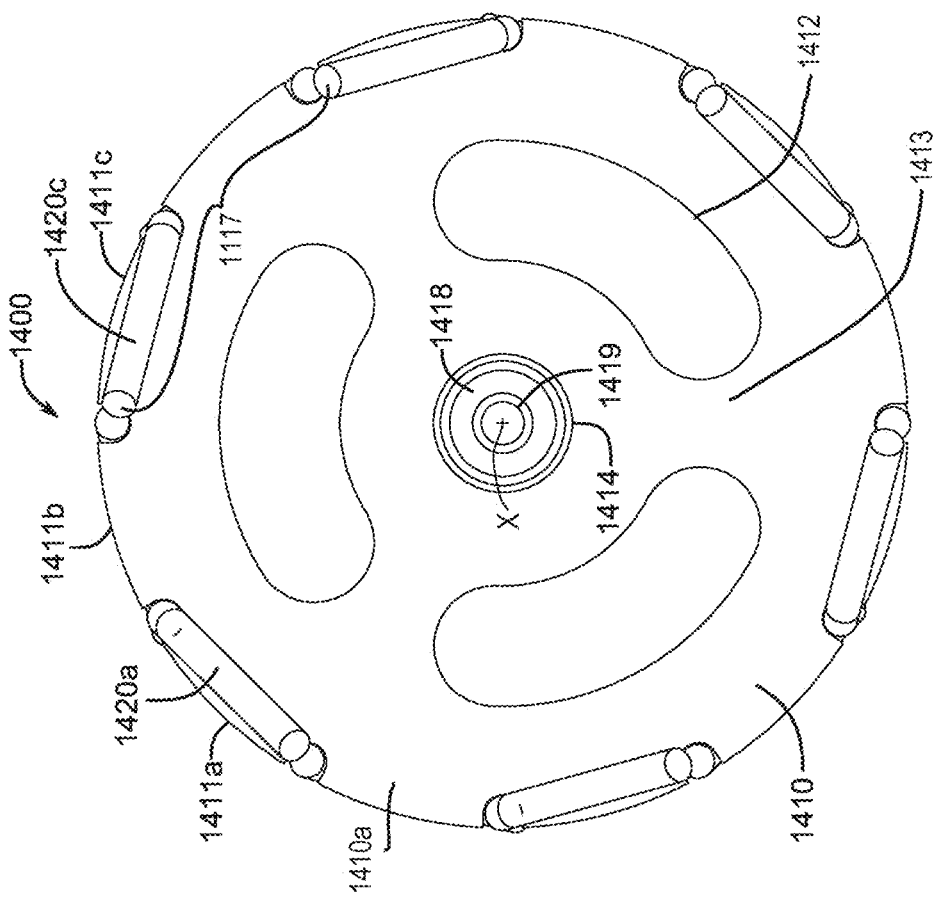
FIG. 17E illustrates a side view of the press wheel press wheel shown in FIG. 17D.

FIGS. 17D-F illustrate another embodiment of a press wheel 1400 wherein the tread portions 1420 are not symmetric. The tread portions 1420 may not even extend on each side of the rim 1410 from a common location. FIG. 17D is a perspective view of a press wheel in accordance with an embodiment of the present invention. As indicated above, the press wheel may rotate about axis X. The press wheel may have a hub 1414 and a rim 1410 formed around the axis X. The rim 1410 may extend generally radially from the hub 1414 which may rotate about axis X on an axle 1465. The rim 1410 may have side wall surfaces 1410a and a radial surface 1411. The rim 1410 may be formed from a portion of plate steel stamped into a circular plate. The side wall 1410a may include one or more apertures 1412 that extend through sidewall 1410a. In embodiments having a plurality of apertures 1412, the space between the apertures 1412 may form spokes 1412a. Each rim 1410 may have a plurality of spokes 1412a. In one example, the rim 1410 may have three apertures and/or three spokes. The rim 1410 may have a center plane Y. The center plane Y may be defined as a plane perpendicular to the axis X. The center plane Y may generally bisect the rim 1410. The center plane Y may define the center of the wheel. While specific embodiments may be discussed herein, it may be noted that the rim 1410 may not be so limited but may be manufactured in accordance with any process to form any rim structure.

In accordance with various embodiments, the hub 1414 may be a central aperture 1419 in the rim 1410 allowing the rim 1410 rotate about an axle 1465. The internal aperture 1419 may extend axially through the wheel 1400. In accordance with various embodiments, the hub 1414 may be operable to receive a bearing 1418 with the center of the bearing 1418 defining the aperture 1419 as shown in FIG. 16A. An aperture 1419 may pass axially through the bearing 1418. The hub 1414 may be defined by a cylindrical protrusion extending from the rim 1410. The cylindrical protrusion may be operable to provide additional support to the bearing 1418 and/or a shaft by providing greater width to the wheel 1400 proximal to the interface between the wheel 1400 and the axel shaft. The hub 1414 may be manufactured in accordance with any known process to form any known or developed structure of hub.

In accordance with various embodiments, the wheel 1400 may include a plurality of tread portions 1420. The tread portions 1420 may be formed on the radially exterior portion of the wheel 1400. The center plane Y may form a boundary from which the tread portions 1420 may extend in either direction. Adjacent tread portions 1420 on the same side of the center plane Y may have voids between each of the tread portions 1420. As used herein, the voids are a space sufficient to prevent the portion of the wheel 1400 between adjacent tread portions from contacting the ground when in use. For example, the plurality of tread portions 1420 may have voids 1417 between adjacent tread portions on the same side of the rim such that in response to the press wheel rotating and placing adjacent treads (e.g. treads 420a and 420c shown in FIG. 17D) proximal to the ground. The presence of voids between the adjacent treads allow for condition of the ground by reducing the constant contact from the wheel but instead lighting turning the soil by allowing some soil to pass through the voids and only making contact with the rim and/or the tread portions. In embodiment, wherein the tread portions are merely large treads extending from a tire with voids between the treads, the voids may also be sufficient to prevent the rim and any portion of the non-tread portion of the tire from contacting the ground. As indicated, the plurality of tread portions 1420 may be positioned on either one or both sides of the center plane Y. In accordance with various embodiments, the plurality of tread portions 1420 positioned on the same side of the rim 1410 may be structurally related to one another only by their attachment to the rim.

In accordance with various embodiments, the tread portions 1420 may be defined as one or more tines extending out of the side wall of the rim and proximal to the radial surface of the rim. Each tine may have a connection end (e.g. 1422a, 1422b, and 1422c) and a termination end (e.g. 1424b, 1426a, 1426c). The connection end may be fixed to the radial surface 1411 of the rim 1410. The one or more tines (e.g. 1423a, 1423b, 1423c) may extend perpendicular to the center plane Y. The one or more tines may extend radially but away from the center plane Y toward the axis X (i.e. a combination radial and axial components of direction). The one or more tines may extend in a direction that if viewed from the side such as shown in FIG. 17D, the one or more tines may appear to form a chord across the circle. For the one or more tines to form a chord (at least as viewed from the side as shown in FIG. 17D), the direction of the tine may be described as having both an axial component (i.e. along axis X), a radial component (i.e. directed toward axis X), and a tangential component (i.e. parallel with center plane Y). The axial component may be perpendicular to the rim or the center plane Y. A combination of these various components may direct the tines in a variety of different directions. In accordance with one embodiment, the tines may be directed at an angle such that they form a portion of a chord, a full chord, or more than a full chord across the rim when viewed from a side view.

The formation of this side-viewed chord may be accomplished by structuring the wheel such that a first connection end 1422b of a tine 1420b is in axial alignment with the termination end 1426c on an adjacent tine 1420c. Stated another way, a line/axis parallel with axis X that may pass through 1422b may also pass through 1426c. In accordance with various embodiments, tines 1420 may extend from only one side of the wheel 1400 at a time. As such the connection end 1422 may only align with one end of a tine. In some embodiments, there may be no alignment.

In accordance with various embodiments, each of the tines 1420 may form a substantially planer structure. Meaning, the axis or center line of the tine extending from 1422a to 1426a may be in a single plane. This planer structure may be formed, for example, by placing a simple bend in a length of steel rod or merely extending a straight rod from the surface of the rim 1420 outwardly at an angle. The tines and rim may be formed using any known process or material such as those already discussed herein. The tines 1420 may be manufactured having the same diameter throughout. In some embodiments, the tines 1420 may not have a consistent diameter but may narrow to a point or have some other profile.

Unlike traditional press wheels, in accordance with various embodiments, the press wheels discussed herein may not smear the soil over the furrow. Instead, the press wheel may engage and press the soil into the voids between the tread portions thus preventing or limiting the press wheel from forcing and/or smearing the soil to the sides of the press wheel. By not forcing soil out from under the press wheel but instead merely moving soil into the voids between the tread portions and over the closed furrow seam, it leaves a mellow treated soil that minimizes the soil from crusting over the seeded furrow. A hot, windy day won't affect or make the soil hard or bake and crust as it does with traditional tire pressing wheels that do not have sufficient voids between contact patches of the press wheel. Other wheels, such as those manufactured by Schlegel, pull soil in from each side of the seed trench with significant velocity causing rooster tail during planting. This design works the sides of the closed furrow seam and does not contact the closed furrow seam directly over top, whereas the press wheel as discussed herein may be operable to work directly over top of the closed furrow seam. The first contact point is in the center and the tines located to the side slowly engage the soil moving outwardly from the closed furrow seam. As such, work is performed from the center out relative to the closed furrow seam.

In accordance with various embodiments, a method may be utilized whereby soil is conditioned over top of a closed furrow by applying a press wheel to the proximity of the furrow seam. The press wheel may be configured such that a pattern resembling a chicken track is laid over top or in the proximity of the furrow seam. The soil may be conditioned by the press wheel by contacting the soil above or proximate to the closed furrow seam 1281 and then working the soil outwardly as the press wheel continues to roll. The contact may be made by one or both of the rim 1110 and the attachment portion 1122 of the tines 1120. As the press wheel 1100 rolls, portions of the tread portions 1120 progressively distal to the center plane contact the ground, thereby working the soil outwardly. The soil is pressed in the voids between the tread portions 1120 and avoids any contact with webbing or material that extends between the tread portions except in some embodiments at the center plane. In embodiments utilizing tines for tread portions 1120 there is no material on the wheel between tines that extend away from the rim 1110. Therefore, there is nothing to contact the ground between the portions of tines that extend from the rim. As the press wheel 1100 continues to roll the tines lift from the ground, again moving inside out. In various embodiments, as soon as the distal portion of one tread portion 1120 is lifting from the ground, the attachment portion 1122 of another tread portion 1120 begins engaging the ground. However, in other embodiments the tines may have closing or further spacing from one another. The spacing may be a function of the seed location such that tines engage the soil once, twice, three times, and/or more contacts between seed locations.

FIG. 19 illustrates a perspective view of a tail section having a closing wheel assembly in accordance with various embodiments. In this embodiment the wheels 1100a and 1100b are positioned as closing wheels. They are staggered along an articulating bracket similar to those discussed above. The wheels are positioned on either side of a furrow and are angled with respect to the ground. In this way the outer tines, e.g. 1120 engage the soil and churn it pushing the soil into the furrow. The wheels 1100a and 1100b may be positioned at angles offside from the perpendicular with respect to the ground. The top of the wheels may extend out such that the outside tines point more directly at the soil than the inside tines do.

FIG. 20 illustrates a rear perspective view of a tail section having a closing wheel assembly on a walking arm in accordance with various embodiments. In this embodiment the wheels 1100a and 1100b are positioned as closing wheels. They are staggered along an articulating bracket 800 with the rear wheel 1100a proximal to the rear end 830 of the bracket 800 and the front wheel 1100b proximal to the front end 820 of the bracket. The bracket 800 may pivot between the two wheels at pivot 810 which is connected to the body of the trailing arm assembly. The bracket 800 may be similar to those discussed above and those in the application incorporated by reference. The wheels are positioned on either side of a furrow and are angled with respect to the ground. The front wheel may have an angle of W and the rear wheel 1100a may have an angle of Z. The angles W and Z may be optimized to so that the outside tines engage the furrow and provide the best seed cover. In this way the outer tines, e.g. 1120 engage the soil and churn it pushing the soil into the furrow. The wheels 1100a and 1100b may be positioned at angles offside from the perpendicular with respect to the ground. The top of the wheels may extend out such that the outside tines point more directly at the soil than the inside tines do. The bracket 800 may be a part of a parallel linkage as discussed above.

FIGS. 21-25 illustrate a wheel structure. The wheel structure may be used as various planting implements including press wheels, closing wheels, or the like. The illustrations also depict ornamental features and aesthetically pleasing appearance of the wheels.

FIGS. 26-32 illustrate a wheel structure. The wheel structure may be used as various planting implements including press wheels, closing wheels, or the like. The illustrations also depict ornamental features and aesthetically pleasing appearance of the wheels.

Although various representative embodiments of this invention have been described above with a certain degree of particularity, those skilled in the art could make numerous alterations to the disclosed embodiments without departing from the spirit or scope of the inventive subject matter set forth in the specification and claims. The various embodiments discussed herein are not exclusive to their own individual disclosures. Each of the various embodiments may be combined with or excluded from other embodiments. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A press wheel comprising:
a hub which rotates about an axis;
a rim extending generally radially from the axis, the rim defining a circumferential portion and a center plane defined as a plane perpendicular to the axis and bisecting the rim;
a plurality of tread portions connected to the rim along the circumferential portion and defining voids between adjacent tread portions, wherein each of the tread portions comprise a tine having a first tine portion extending from a first side of the rim and a second tine portion extending from a second side of the rim, and wherein the first and second tine portions define a tine plane that is inset relative to the circumferential portion and intersecting a tine plane of an adjacent tread portion adjacent the circumferential portion.

2. The wheel of claim 1, wherein
the tine comprises a connection end connected to the rim, and
the first and second tine portions extend from the connection end.

3. The wheel of claim 2, wherein the first tine portion defines a first tine portion terminal end axially aligned with the connection end of the adjacent tread portion.

4. The wheel of claim 3, wherein the connection end is aligned with the circumferential portion.

5. The wheel of claim 4, wherein the connection end and an outermost edge of the rim adjacent the connection end are configured to contact a ground surface together.

6. The wheel of claim 1, wherein the tine plane defines a chord with each of the first and second sides of the rim.

7. The wheel of claim 1, wherein the tine plane is perpendicular to the center plane.

8. The wheel of claim 1, wherein the first and second tine portions form a V-shaped pattern.

9. A wheel comprising:
a hub which rotates about an axis;
a rim extending generally radially from the axis, the rim having a center plane defined as a plane perpendicular to the axis and generally bisecting the rim;
a plurality of tread portions extending away from the center plane, wherein the plurality of tread portions have voids between adjacent tread portions that are located on a same side of the rim, which in response to the wheel rotating operably places consecutive adjacent tread portions proximal to the ground, wherein each of the tread portions comprise a tine extending away from the center plane and having a component in one or more of a radial direction, a component in an axial direction, or a component in a tangential direction,
wherein the tine portion defines a chord relative to a radial surface the rim.

10. The wheel of claim 9, wherein the rim and the one or more of the tread portions are configured to contact the ground at the same time.

11. The wheel of claim 9, wherein the rim and one or more of the tread portions are positioned in relationship to one another and are configured such that both the rim and one or more of the tread portions contact the ground for firming a surface of soil of seeded furrows to aid in the sprouting of plants.

12. The wheel of claim 9, wherein an exterior edge of the rim is coplanar with a portion of each of:
a first tine portion of the tine that extends from a first side of the rim; and
a second tine portion of the tine that extends from a second side of the rim, opposite the first side.

13. The wheel of claim 9, wherein a terminal end of the tine is axially aligned with a connection end of an adjacent tine.

14. The wheel of claim 9, wherein the tine portion defines the chord as being aligned with, or separated form, a chord of an adjacent tread portion.

15. The wheel of claim 9, wherein the tine is seated in the rim.

16. A wheel comprising:
a hub which rotates about an axis;
a rim extending generally radially from the axis, the rim defining a circumferential portion and a center plane defined as a plane perpendicular to the axis and bisecting the rim;
a plurality of tread portions extending away from the center plane, wherein the plurality of tread portions have voids between adjacent tread portions that are located on a same side of the rim, which in response to the wheel rotating operably places consecutive adjacent tread portions proximal to the ground, and wherein each of the tread portions are formed from a tine extending from a radial surface of the rim in a direction that includes a component in one or more of a radial direction, a component in an axial direction, or a component in a tangential direction, and wherein the tine and the radial surface define a tine plane that forms a chord along the radial surface that interests no more than two chords of adjacent tread portions within the circumferential portion.

17. The rim of claim 16, wherein the tine comprises
a connection end extending from the radial surface, and
a terminal end axially aligned with the circumferential portion defined by an outer edge of the rim about the radial surface.

18. The rim of claim 17, wherein the terminal end is axially aligned with a terminal end of an adjacent tread portion.

19. The rim of claim 17, wherein a portion of the connection end is flush with the outer edge.

20. The rim of claim 17, wherein the circumferential portion defines an arcuate circumferential edge between adjacent tread portions.

* * * * *